(12) United States Patent
Schmeichel et al.

(10) Patent No.: US 12,330,487 B2
(45) Date of Patent: *Jun. 17, 2025

(54) FOLDING TONNEAU COVER HAVING SECURED FLEXIBLE HINGE

(71) Applicant: Agri-Cover, Inc., Jamestown, ND (US)

(72) Inventors: Charles M. Schmeichel, Jamestown, ND (US); Brendan T. Bohn, Jamestown, ND (US); Mark E. Beam, Jamestown, ND (US); John W. Simon, Burnsville, MN (US)

(73) Assignee: Agri-Cover, Inc., Jamestown, ND (US)

( * ) Notice: Subject to any disclaimer, the term of this patent is extended or adjusted under 35 U.S.C. 154(b) by 471 days.

This patent is subject to a terminal disclaimer.

(21) Appl. No.: 17/712,885

(22) Filed: Apr. 4, 2022

(65) Prior Publication Data

US 2022/0219516 A1 Jul. 14, 2022

Related U.S. Application Data

(63) Continuation of application No. 16/865,132, filed on May 1, 2020, now Pat. No. 11,292,324, which is a
(Continued)

(51) Int. Cl.
*B60J 7/19* (2006.01)
*B60J 7/14* (2006.01)
(Continued)

(52) U.S. Cl.
CPC ............... *B60J 7/198* (2013.01); *B60J 7/141* (2013.01); *B60J 7/041* (2013.01); *B60J 7/1621* (2013.01)

(58) Field of Classification Search
CPC ... B60J 7/141; B60J 7/198; B60J 7/041; B60J 7/1621
(Continued)

(56) References Cited

U.S. PATENT DOCUMENTS 4,844,531 A 7/1989 Kooiker
5,427,428 A * 6/1995 Ericson .................... B60J 7/141
296/100.09

(Continued)

*Primary Examiner* — Amy R Weisberg
*Assistant Examiner* — Dana D Ivey
(74) *Attorney, Agent, or Firm* — Robert C. Freed; Dykema Gossett PLLC

(57) ABSTRACT

A folding tonneau cover apparatus including a cover assembly and a support frame assembly. The cover assembly having a plurality of rigid panels interconnected in series by a series of flexible hinges. Elongated support members having hinge support flanges help to secure the flexible hinges to the rigid panels. In preferred embodiments, the support flanges of the elongated support members cooperate with the underside of the respective rigid panels to which the support members are secured, to form a partial enclosure within which a side portion of the respective flexible hinge is secured. The cover assembly is secured to the support frame assembly to cover a cargo box of a pickup truck by a plurality of locking members when the support frame assembly is secured to sidewalls of the cargo box. Methods of making a tonneau cover apparatus and methods of folding and unfolding the cover assembly are also disclosed.

56 Claims, 60 Drawing Sheets

Related U.S. Application Data continuation-in-part of application No. 16/252,345, filed on Jan. 18, 2019, now Pat. No. 11,235,652, which is a continuation of application No. 15/794,549, filed on Oct. 26, 2017, now Pat. No. 10,189,340.

(60) Provisional application No. 62/845,086, filed on May 8, 2019, provisional application No. 62/843,357, filed on May 3, 2019, provisional application No. 62/414,591, filed on Oct. 28, 2016.

(51) Int. Cl.
  *B60J 7/04* (2006.01)
  *B60J 7/16* (2006.01)

(58) Field of Classification Search
  USPC .................................... 296/100.07, 100.09
  See application file for complete search history.

(56) References Cited

U.S. PATENT DOCUMENTS

| | | | |
|---|---|---|---|
| 6,352,296 B1* | 3/2002 | Kooiker | B60J 7/141 |
| | | | 296/100.09 |
| 6,808,220 B2 | 10/2004 | Wheatley | |
| 9,895,963 B1* | 2/2018 | Spencer | B60J 7/141 |
| 10,189,340 B2* | 1/2019 | Schmeichel | B60J 7/141 |
| 11,235,652 B2* | 2/2022 | Schmeichel | B60J 7/198 |
| 11,292,324 B2* | 4/2022 | Schmeichel | B60J 7/141 |
| 2008/0129077 A1* | 6/2008 | Weldy | B60J 7/141 |
| | | | 296/136.03 |
| 2023/0121434 A1* | 4/2023 | Schmeichel | B60J 7/141 |
| | | | 296/100.07 |

\* cited by examiner

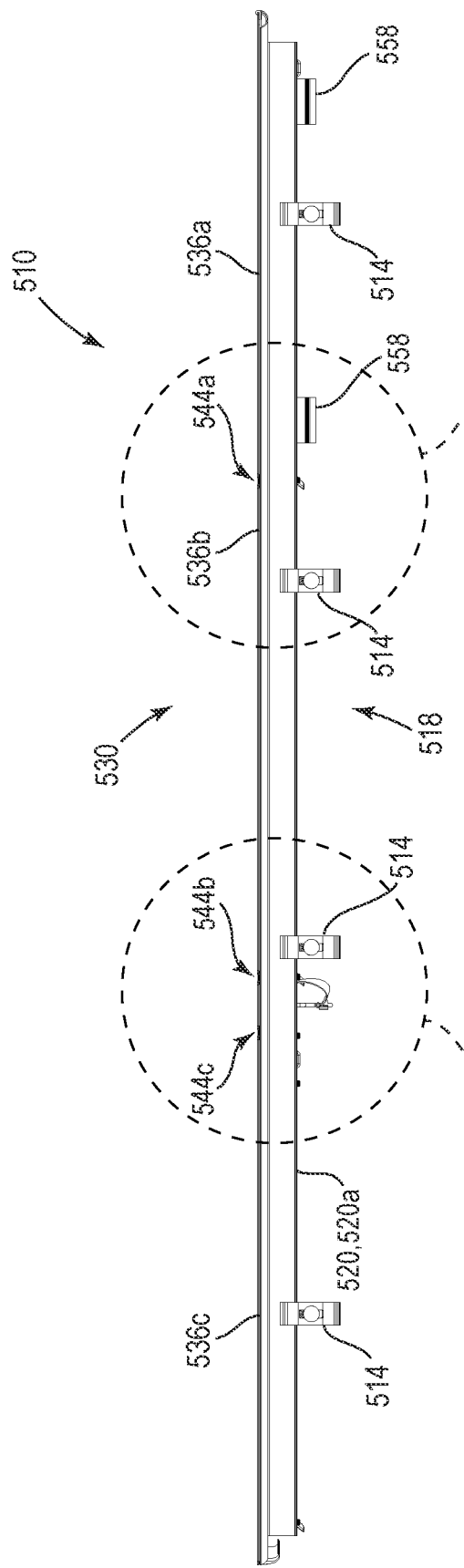

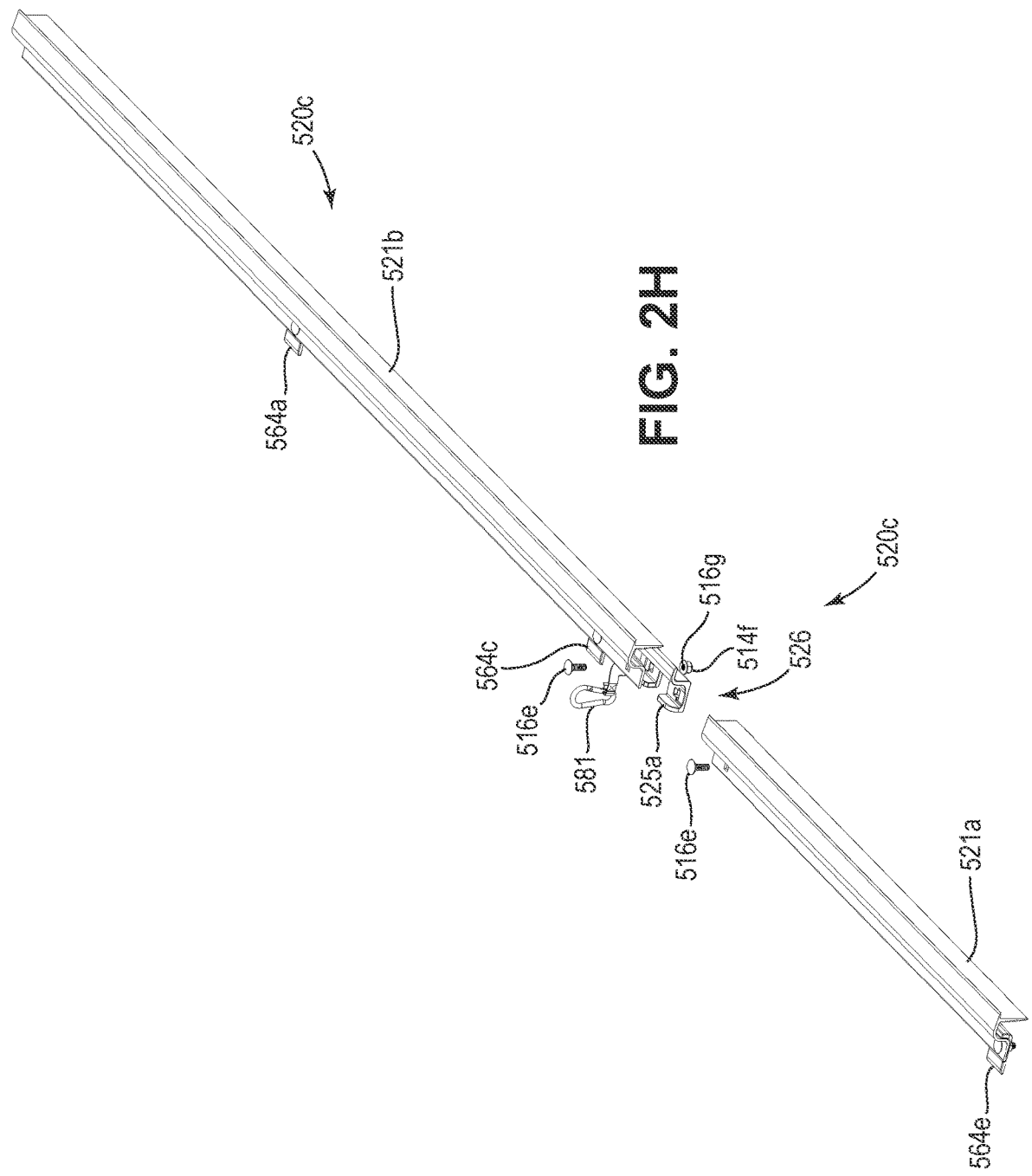

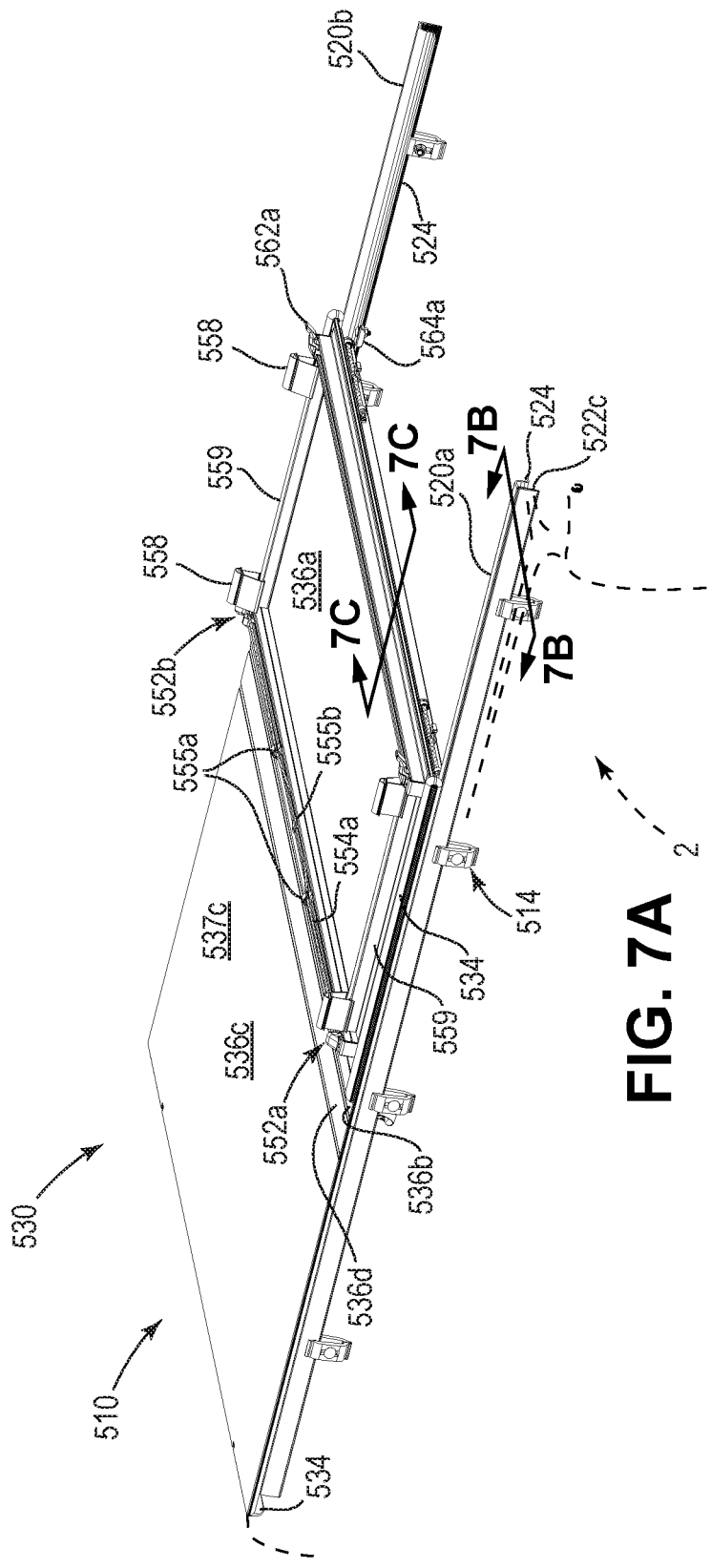

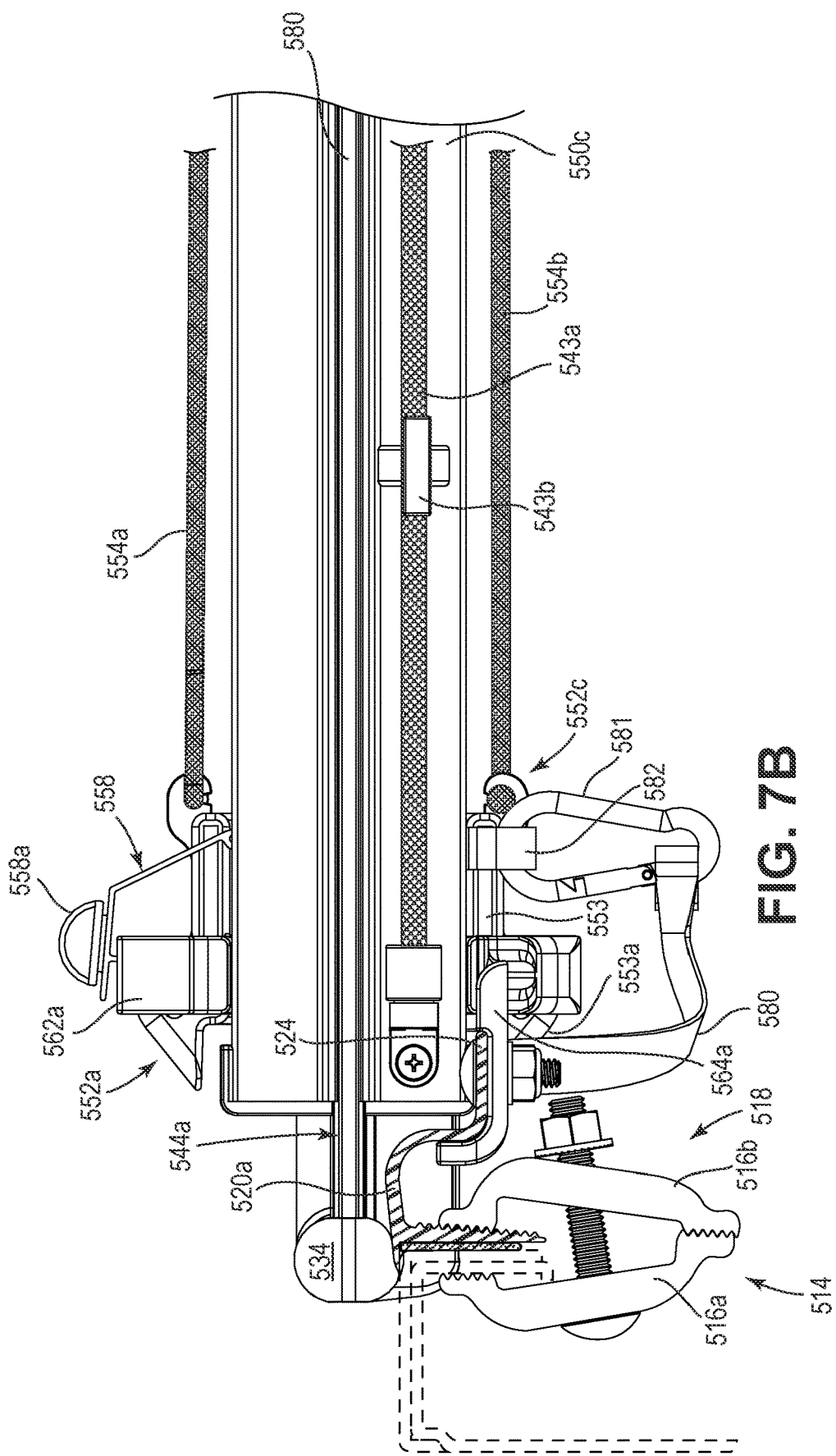

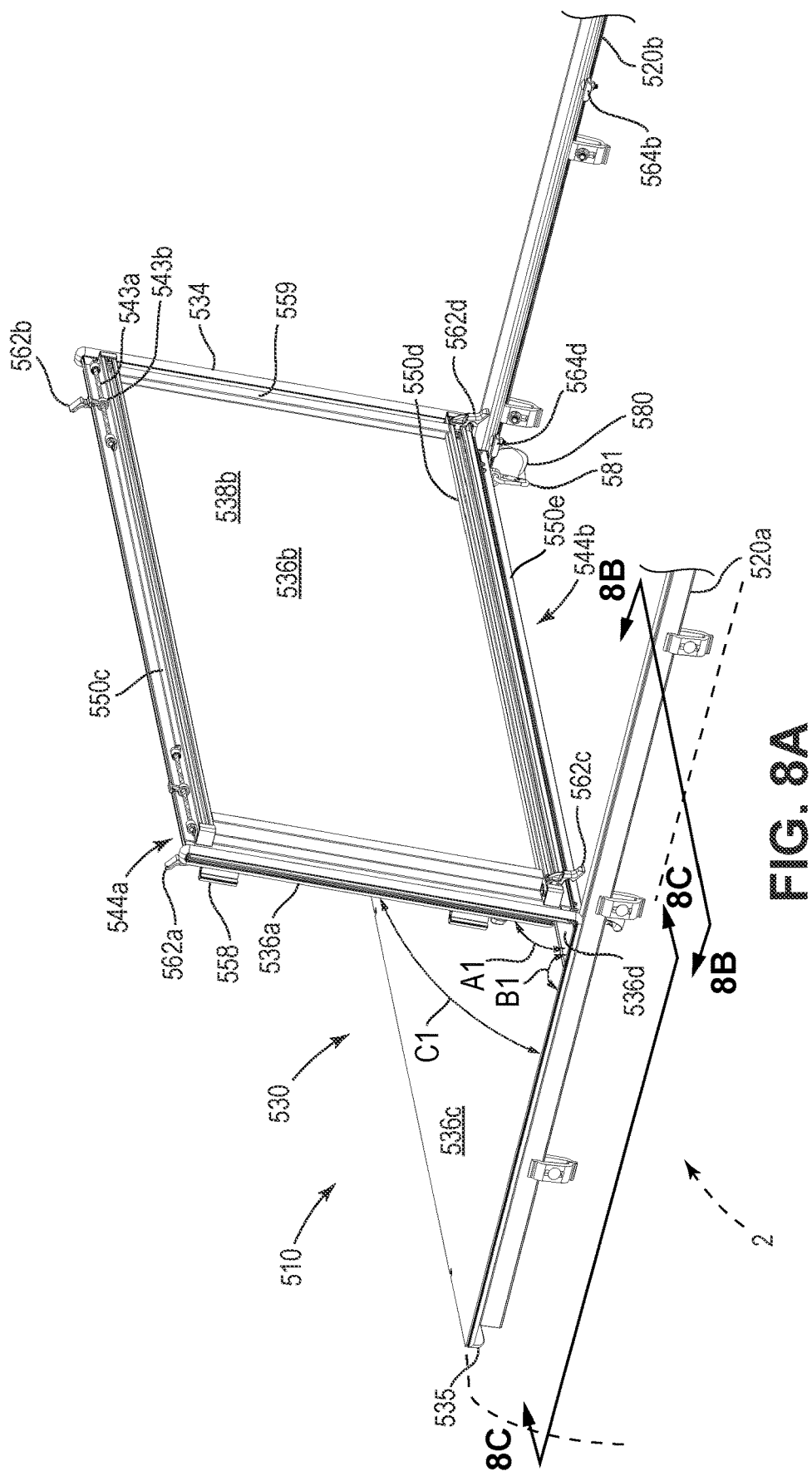

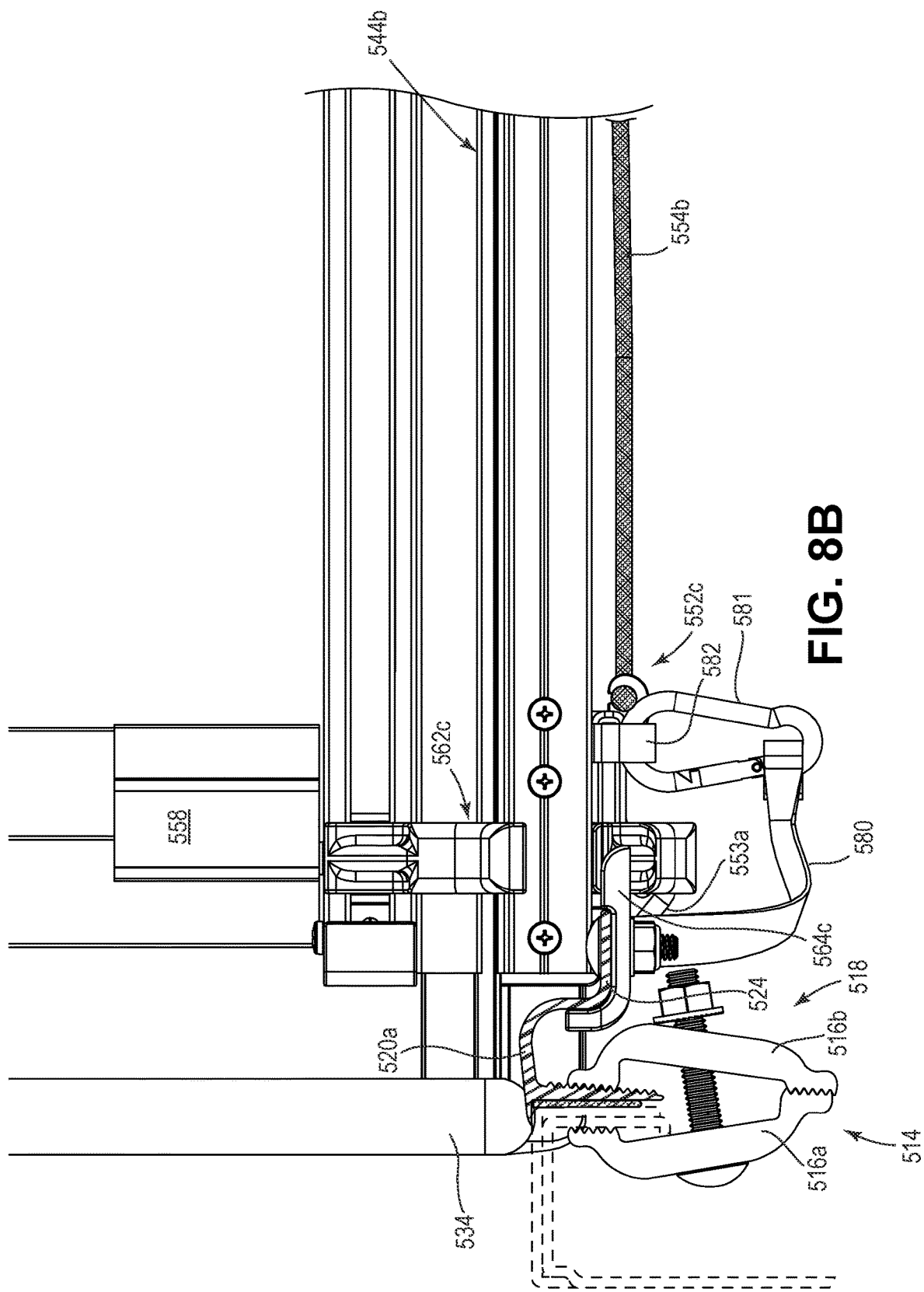

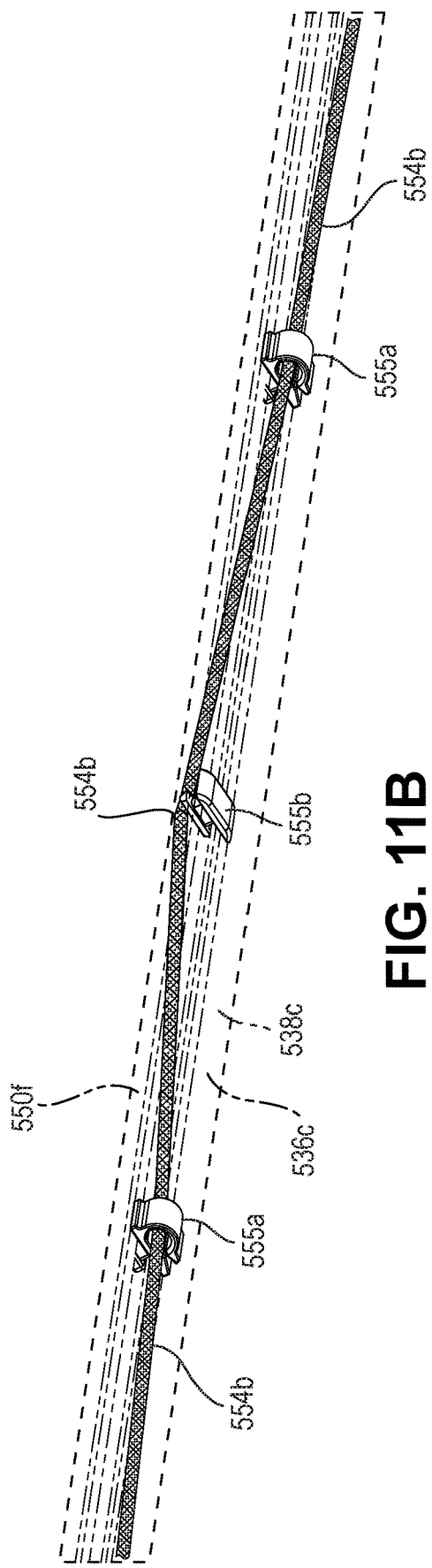

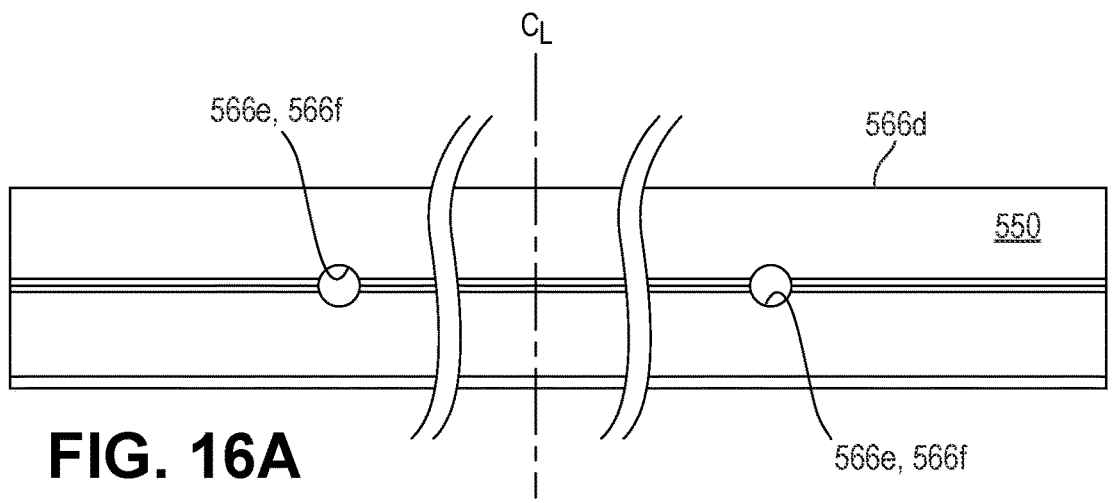
FIG. 16A
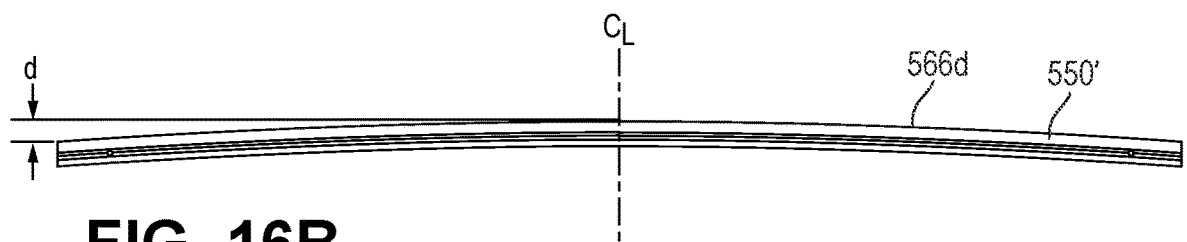
FIG. 16B
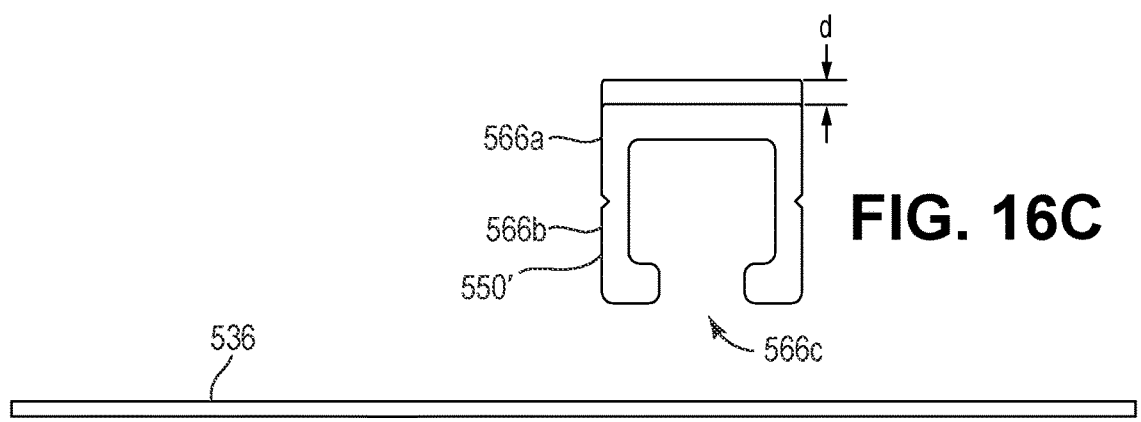
FIG. 16C
FIG. 16D
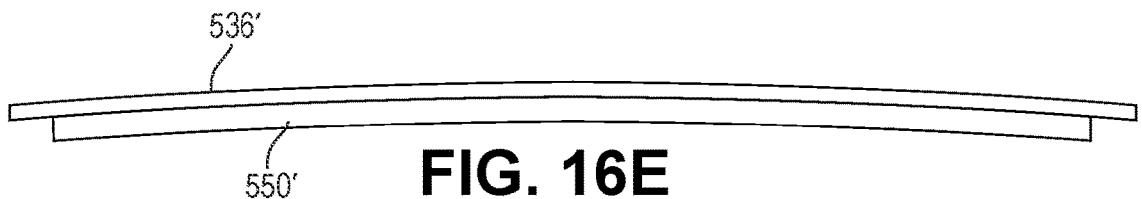
FIG. 16E

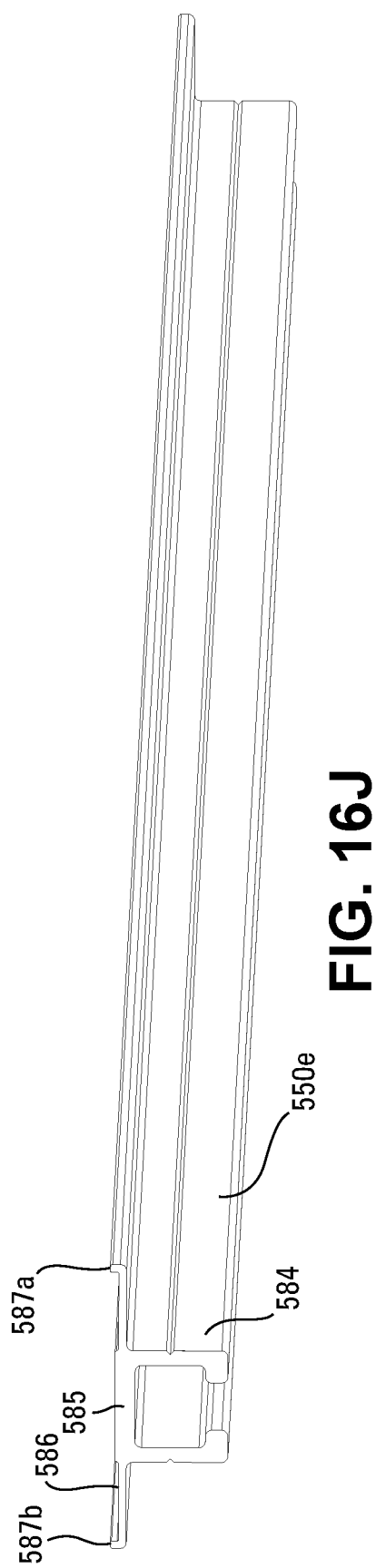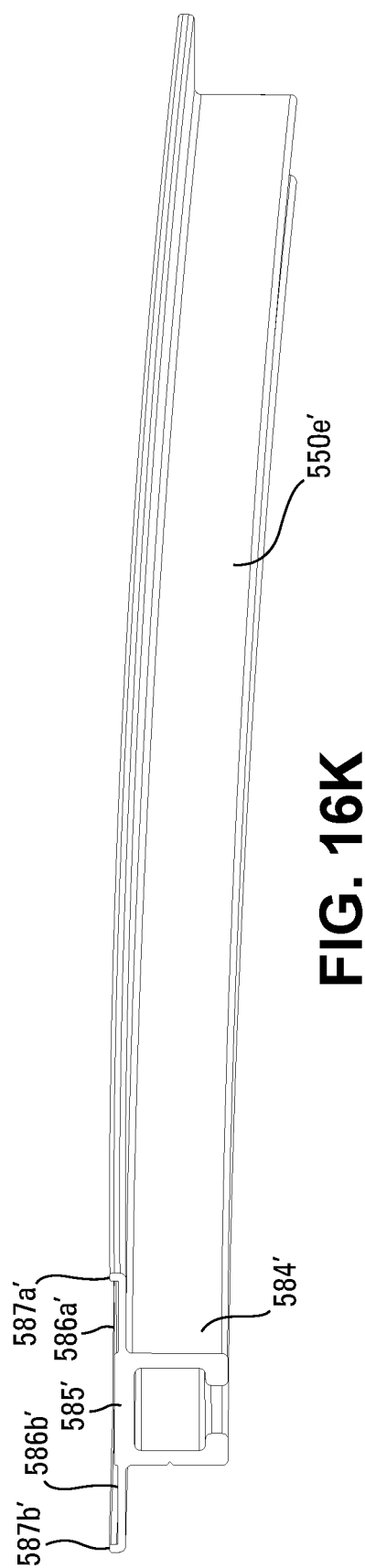

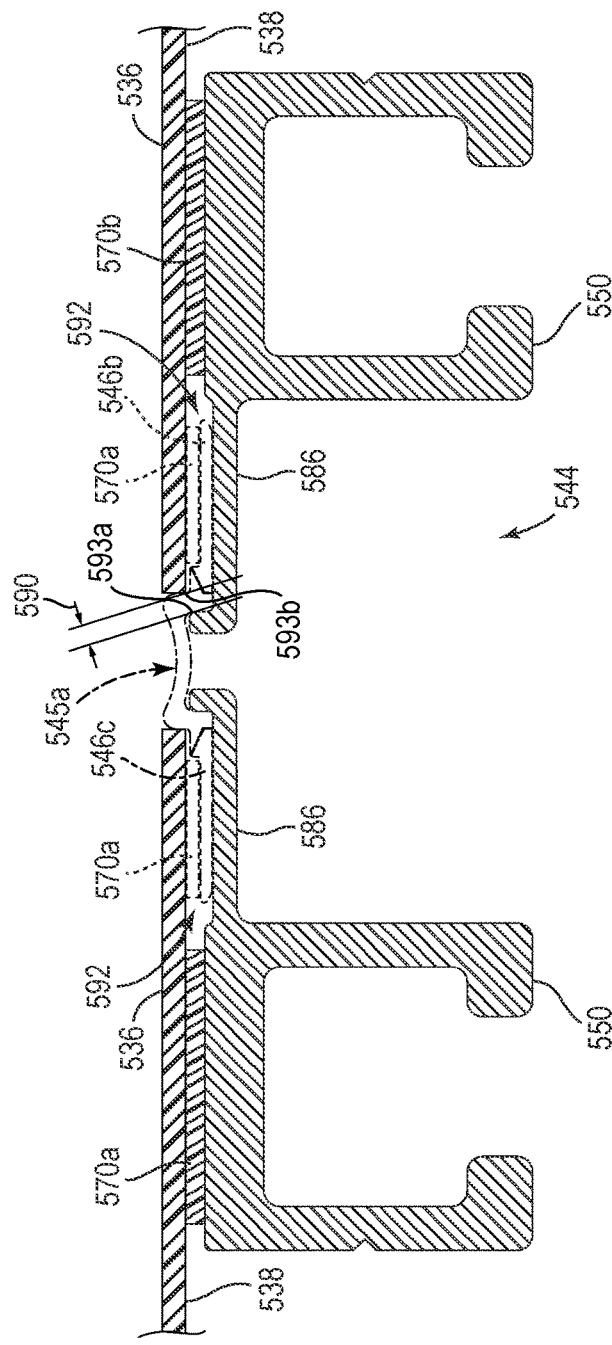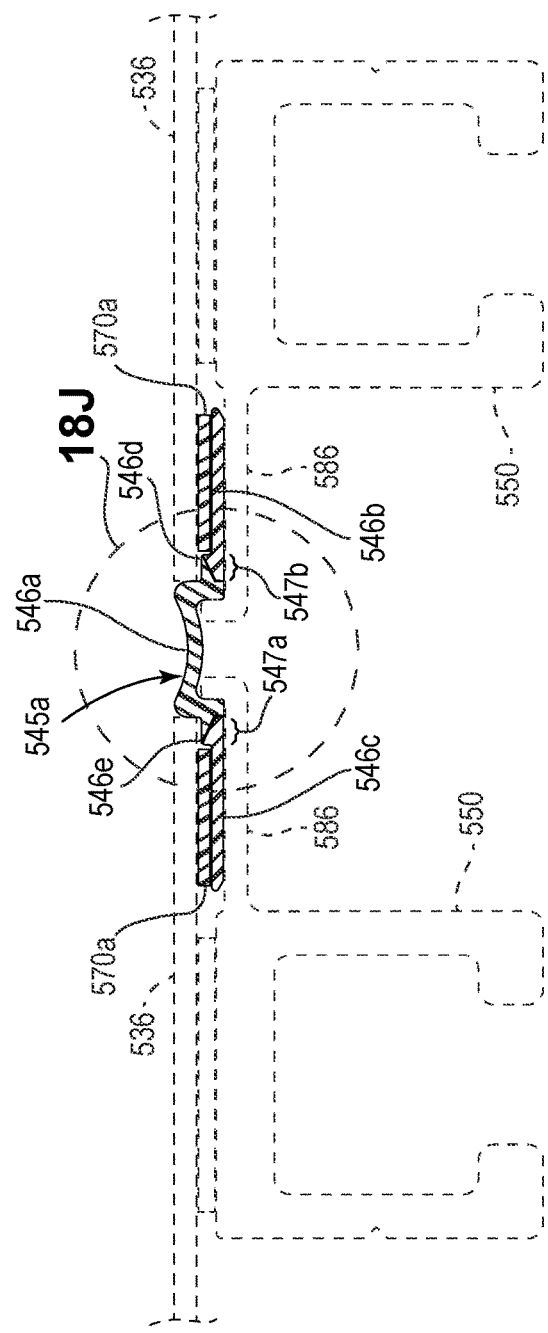

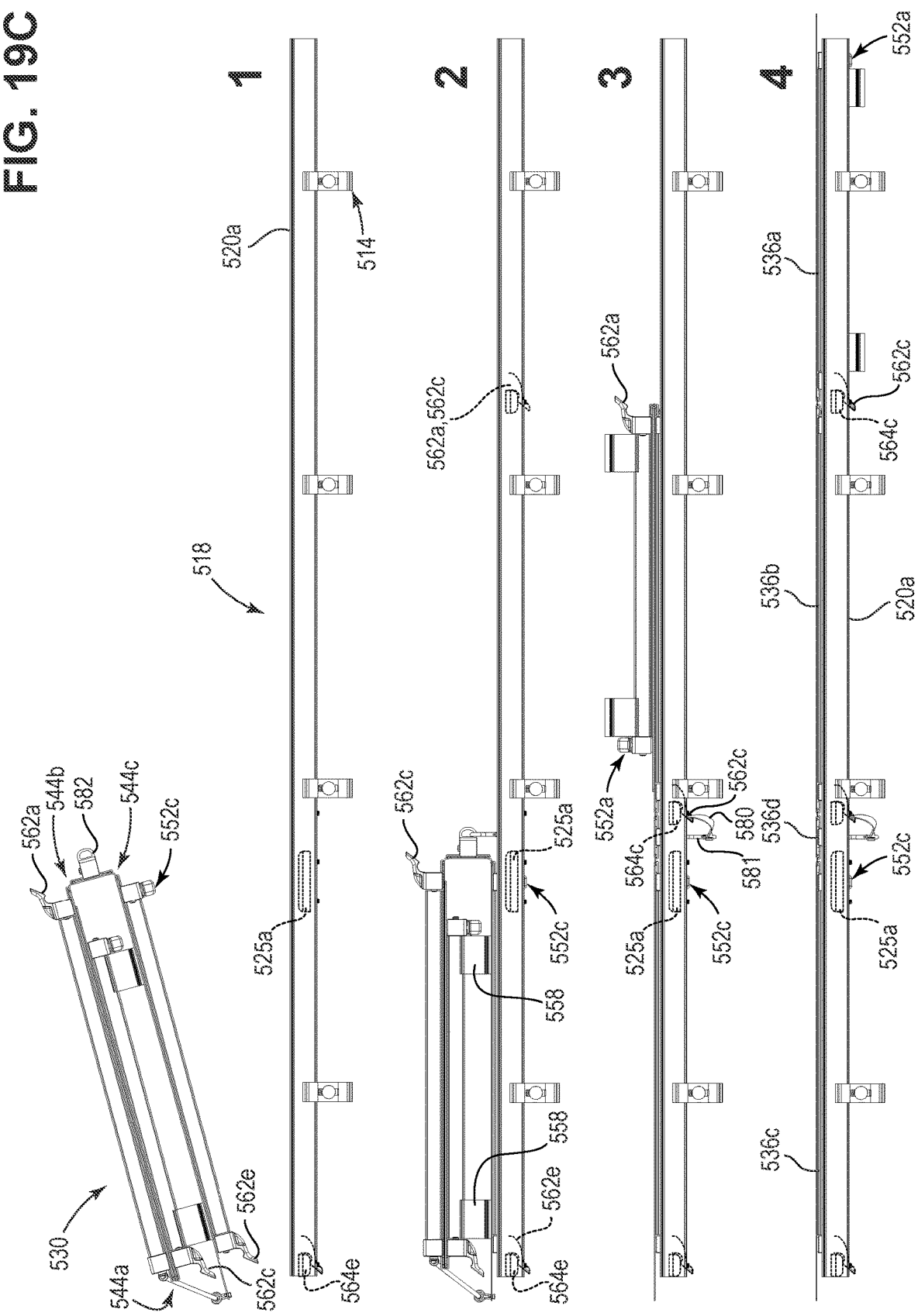

FOLDING TONNEAU COVER HAVING SECURED FLEXIBLE HINGE

RELATED APPLICATIONS

This application is a continuation of U.S. application Ser. No. 16/865,132, filed on May 1, 2020, which is a continuation-in-part of U.S. application Ser. No. 16/252,345, filed on Jan. 18, 2019, now U.S. Pat. No. 11,235,652, which is a continuation of U.S. application Ser. No. 15/794,549, filed on Oct. 26, 2017, now U.S. Pat. No. 10,189,340, which claims the benefit of U.S. Provisional Application No. 62/414,591, filed on Oct. 28, 2016; this application also claims the benefit of U.S. Provisional Application No. 62/845,086, filed on May 8, 2019, and U.S. Provisional Application No. 62/843,357, filed on May 3, 2019, which applications are incorporated herein by reference in their entirety.

FIELD OF THE INVENTION

A tonneau cover apparatus for covering an open bed or cargo box of a pickup truck or other truck or trailer. Particularly, a tonneau cover apparatus including a folding cover assembly having a plurality of panels that are interconnected in series by a series of hinges in such a manner that the respective panels can pivot with respect to one another, so as to fold up and unfold, and which is detachably fastenable to a support frame assembly including a pair of side rails, each of which is secured to one of two opposing sidewalls of the cargo box.

DESCRIPTION OF THE RELATED ART

Numerous protective cover assemblies for preventing rain, debris and wind from damaging or disrupting the contents of a pickup truck bed or cargo box are currently available. Among these protective cover assemblies are tonneau covers. Some tonneau covers are made of a fabric material, often a fabric coated with a polymeric material, which is fastened to a rigid frame so as to enclose and protect the pickup truck cargo box. Various covering materials are used for such tonneau covers; some are flexible and/or stretchable, and others are more rigid, and they are secured to the pickup truck in various manners to cover the cargo box. Tonneau covers are opened in various manners to allow entry into the cargo box, such as by rolling the cover up, folding the cover up, pivoting the cover upward from a location proximate the cab, or disconnecting and removing the cover from the cargo box altogether.

Typical tonneau covers have support frames including a pair of elongated side rails that are secured to the sidewalls of the cargo box of the pickup truck. Known tonneau covers are often secured to the side rails using hook and loop strip fastener components secured to the side rail, typically within a horizontal channel (see, e.g., U.S. Pat. Nos. 4,036,521; 4,991,640; 6,752,449 and U.S. Patent Application Pub. No. 2004/0212212 A1). Some tonneau covers are secured to the side rails by latches (see. e.g., U.S. Pat. No. 7,104,586). Some tonneau covers include rigid panels which are folded up for cargo access (see e.g., U.S. Pat. No. 10,189,340).

The present invention provides improvements that address limitations associated with the prior art.

SUMMARY OF THE INVENTION

The present invention preferably includes a tonneau cover apparatus for removable attachment about a top of a perimeter of a cargo box of a pickup truck, the top of the perimeter of the cargo box including a forward end, two opposing sidewalls and a tailgate, the tailgate being positioned rearward of the forward end and having an open position and a closed position, the tonneau cover apparatus including: a support frame assembly for attachment to the cargo box; and a cover assembly for attachment to the support frame assembly when the support frame assembly is attached to the cargo box; the cover assembly preferably including a plurality of rigid panels and a flexible hinge; wherein the plurality of rigid panels include first and second panels flexibly secured to one another by the flexible hinge; the flexible hinge having a center portion, two side portions and two intermediate portions; wherein each of the respective intermediate portions separately interconnect one of the respective side portions to the center portion; wherein the cover assembly preferably further includes an elongated support member secured to an underside of one of the rigid panels; wherein the elongated support member has a main portion and a flange; wherein the main portion has an upper portion that is secured to an underside of the respective rigid panel and the flange extends away from the upper portion such that the flange resides at least partially below the respective underside and at least a portion of one of the two side portions; wherein the flange and the underside of the respective rigid panel preferably cooperate to form a partial enclosure within which the side portion is secured; and wherein the flange preferably has a lip and wherein the lip preferably extends toward the outer edge of the rigid panel so as to form a partial enclosure to retain at least a portion of the intermediate portion and the side portion of one side of the flexible hinge; and wherein at least a portion of the intermediate portion of the flexible hinge has a thickness that is greater than a gap between the outer edge of the rigid panel and any point on the outer surface of the lip of the support flange.

In a further embodiment, the present invention provides a tonneau cover apparatus for removable attachment about a top of a perimeter of a cargo box of a pickup truck, the top of the perimeter of the cargo box including a forward end, two opposing sidewalls and a tailgate, the tailgate being positioned rearward of the forward end and having an open position and a closed position, the tonneau cover apparatus including a support frame assembly for attachment to the cargo box; and a cover assembly for attachment to the support frame assembly when the support frame assembly is attached to the cargo box; the cover assembly including a plurality of rigid panels and a flexible hinge; wherein the plurality of rigid panels preferably include first and second panels flexibly secured to one another by the flexible hinge; the flexible hinge having a center portion, two side portions and two intermediate portions; wherein each of the respective intermediate portions separately interconnect one of the respective side portions to the center portion; and wherein each of the respective rigid panels have an underside, a topside and a perimeter surface surrounding a perimeter of each of the respective rigid panels; wherein a first portion of the perimeter surface of the respective rigid panel converges with a first section of the respective underside proximate the flexible hinge securing the first rigid panel to the second ridged panel to form a first edge that runs generally parallel to a length of the flexible hinge; wherein the cover assembly further includes an elongated support member secured to the respective underside of one of the respective rigid panels proximate the first edge; wherein the elongated support member has a main portion and a flange and the main portion has an upper portion that is secured to the respective underside of the respective rigid panel and the flange has an extended portion that extends away from the upper portion and resides below the underside when the support member is secured to the respective underside and a lip portion which runs generally parallel to the first edge and extends upward from the extended portion so as to reduce a width of a gap between the lip portion and the first edge such that the proximate portion of the flange resides at least partially below the respective underside proximate the first edge of the respective rigid panel so as to cooperate with the respective underside to form a partial enclosure in which at least a portion of the side portion of the respective hinge resides.

In a further embodiment of the present invention, a tonneau cover apparatus is provided for removable attachment about a top of a perimeter of a cargo box of a pickup truck, the top of the cargo box including a forward end, two opposing sidewalls and a tailgate, the tailgate being positioned rearward of the forward end and having an open position and a closed position, the tonneau cover apparatus including a support frame assembly for attachment to the cargo box; and a cover assembly for attachment to the support frame assembly when the support frame assembly is attached to the cargo box; the cover assembly including a plurality of rigid panels and a flexible hinge; wherein the plurality of rigid panels include first and second panels flexibly secured to one another by the flexible hinge; the flexible hinge having a center portion, two side portions and two intermediate portions; wherein each of the respective intermediate portions separately interconnect one of the respective side portions to the center portion; wherein the cover assembly further includes two elongated support members, each of which is secured to an underside of one of the rigid panels; wherein each of the elongated support members has a main portion and a flange; wherein the main portion has an upper portion that is secured to an underside of one of the respective rigid panels and the flange extends away from the upper portion such that the flange resides at least partially below the respective underside proximate an outer edge of the respective rigid panel when the respective elongated support member is secured to the respective rigid panel; wherein the respective flange and the underside of the respective rigid panel cooperate to form a partial enclosure within which one of the respective side portions of the flexible hinge is secured; wherein the flexible hinge is secured to the respective first and second rigid panels within respective first and second partial enclosures.

In yet another embodiment of the present invention, a tonneau cover apparatus is provided for removable attachment about a top of a perimeter of a cargo box of a pickup truck, the top of the cargo box including a forward end, two opposing sidewalls and a tailgate, the tailgate being positioned rearward of the forward end and having an open position and a closed position, the tonneau cover apparatus including a support frame assembly for attachment to the cargo box; and a cover assembly for attachment to the support frame assembly when the support frame assembly is attached to the cargo box; the cover assembly including a plurality of rigid panels and a flexible hinge; wherein the plurality of rigid panels include first and second panels flexibly secured to one another by the flexible; the flexible hinge having a center portion, two side portions and two intermediate portions, each of which extend a length of the flexible hinge, wherein each of the respective intermediate portions separately interconnect one of the respective side portions to the center portion; wherein the center portion is at least partially concave.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include parts corresponding to the parts in the previously described embodiment;

FIG. 2C is a side view of the folding tonneau cover apparatus of FIG. 1 as viewed from line 2C-2C of FIG. 2A which illustrates the driver's side of the pickup truck shown in FIG. 1; however, for clarity of illustration, the perimeter seal on the underside of the outer edge of the respective panels is not shown;

FIG. 2H is an exploded perspective view of an alternative driver's-side split side rail, that is a mirror image of the passenger side split side rail shown in FIG. 2G, both of which have a plurality of sections which are joined together by a driver's side containment bracket;

FIG. 7A is a rear perspective view of the folding tonneau cover apparatus of FIG. 1 wherein the rear panel has been rotated forward onto the middle panel in a further step toward folding up the cover assembly;

FIG. 7B is a partial section view as seen from the line 7B-7B of FIG. 7A showing the engaging portion of the swing latch 562*a* disengaged from the catch 564*a;*

FIG. 8A is a rear perspective view of the folding tonneau cover apparatus of FIG. 1, wherein the rear panel is folded over onto the middle panel and wherein both panels have been lifted up and pivoted forward generally about 90 degrees with respect to the front panel that is resting on the side rails and is generally in a horizontal plane with respect to the pickup truck shown in part in phantom;

FIG. 8B is a partial section view as seen from the line 8B-8B of FIG. 8A showing the swing latch 562*c* near the driver's-side end portion of the support bow of the spacer panel disengaged from the corresponding catch 564*c;*

FIG. 11B is a partial view of the portion of the folding tonneau cover apparatus of FIG. 1 shown in the dashed rectangle 11B of FIG. 11A, illustrating clip cord guides and a retainer cord guide and a corresponding release cord along a support bow, with the support bow shown in phantom to reveal the underlying structures;

FIG. 16A illustrates a front view of a support bow or support member;

FIG. 16B illustrates an alternate support bow similar to the support bow of FIG. 16A, but wherein the alternate support bow has a slight bend or deflection of the support bow making its upper surface curved downwardly at the ends;

FIG. 16C is an end view of the support bow of FIG. 16B showing the deflection d;

FIG. 16D is a schematic illustration of a front view of a rigid panel 536' of the folding tonneau cover of FIG. 1;

FIG. 16E is a schematic illustration of a rigid panel of FIG. 16D after being attached to the support bow of FIG. 16B, causing the panel to have a slight downwardly concave curvature reflecting the deflection of the alternate support bow of FIG. 16B;

FIG. 16J is a perspective view of a straight support bow having two hinge support flanges;

FIG. 16K is a perspective view of a curved support bow having two hinge support flanges and a downward deflection;

FIG. 18H is an enlarged view providing a transverse vertical cross section of the portion of the folding tonneau cover assembly shown in FIG. 18A, but showing the hinge body 545a in phantom;

FIG. 18I is an enlarged view similar to that shown in FIG. 18H, except that the hinge body 545a is shown in cross section and the rigid panels 536 and the support bows 550 are shown in phantom;

FIG. 19C is a schematic illustration of steps and configurations of the folding tonneau cover apparatus of FIG. 1 showing the folding cover assembly being installed onto the side rails, showing the hooks at the front of the front panel approaching the catches at the front of the side rails, then the hooks at the front of the front panel engaged with the catches at the front of the side rails and the latches at the rear of the front panel engaged with the side rails and the respective containment brackets, then the spacer panel and middle panel unfolded with the hooks at the front of the middle panel engaged with the respective catches on the side rails, then the rear panel unfolded with the hooks at the front of the rear panel engaged with the respective catches on the side rails and the latches at the rear of the rear panel engaged with the respective side rails and containment brackets;

DETAILED DESCRIPTION OF THE PREFERRED EMBODIMENTS

Figure 1:
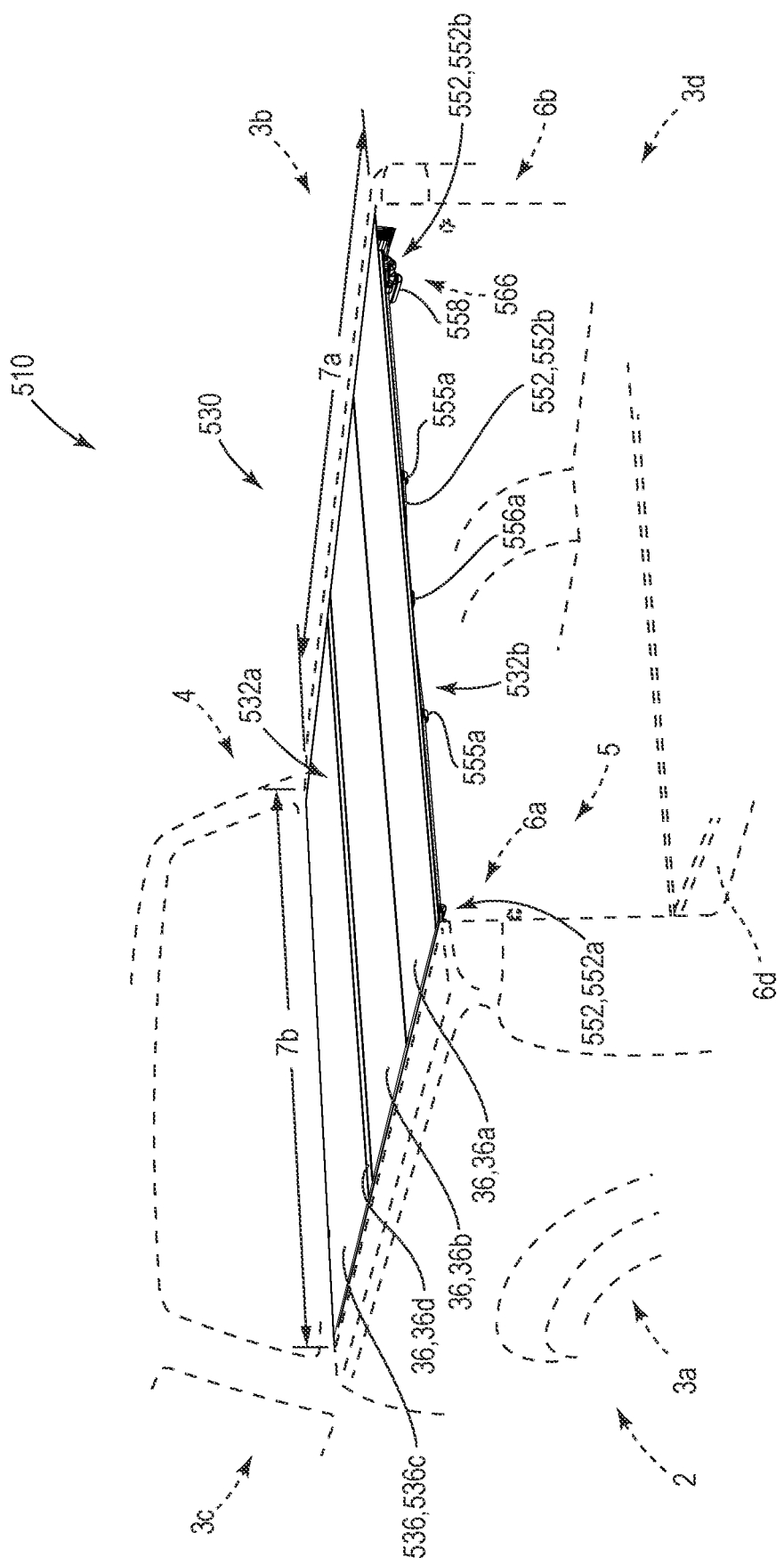
FIG. 1 is a rear perspective view of a folding tonneau cover apparatus according to the present invention, including a folding cover assembly and a support frame assembly, and shown attached to a pickup truck which is shown in phantom.

Referring now to the drawings, a folding tonneau cover apparatus 510 of the present invention is attachable to sidewalls 6a, 6b of a cargo box 5, such as the cargo box of a truck or pickup truck 2, which is shown in phantom. In FIG. 1, the folding tonneau cover apparatus 510 is shown in a typical application covering the top opening 6f (shown in phantom in FIG. 12) of the cargo box 5 of the pickup truck 2. The pickup truck 2 and the cargo box 5 and the sidewalls 6a and 6b and the front wall 6c (FIG. 12) at the forward end of the cargo box 5 and the tailgate 6d at the rear end of the cargo box 5 are not a part of the present invention, but are shown in phantom to illustrate a typical application and function of the folding tonneau cover apparatus 510 in covering a cargo box 5, which has a length 7a and a width 7b. The perimeter of the cargo box 5 includes the forward end or front wall 6c, the opposing sidewalls 6a and 6b, and the rearward end or tailgate 6d, which is shown in part. The rearward end or tailgate 6d preferably can be opened or closed. It will be appreciated that the perimeter of the top opening of the cargo box 5 will include top surfaces of the front wall 6c, the two sidewalls 6a, 6b, and the tailgate 6d when the tailgate is in a closed position (not shown). As further illustrated in FIGS. 2A-3B, the folding tonneau cover apparatus 510 includes a folding tonneau cover assembly, tonneau cover assembly or cover assembly 530 and a support frame assembly 518, including side rails or rails 520a and 520b. In preferred embodiments, side rails 520a and 520b are secured to sidewalls 6a and 6b with clamps

514. In preferred embodiments, the folding cover assembly 530 is configured to be opened to an open position and closed to a closed position, and easily removed and reinstalled by a driver or other operator 8 (FIG. 12), as needed. The side rails 520a and 520b are constructed and arranged to facilitate securement of the folding cover assembly 530 to the side rails 520a and 520b. In some embodiments, the side rails 520a and 520b have a side rail lip 524 and a side rail engagement portion 522a. In this example, there are eight clamps 514 arranged to hold the side rails 520a and 520b to the sidewalls 6a, 6b of the pickup truck 2, but other numbers of clamps 514 can be used. In some embodiments, the clamps include an outer member 516a, an inner member 516b, a clamp engagement portion 516c, and a fastener assembly 516d; the fastener assembly can, for example, include a bolt 516e, a washer 516f and a nut 516g as illustrated.

Figure 2A:
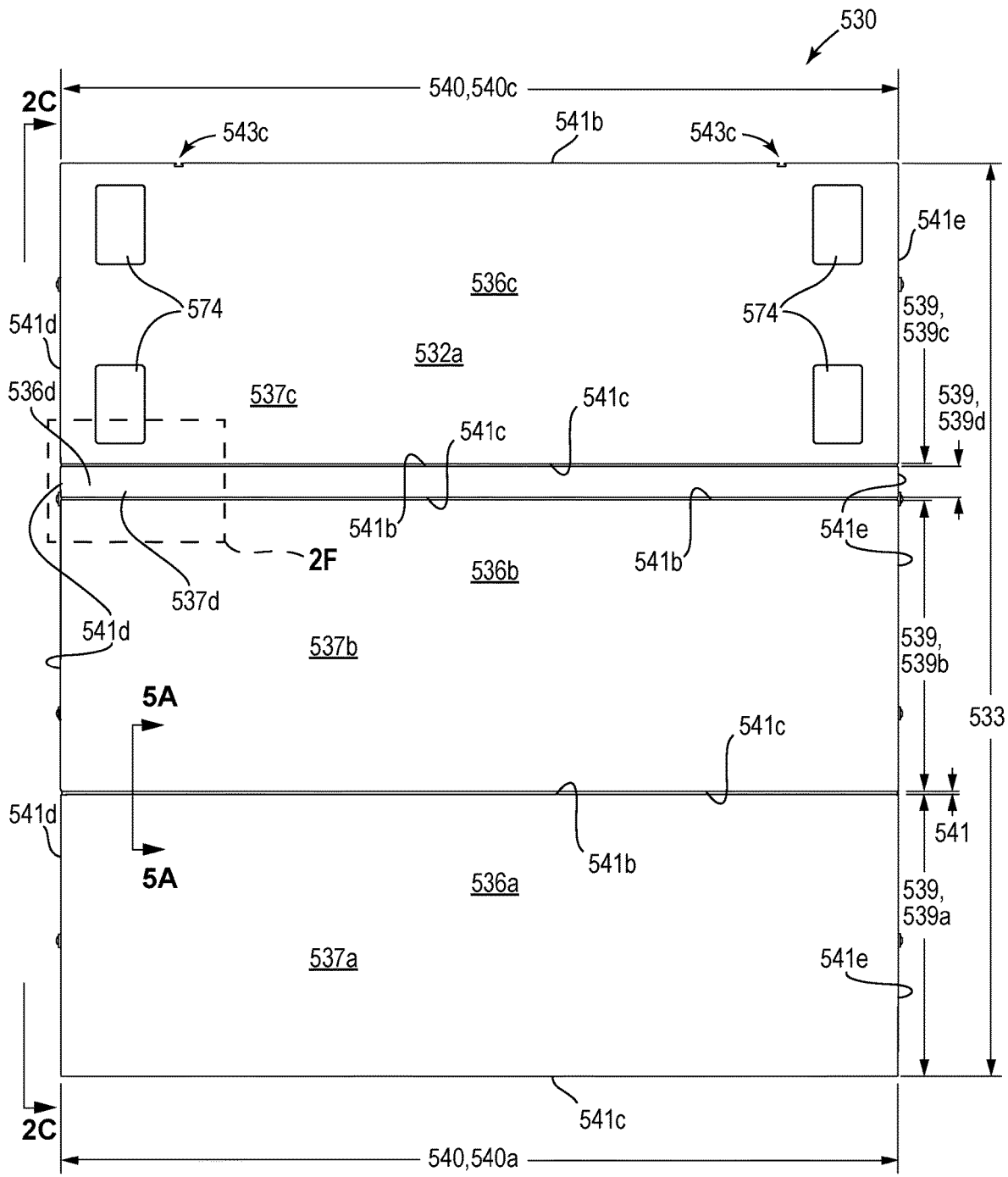
FIG. 2A is a top plan view showing the folding tonneau cover assembly shown in FIG. 1 and also showing a protective film 574 on the top surface of the front panel 536c, that is not shown in subsequent Figures, with the exception of FIGS. 9A, 10A, and 10B where the protective film shown is again shown.

Referring again to FIGS. 2A-2C, the folding tonneau cover apparatus 510 of FIG. 1 is shown in whole or in part, but the truck 2 and the cargo box 5 are not shown. FIG. 2A shows a top view of the folding tonneau cover assembly 530 of FIG. 1. The top 532a of the folding cover assembly 530 is shown. The folding cover assembly 530 includes rigid panels or panels 536. In this example, panels 536 include a rear panel 536a, a middle panel 536b, a front panel 536c, and a spacer panel or hinge panel 536d. For ease of discussion, panels 536 are specifically referenced herein as 536a-536d, and non-specifically or collectively referenced as rigid panels 536. The folding cover assembly 530 includes a plurality of such rigid panels 536, and could potentially have from two to 8 panels 536; for example, 6 panels 536 could be used, including 4 "longer" panels (similar to panels 536a-536c shown herein) and 2 "shorter" panels (similar to panels 536d shown herein). While a smaller or a larger number of panels 536 can be used (not shown), the inventors have found that the configurations illustrated herein provide a good trade-off of convenient folded configuration vs. complexity.

As shown in FIG. 2A, and also as further described herein with respect to FIGS. 20A-20E, the length 539 of each of the panels 536a-536d is indicated as 539a-539d, respectively. In this example, the spacer panel 536d has a substantially smaller length 539d than the other panels, as will be further described herein. In preferred embodiments, the length 539d of the spacer panel 536d is preferably no greater than about one-third of the length 539a-539c of the other panels 536a-536c. Panels 536a-536d can have similar length 539, or the length of some or all of panels 536a-536d can differ. The width 540 of each of the panels 536a-536d is indicated as 540a-540d, respectively. Panels 536a-536d can have the same width 540, or the width of some or all of panels 536a-536d can differ. The side angle 542 of each of the panels 536a-536d is indicated as 542a-542d, respectively, in FIG. 20A. Panels 536a-536d can have the same side angle 542, or the side angle 542 of some or all of panels 536a-536d can differ. Alternative configurations of folding tonneau covers 530 appropriate for covering the cargo box 5 of various models of pickup truck 2 are further described below. Each panel 536 has a top surface 537 and a bottom surface or underside 538; panel 536a has a top surface 537a and a bottom surface or underside 538a, panel 536b has a top surface 537b and a bottom surface or underside 538b, panel 536c has a top surface 537c and a bottom surface or underside 538c, panel 536d has a top surface 537d and a bottom surface or underside 538d.

As further described herein and illustrated in drawing FIGS. 2A-5F, the present invention includes a folding tonneau cover assembly 530 having a plurality of rigid panels 536 arranged in a series, with adjacent rigid panels 536 secured to each other by a flexible hinge 544, so that the folding cover tonneau cover assembly 530 can be unfolded to cover a top opening 6f (FIG. 12) of a cargo box 5 of a truck 2, and folded up to uncover at least a portion of the top opening 6f of the cargo box 5 of the truck 2. Each rigid panel 536 has a front edge 541b and a rear edge 541c and a driver's side edge 541d and a passenger side edge 541e and a top surface 537 and a bottom surface or underside 538. When the folding tonneau cover assembly 530 is unfolded and arranged to cover the top opening 6f of the cargo box 5, each of the rigid panels 536 extends between the driver's side 3a and the passenger side 3b of the cargo box 5, and each flexible hinge 544 extends between the driver's side and the passenger side of the cargo box. In embodiments having 4 rigid panels 536, for example, there are 3 flexible hinges 544, each flexible hinge 544 being secured to two adjacent rigid panels 536. Other configurations are possible, including embodiments having two rigid panels 536 and one flexible hinge 544, embodiments having three rigid panels 536 and two flexible hinges 544, embodiments having five rigid panels 536 and four flexible hinges 544, embodiments having six rigid panels 536 and five flexible hinges 544, and so forth. In preferred embodiments, the number of rigid panels 536 is 1 greater than the number of flexible hinges 544; alternative embodiments include folding tonneau cover assemblies 530 having at least three rigid panels 536 and at least one flexible hinge 544, as described herein, and at least one other hinge or connection as may be known in the art (not shown) have been envisioned by the inventors. The present invention includes such embodiments, as long as the embodiments include at least one flexible hinge 544 as described herein.

Also illustrated in FIG. 2A, is a protective film 574 on the top surface 537c of the front panel 536c. As described further herein and illustrated in FIGS. 2A, 9A, 10A, and 10B, alternate embodiments of the folding tonneau cover assembly 530 include the protective film 574, which protects the top surface 537c of the front panel 536c when the folding tonneau cover assembly 530 is folded up and the standoffs 558 are in contact with the top surface 537c. As described below, a protective pad 558a is preferably attached to the bottom of each standoff 558, but abrasion of the top surface 537c can occasionally occur when the protective pads 558a are in direct contact with the top surface 537c, especially when the pickup truck on which the folding cover assembly 530 resides is travelling on rough road surfaces that cause the protective pads 558a to vibrate on the top surface 537c. While the protective film 574 is optional to reduce or prevent such abrasion in some embodiments, they are not required. Such alternate embodiments of the present invention, which include the protective film 574 to minimize abrasive damage to the top surface 537c, are disclosed herein. Protective film 574 can be obtained from a variety of suppliers, including Avery Dennison (Glendale, CA), 3M (St. Paul, MN), Arlon (Placentia, CA), and Xpel (San Antonio, TX). One preferred protective film 574 is Avery Dennison SW 900 Series Supreme Wrapping Film. The protective film 574 is preferably applied to specific locations on the top surface 537c which will align with the standoffs 558 when the folding tonneau cover assembly 530 is folded up as shown and described herein. For example, for embodiments including 4 standoffs 558, protective film can be applied to the top surface 537c in the locations shown in FIG. 2B. The protective film 574 is preferably located in locations on the top surface 537c as schematically illustrated on FIG. 2A that correspond to the locations that the protective pads 558a of the standoffs 558 will assume when they engage the top surface 537c of the front panel 536c, when the folding cover assembly 530 is in a fully folded up orientation.

Figure 2B:
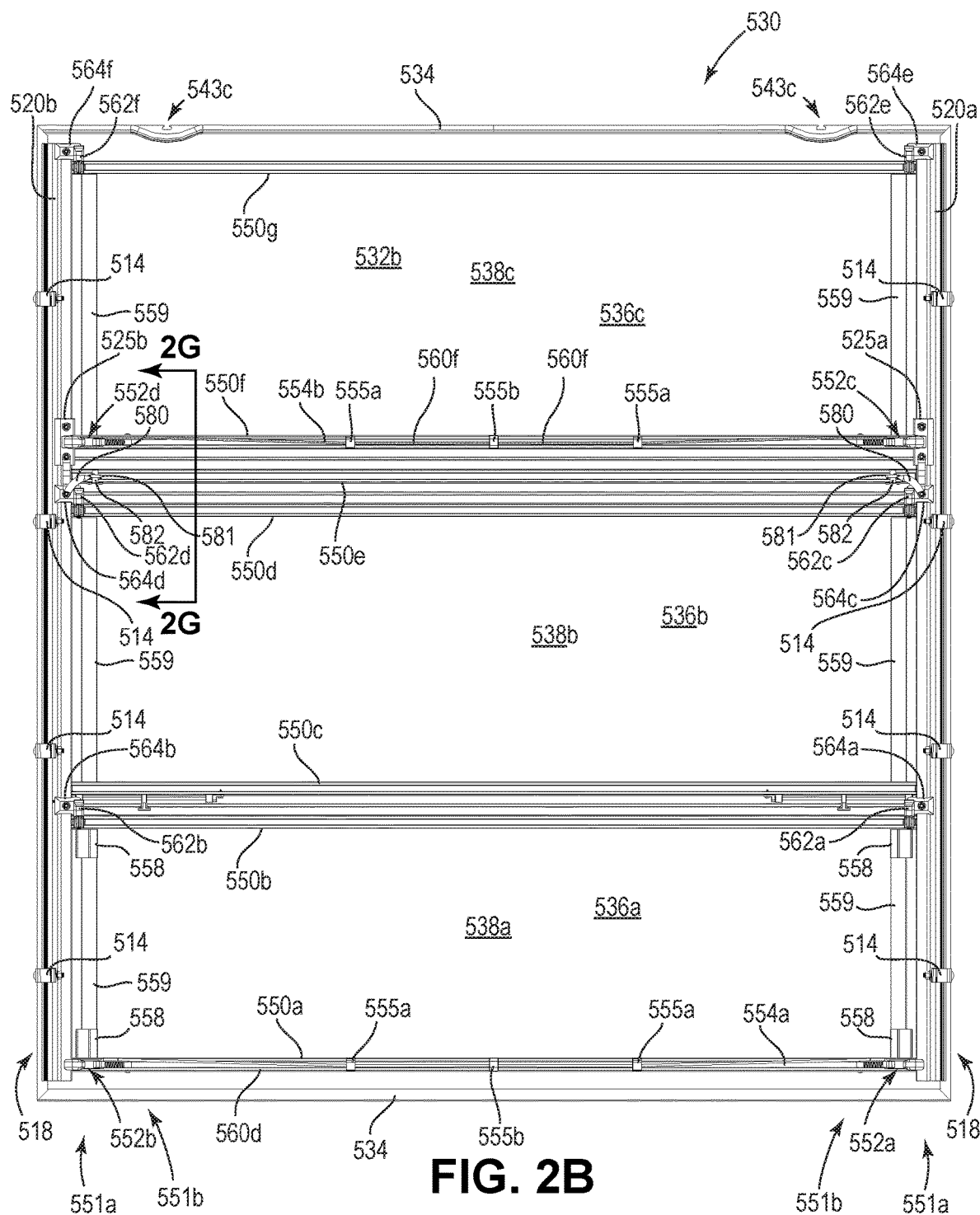
FIG. 2B is a bottom plan view of the folding tonneau cover apparatus of FIG. 1.

FIG. 2B shows a bottom view of the folding tonneau cover apparatus 510. Visible in this view are hinges or flexible hinges 544, which are situated between adjacent panels 536 and adjoin adjacent panels 536. For ease of discussion, hinges 544 are specifically referenced herein as 544a-544c, and non-specifically or collectively referenced as 544. Specifically, situated between the rear panel 536a and the middle panel 536b is hinge 544a. Similarly, situated between the middle panel 536b and the spacer panel 536d is hinge 544b, and situated between the spacer panel 536d and the front panel 536c is hinge 544c. Hinges 544 allow the folding cover assembly 530 to be folded up and will be more fully described below. Support bows 550 are attached to the panels 536 to provide additional support and rigidity to the panels 536, and also provide a structure for mounting of various other components as described in detail later herein. For ease of discussion, support bows 550 are specifically referenced herein as 550a-550g, and non-specifically or collectively referenced as 550. The folding tonneau cover assembly 530 is removably secured to the support frame assembly 518 by securing apparatus 551a. Preferably, securing apparatus 551a includes at least one locking member 551b which is engageable and disengageable from the support frame assembly 518. Preferably, the locking member 551b includes latches 552 which are located at the support bows as shown and secure the folding cover assembly 530 to the side rails 520a and 520b. Release cords 554 are attached to the latches 552. For ease of discussion, latches 552 are specifically referenced herein as 552a-552d, and non-specifically or collectively referenced as 552. Also for ease of discussion, release cords 554 are specifically referenced herein as 554a-554b, and non-specifically or collectively referenced as 554. The release cords 554 pass through cord guides 555 which are attached to support bows 550 as shown. Cord guides 555 preferably include clip cord guides 555a and retainer cord guides 555b, which will be described in further detail below. Standoffs 558 are shown, and will be described in further detail below. Sidebars or handles 559 are attached to panels 536a, 536b, and 536c, near each side of each panel 536 to further support the panels 536. Perimeter seal 534 is located on the bottom 532b of the folding cover assembly 530 and is arranged to seal against top of the perimeter of the cargo box 5 at the sidewalls 6a and 6b and the front wall 6c and the tailgate 6d of the cargo box 5 as shown; some portions of perimeter seal 534 are behind side rails 520a and 520b and not visible FIG. 2B. The perimeter seal 534 is further described herein.

The support bows or transverse frame members or channels 550 provide additional support for the panels 536. In this embodiment, the panels each have two support bows 550, one located near each of the front and rear ends of each panel 536, except for the spacer panel 536d, which has only a single support bow 550. In this embodiment, there are latches 552 mounted in pairs, one of each pair mounted near each end of each of the support bows 550a and 550f as shown. As further described below, the latches 552 engage the side rails 520a and 520b to secure the folding cover assembly 530, and can slide a short distance towards or away from the side rails 520a and 520b to engage or release the folding cover assembly 530 or portions thereof or selected panels 536 from the side rails 520a and 520b as further described below. Note that the support bows 550b, 550c, 550d, 550e, and 550g do not have associated latches 552 in this embodiment. In this embodiment, there are two latch release cords or release cords or cords 554, each of which are connected to opposing pairs of latches 552 which secure the panels 536 to the side rails 520a and 520b. The release cords 554 preferably pass through cord guides 555 which are mounted to the support bows 550; the release cords 554 can slide within or behind the cord guides 556 as further described herein. The release cords 554 generally extend from the latches 552 along the support bows 550. As illustrated in FIGS. 2B and 2C, the clamps 514 secure the side rails 520a and 520b to the sidewalls 6a and 6b of the cargo box 5. The folding tonneau cover apparatus 510 is seen in a side view from the driver's side in FIG. 2C.

Figure 2D:
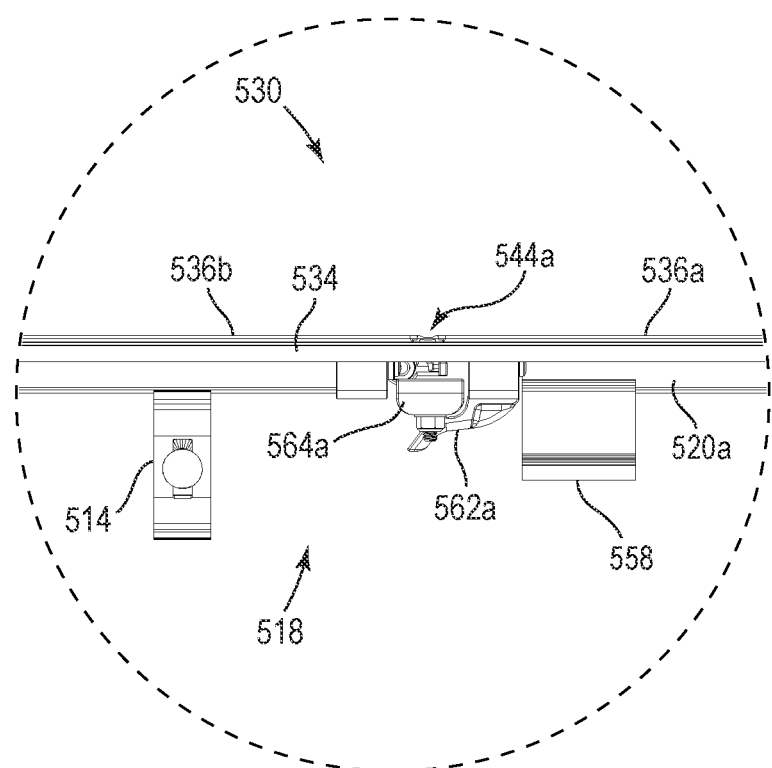
FIG. 2D is a detailed view of a portion of the folding tonneau cover apparatus encircled by the dashed line 2D, 19A of FIG. 2C, illustrating the rear hinge, with a portion of the driver's-side side rail broken away to show the underlying structure.
Figure 2E:
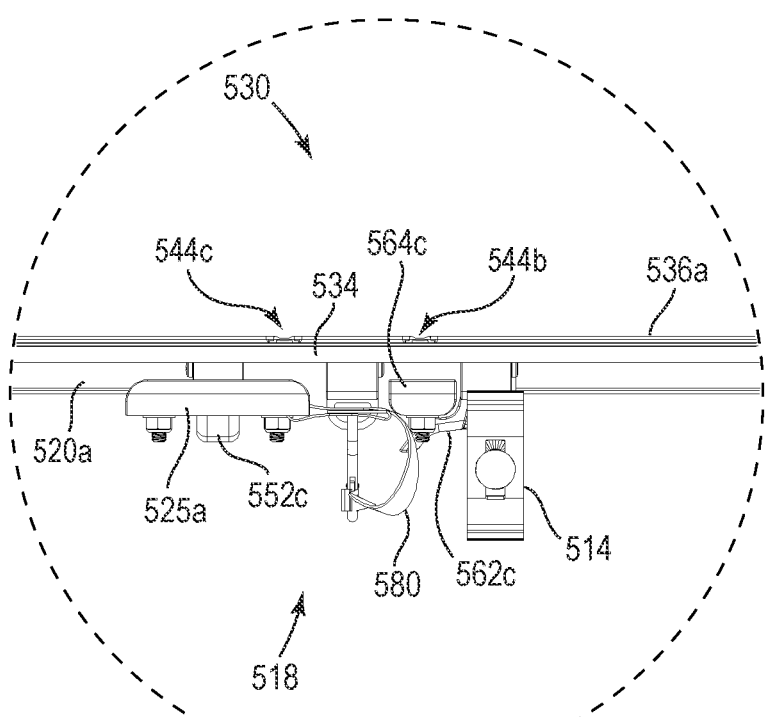
FIG. 2E is a detailed view of a portion of the folding tonneau cover apparatus encircled by dashed line 2E of FIG. 2C, illustrating the middle hinge and the front hinge, with a portion of the driver's-side side rail broken away to show the underlying structure.

In further reference to FIGS. 2C-2E, the portion of the folding tonneau cover apparatus 510 that includes the rear hinge 544a, as indicated by the encircled area labeled 2D in FIG. 2C, is illustrated in an enlarged partial cutaway view in FIG. 2D. Similarly, the portion of the folding tonneau cover apparatus 510 that includes the middle and front hinges 544b and 544c, respectively, as indicated by the encircled area labeled 2E in FIG. 2C, is illustrated in an enlarged partial cutaway view in FIG. 2E. The folding cover assembly 530 preferably includes extended hinge support flange(s) 586 located adjacent the bottom surface or underside 538 of the respective panel 536 and near the front and rear edges 541b and 541c, respectively, of the rigid panels 536 to which the flexible hinges 544 are secured (for example, FIG. 5A). As will be described in further detail below, the flexible hinges 544 each preferably includes a flexible hinge body 545a which includes a central portion 546a, side portions 546b and 546c, and intermediate portions 546d and 546e. Each side portion 546b and 546c preferably extends between the extended hinge support flange 586 and the rigid panel 536. Adhesive 570a is preferably located between each side portion 546b and the respective rigid panel 536 to protect against passage of debris or precipitation into the cargo box 5; the adhesive 570a can also aid in securement of the hinge body 545a to the respective rigid panel 536. The support bows or channels 550 are preferably secured to the bottom surface or underside 538 of the rigid panels 536, near the front edge 541b and/or rear edge 541c of the rigid panels 536. Each support bow 550 that is adjacent a flexible hinge 544 preferably includes the extended hinge support flange 586. Further details regarding the structure of the flexible hinge body 545a and securement to the rigid panels 536 are described below.

Figure 2F:
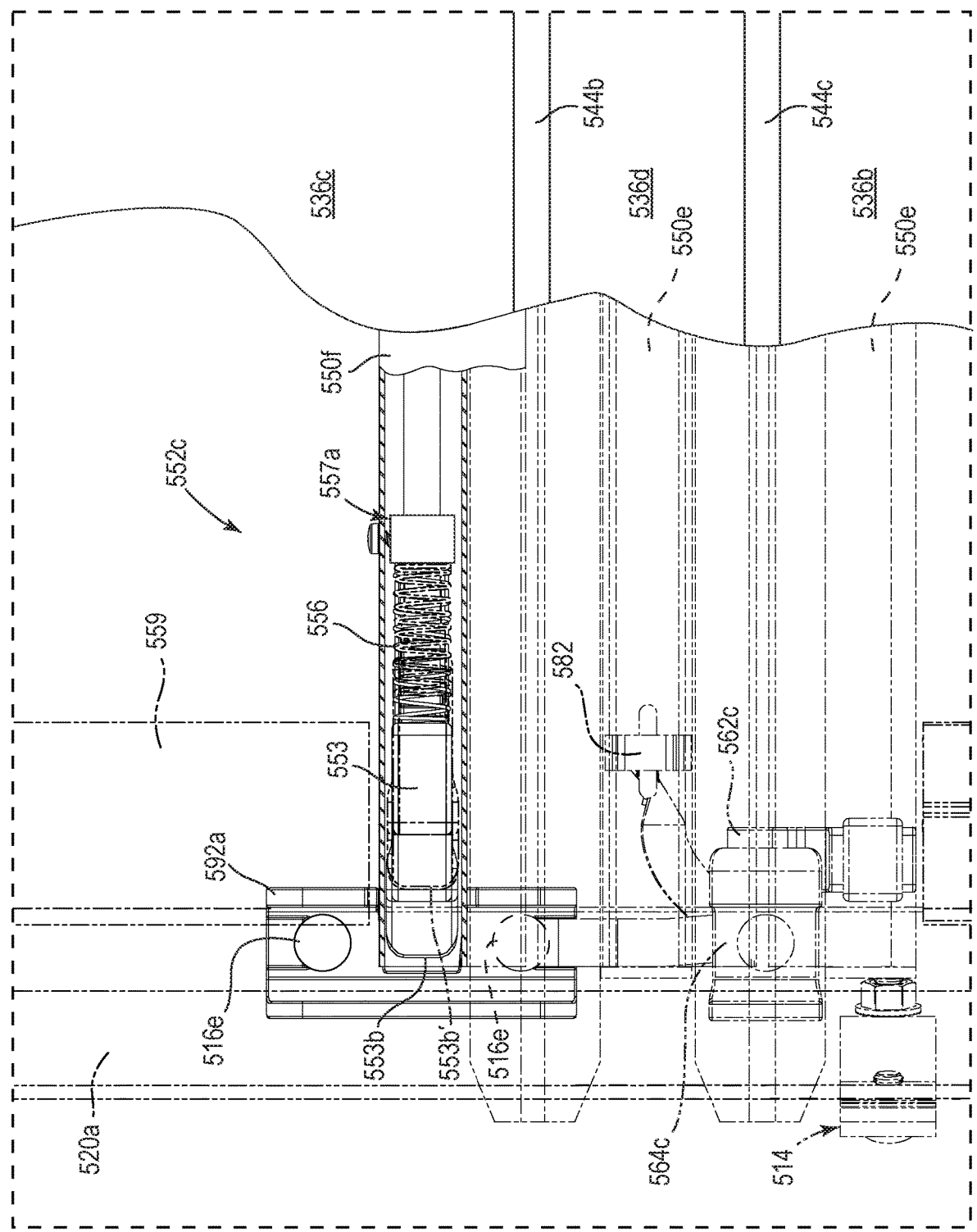
FIG. 2F is an enlarged detailed top plan view of a portion of the folding tonneau cover apparatus shown in the dashed rectangle 2F of FIG. 2A, with portions broken away to show the underlying structure and showing the support member in partial cross section and illustrating the engaging portion of the latch engaged with the containment bracket and the side rail, and showing an alternate position of the engaging portion of the latch in phantom when it is retracted from the containment bracket and with other structures shown in phantom to indicate the relative position of the respective elements.

The folding tonneau cover apparatus 510 preferably includes containment brackets 525a and 525b. The structure and function of the containment bracket 525a is further illustrated in FIG. 2F. Note that in FIG. 2F, portions of the rigid panels 536 and the flexible hinges 544 are broken away to reveal the underlying structure, and many elements are illustrated in phantom to emphasize the elements being described. When the engaging portion 553b is engaged under the side rail 520a and is contained by the containment bracket or anchor socket 525a as illustrated in FIG. 2F, the engaging portion 553b is contained by the containment bracket 525a so that it cannot slide frontwards or rearwards along the side rail 520a. The containment bracket 525a is preferably secured to the side rail by a fastener assembly 526, which may include a bolt, nut, washer, or other fasteners known in the art. In this configuration, the spring 568 is urging the latch slide 553 outwards towards the side rail 520a. To release the latch 552 and allow the folding cover assembly 530 to be lifted off and removed from the side rail 520, the release cord 554e is pulled. When the release cord 554e has been pulled, retracting the latch slide 553 and compressing the spring 568, and disengaging the engaging portion 553b from the side rail 520a and the containment bracket 525a, and releasing the latch 552, the configuration is as illustrated in phantom in FIG. 2F. The side rail 520b preferably has a mirror-image configuration to the side rail 520a, with a side rail front portion 521c and side rail rear portion 521d, and a containment bracket 525b functioning in a similar manner.

Figure 2G:
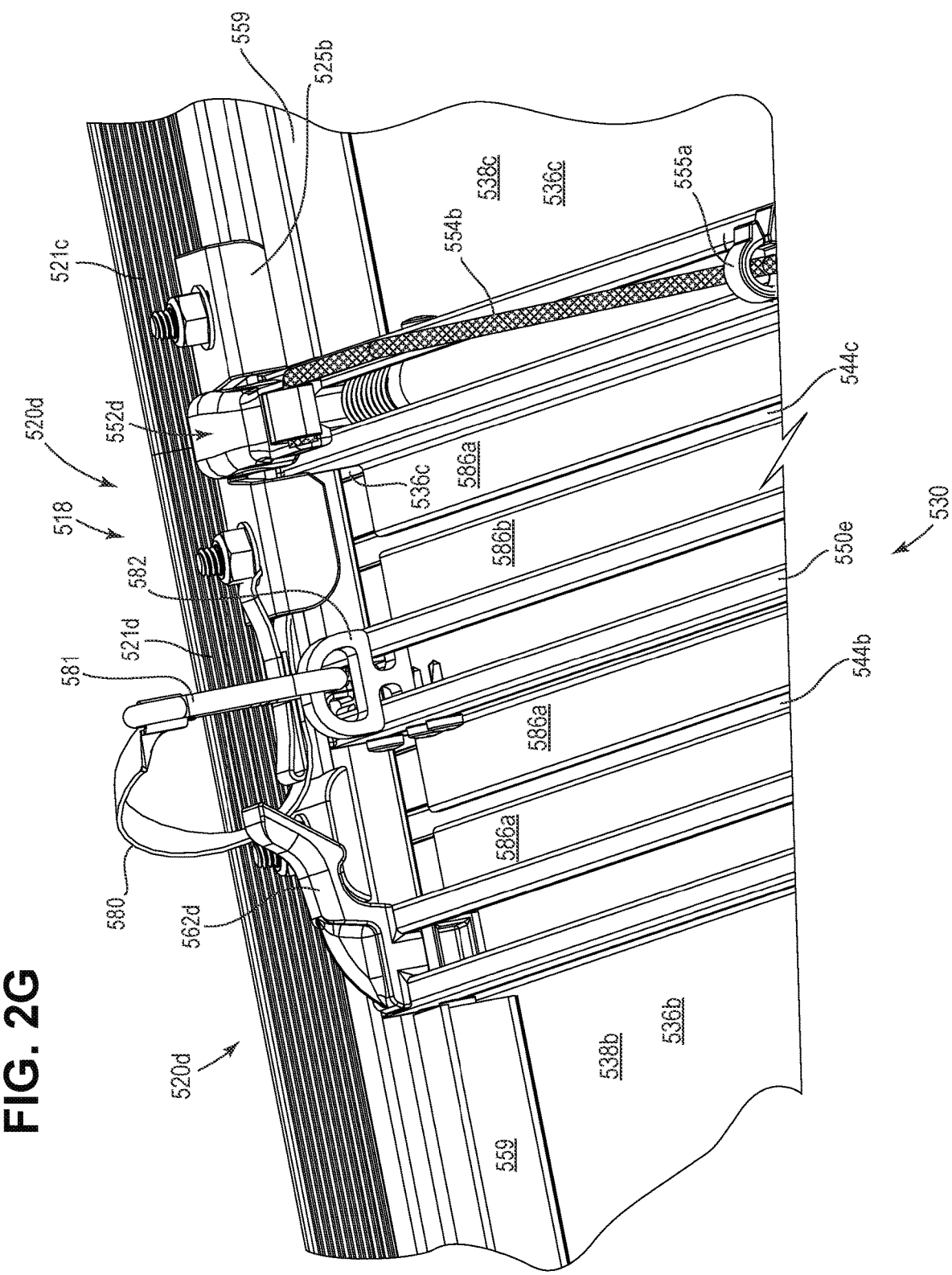
FIG. 2G is an enlarged perspective view as seen generally from a line 2G-2G of FIG. 2B which is seen from below of a portion of a folding tonneau cover apparatus similar to the folding tonneau cover apparatus shown in FIG. 2B, except that the side rail shown in FIG. 2G is an alternate passenger side rail 520d, which differs from the side rail 520b shown in FIG. 2B.

Some embodiments include the alternative side rail 520c which includes a plurality of sections 521 as illustrated in FIG. 2G; the side rail 520c preferably includes side rail front portion 521a and side rail rear portion 521b. The containment bracket 525a is preferably secured to the side rail 520c by a fastener assembly 526, which may include a bolt 516e, nut 516f, washer 516g, or other fasteners known in the art. In these embodiments, in addition to its function to retain the latch 552 as previously described, the containment bracket 525a preferably facilitates securement of the side rail front portion 521a and side rail rear portion 521b together. One advantage of the "split" side rail 520c is that storage and shipment of the side rail 520 can be more practical; a one-piece side rail would be long and in some cases could be more difficult or expensive to transport, for example. The side rail 520d preferably has a mirror-image configuration to the side rail 520c, with a side rail front portion 521c and side rail rear portion 521d, and a containment bracket 525b functioning in a similar manner as the similar elements just described. The alternative side rail 520c, containment bracket 525a, and fastener assembly 526 are illustrated in exploded view in FIG. 2H. Preferably, a tether 580 is attached to the containment bracket 525b and is releasably secured by a link 581 when desired to a ring 582 that is secured to the support bow 550e; this arrangement provides additional stabilization of the folding cover assembly 530 when the folding cover assembly 530 is secured to the side rails 520a, 520b and will secure the folding cover assembly 530 to the side rail 520 if other attachments fail.

In describing preferred embodiments of the present invention in the description that follows, it will be appreciated that reference will be made either to the "driver's side" or "passenger side" or to the "front" or to the "rear" of the folding tonneau cover apparatus or portions thereof in a manner that is consistent with the orientation of the folding tonneau cover apparatus when it is secured to a vehicle as envisioned, so that the "rear" of a folding tonneau cover apparatus or portion thereof will be consistent with what is seen when one is looking at the rear of such a vehicle when the folding tonneau cover apparatus or portion(s) thereof are attached to such a vehicle as envisioned herein, or such portion thereof which is closer to the rear. The "driver's side" refers to the side corresponding to the side of the vehicle typically used by the driver to operate the vehicle in North America, and the "passenger side" refers to the side opposite the "driver's side". For clarity, the "length" of the folding tonneau cover apparatus, the folding cover assembly, the hinges, and the panels described herein, refers to a measurement of the "front" to "rear" dimension, since the pickup truck and the cargo box are typically longer in that direction. Similarly, "width" of the folding tonneau cover apparatus, the folding cover assembly, the hinges, and the panels described herein, generally refers to the "driver's side" to "passenger side" direction, since the pickup truck and the cargo box are typically shorter in that direction. However, these terminologies, that are used as a matter of convenience, are not intended to be limiting; the folding tonneau cover apparatus could be shorter in the "length" direction than in the "width" direction, for example. For other items such as support bows and sidebars, "length" has the normal meaning, referring to the longer dimension or to the dimension along an extruded shape, for example; any potential confusion in terminology can be eliminated by examination of the various Figures in the accompanying drawings.

Figure 3A:
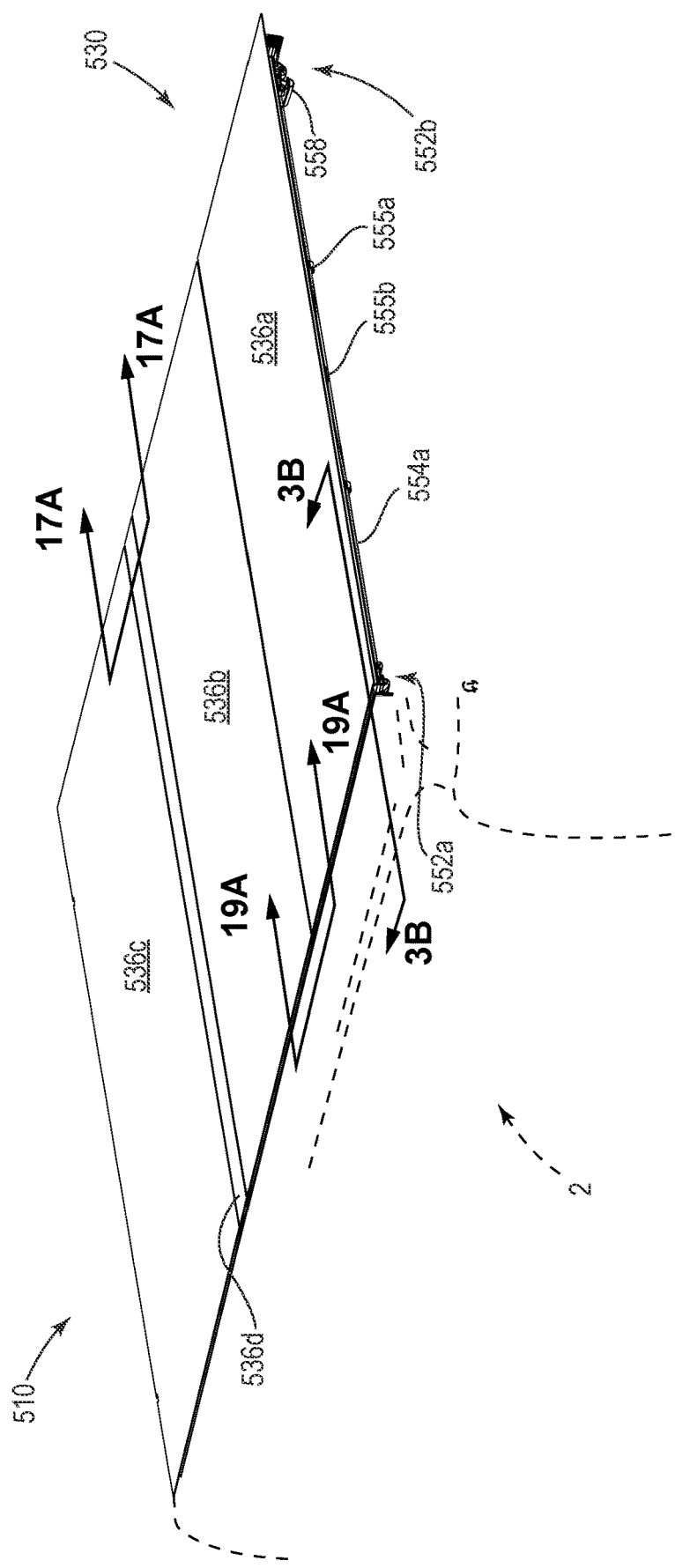
FIG. 3A is a rear perspective view of the folding tonneau cover apparatus of FIG. 1, illustrating additional details.
Figure 3B:
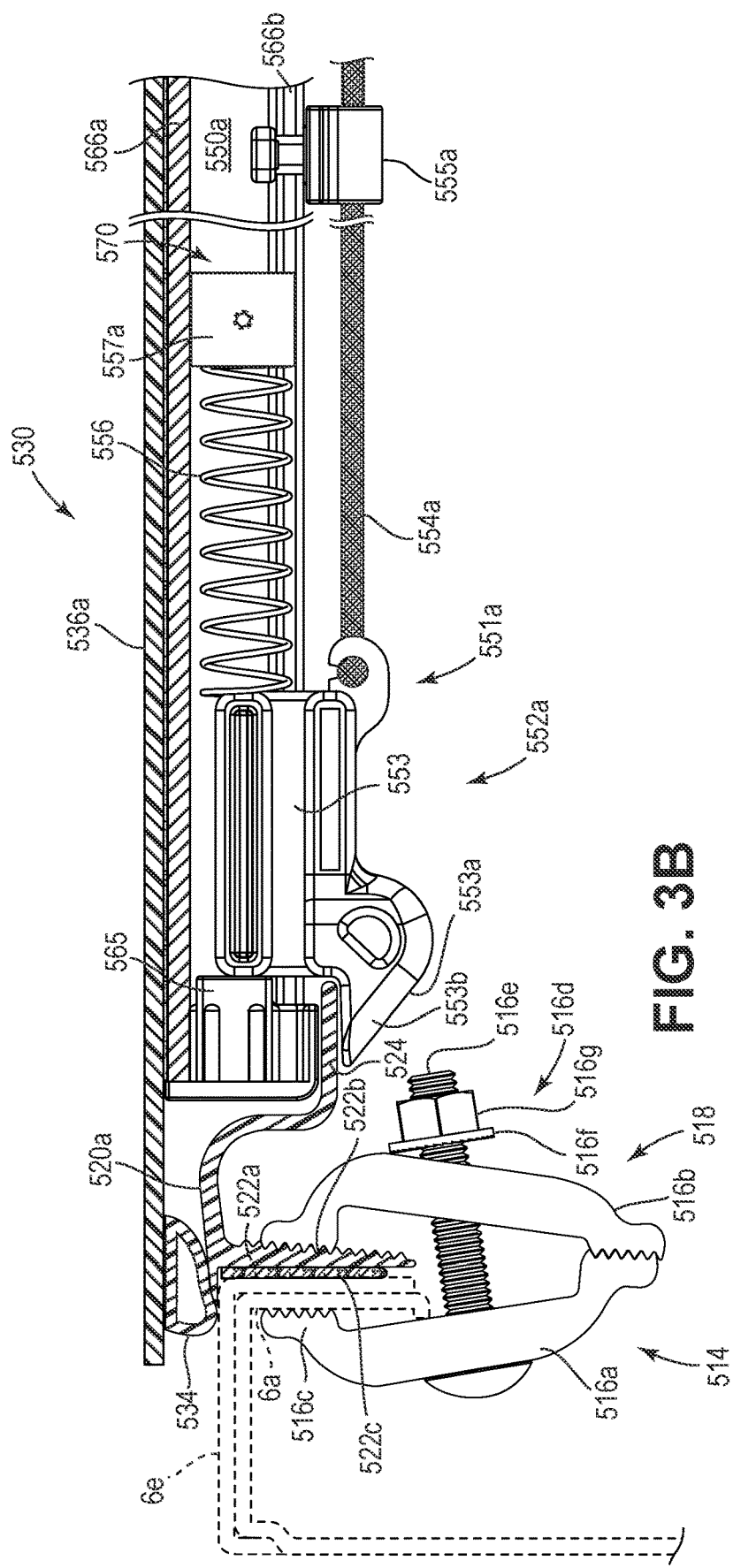
FIG. 3B is a partial section view as seen from the line 3B-3B of FIG. 3A illustrating the engaging portion of one of the latches on the rear support bow or support member of the rear panel engaged with the lip of the side rail and the side rail clamped to the sidewall of the pickup truck with a portion of the truck sidewall and sidewall cap shown in phantom.

Referring now to FIGS. 3A and 3B, the release cord 554a near the rear end of the rear panel 536a passes through cord guides 555, 555a, 555b. FIG. 3B is an enlarged partial section view of the driver's side end portion of the support bow 550a as indicated in FIG. 2A. The cord guides 555 are preferably molded and made of a strong polymer such as Nylon, which may be reinforced with fiberglass or other embedded material to strengthen the polymer. In alternate embodiments, the cord guides 555 can made of polymeric, metallic or ceramic materials using three-D printing methods or three-D etching methods or other additive or subtractive machining process. One of the standoffs 558 can be seen in FIG. 3A, and will be described in more detail later.

As seen in FIG. 3B, the latch 552 includes latch slide 553 having an engaging portion 553b which extends forward to engage the lip 524 of the side rail 520a, so as to secure the respective panel 530 to the side rail 520a. The latch slide 553 preferably includes a stiff polymer, composite, or metal, although other materials and combinations can be used. Preferably, the latch slide 553 includes fiberglass-reinforced nylon. The latch slide 553 is biased by a biasing member or spring 556 towards the side rail 520a so that the engaging portion 553b engages the side rail 520a to form a secured configuration in which the respective panel 530 is restricted from being lifted up from the cargo box 5; in this example, the spring 556 is a compression spring, but an extension spring, or an elastic element, or other known elements could alternatively be used to bias the latch slide 553 towards the side rail 520a so that the engaging portion 553b engages the side rail 520a so that the latch 552 is in the secured configuration. In this embodiment, the spring 556 is held between the latch slide 553 and a spring retainer assembly 557. The spring retainer assembly 557 is secured in the desired location in the support bow 550a. The side rails 520a and 520b preferably include extruded metal, and have a side rail engagement portion 522a (FIG. 3B), arranged to approximate a portion of the sidewall 6a, 6b of the pickup truck 2. The clamp 514 is shown in detail in FIG. 3B. The clamps 514 preferably include aluminum, although other metals or alloys or polymers or other composite materials can be used. Clamps 514 preferably have an outer member 516a and an inner member 516b which are tightened towards each other and held as an assembly on the sidewall 6a by a fastener assembly 516d which preferably includes a bolt 516e, a washer 516f, and a nut 516g. Preferably, inner member 516b has a clamp engagement portion 516c which, together with side rail engagement portion 522a of side rail 520a, aids in securing the clamps 514 in place on the side rail 520a. Preferably, the clamps 514 are arranged and tightened to secure the side rail 520a to the sidewall 6a, with a sidewall gasket 522c arranged between the side rail 520a and the sidewall 6a as illustrated. A bow end cap 565 is located at the end of the support bow 550a. A release cord 554 and a cord guide 555 are shown, and will be described in further detail herein. In the present example, the side rail engagement portion 522a is a generally vertically-oriented portion which configured to be located adjacent a similarly vertically-oriented portion of the sidewall 6a, 6b. In the example of FIG. 3B, a portion of the sidewall 6a of a cargo box 5 of a Chevrolet Silverado pickup truck is illustrated; however, other sidewalls of other cargo boxes of other pickup trucks and the like can be accommodated, by incorporating a side rail engagement portion 522a along the length of the side rails 520a and 520b that are appropriately configured and oriented. In this example, the cargo box 5 of the pickup truck 2 includes a sidewall cap 6e, but other cargo boxes 5 lack a sidewall cap. A sidewall 6a and sidewall cap 6e are similarly illustrated in subsequent drawings herein, including FIGS. 4B 6B, 7B, 8B and 9B. Preferably, the side rail engagement portion 522a has a side rail engagement feature 522b, such as ridges, knurling, surface patterns or textures, or other features which aid in securing the clamps 514. Preferably, a sidewall gasket 522c preferably made of polymeric material is located between the side rail engagement portion 522a and the sidewall 6a; the sidewall gasket 522c can provide protection against damage to the sidewall 6a by abrasion against the side rail 520a. Other flexible material can also be used. The sidewall gasket 522c can provide leak resistance to prevent water, dust, or other debris from passing into the cargo box 5 along the side rail engagement portion 522a. The side rail 520a has a flange or side rail lip 524 along the length of the side rail 520a. The side rail lip 524 provides support for the folding cover assembly 530. In addition, the side rail lip 524 provides a feature for engagement of the engaging portion 553b of the latches 552. The driver's side portion of the support bow 550a is shown in FIG. 3B; the other end of the support bow 550a (toward the passenger side) has a mirror-image configuration, with a latch 552 engaging side rail 520b, and side rail 520b being attached to sidewall 6b in a similar manner.

Figure 4A:
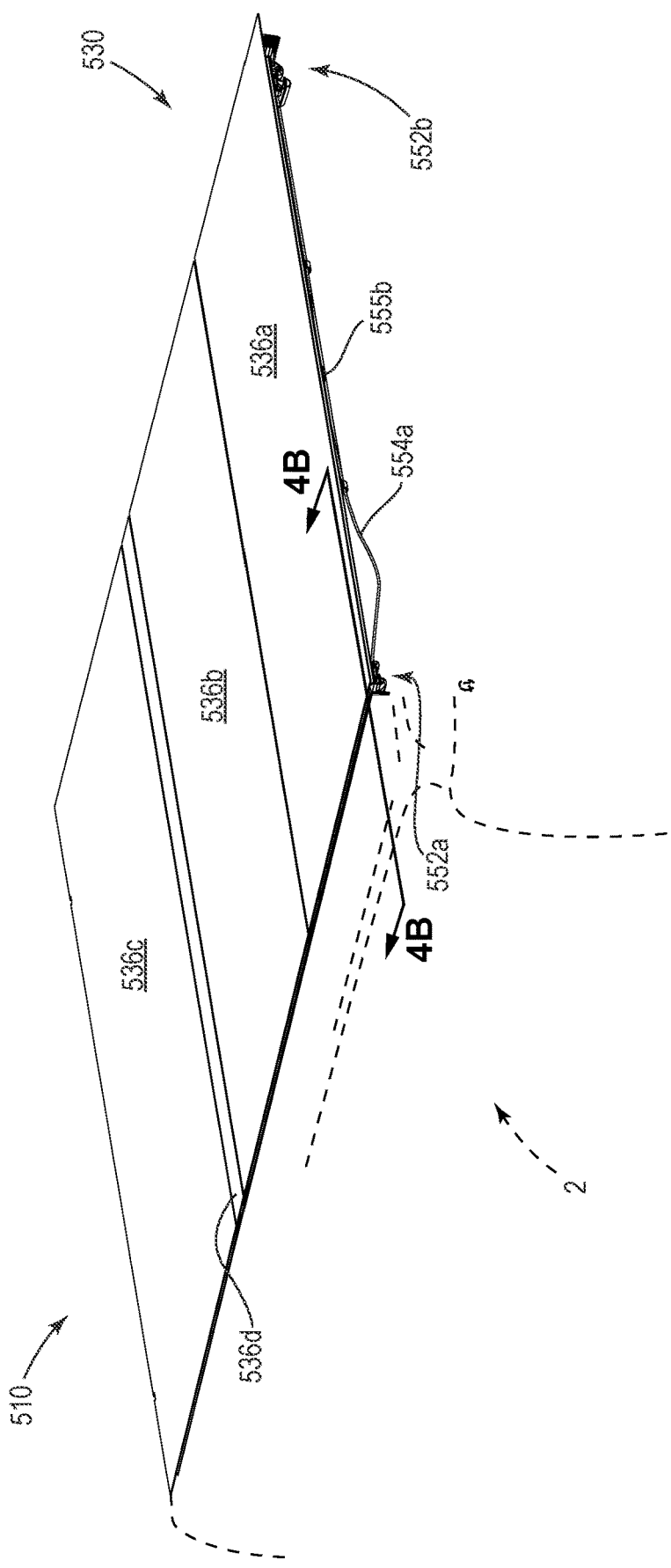
FIG. 4A is a rear perspective view of the folding tonneau cover apparatus of FIG. 1, with the release cord pulled to pull the latch against the bias of the spring to release the latch from the engagement with the side rail.
Figure 4B:
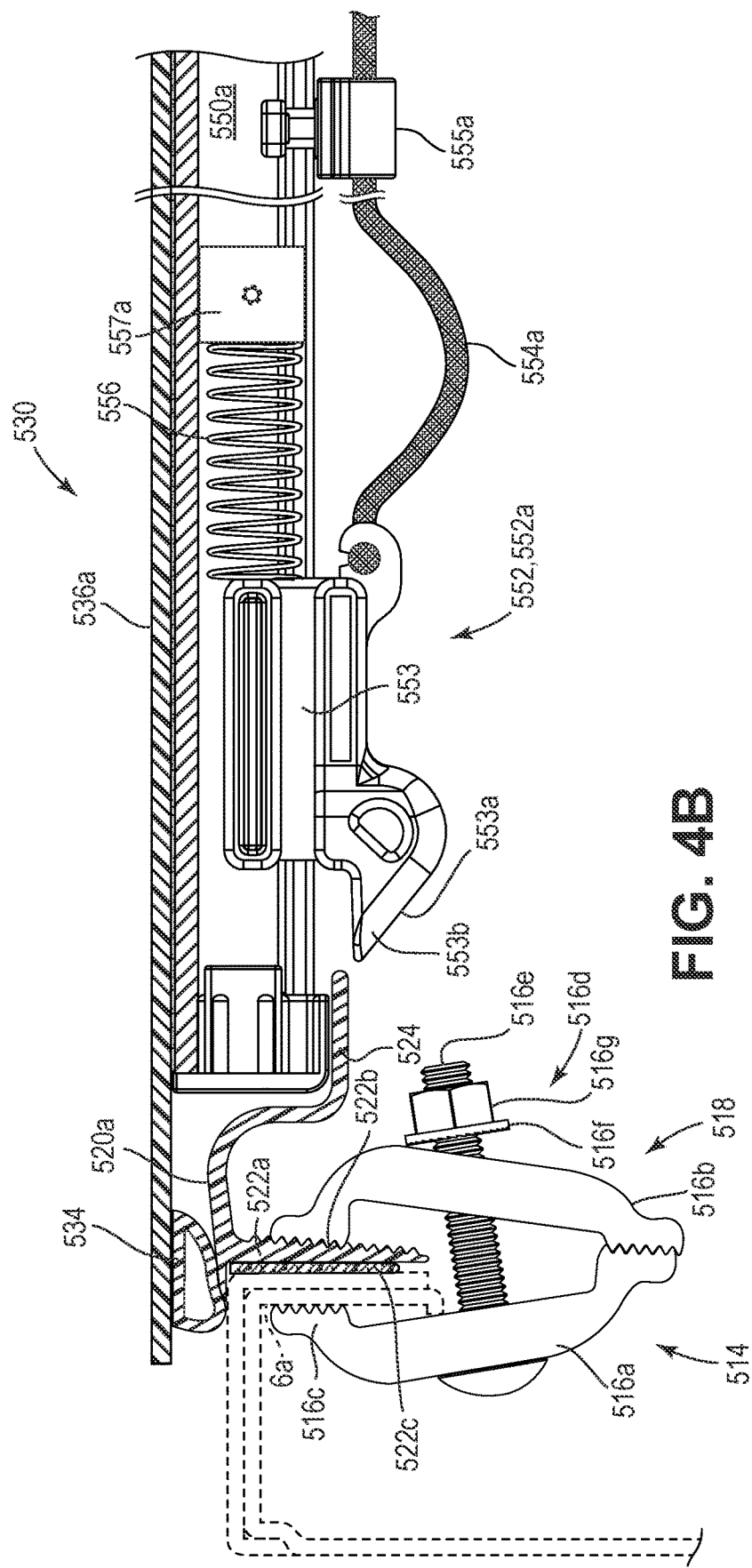
FIG. 4B is a is a partial section view as seen from the line 4B-4B of FIG. 4A similar to the view of FIG. 3B, but showing the arrangement with the engaging portion of the latch retracted from the closed position where the latch would be engaged with the lip of the side rail.

As illustrated in FIGS. 4A and 4B, when it is desired to release the latches 552 at the rear end of the rear panel 536a, the release cord 554a can be pulled, which will retract each of the latches 552 against the force of the respective biasing member or spring 568. Typically, the release cord 554a will be pulled as illustrated in FIG. 4A, by a driver (not shown) who has walked to the rear of the cargo box 5 and has opened the tailgate 6d and reaches in to access and pull the release cord 554a. When the release cord 554a is pulled, the engaging portion 553b of the latch 552 is retracted away from the lip 524 of the side rail 520a as shown in FIG. 4B, releasing the latch 552 from the side rail 520a and allowing the rear portion of the rear panel 536a to be lifted up from the side rail 520a. The cord guides 555 adjacent to the latches 552 help to maintain alignment of the ends of the release cord 554a so that the latches 552 are retracted in alignment with the support bow 550a, to avoid excessive friction, wear and potential binding. The driver's side portion of the support bow 550a is shown in FIG. 4B; the other end of the support bow 550a (toward the passenger side) has a mirror-image configuration, and when the release cord 554a is pulled, the latches 552 at both ends of the support bow 550a are retracted, so that the rear end of the rear panel 536a can be lifted up from both side rails 520a and 520b.

Referring now also to FIGS. 5A-5D, which illustrate a portion of the folding cover assembly 530 in schematic cross section views as indicated by the line 5A-5A in FIG. 2A, each of the hinges 544 (544a, 544b, and 544c) preferably includes the flexible hinge body 545a which is elongated and extends between the driver's side 3a and the passenger side 3b of the cargo box 5 when the folding cover assembly 530 is unfolded to cover the cargo box 5. The flexible hinge body 545a has a hinge longitudinal axis 545b which is oriented along the length of the hinge body 545a, and a hinge body profile 545c, which is the shape of a transverse vertical cross section taken perpendicular to the hinge longitudinal axis 545b. The hinge body profile 545c is preferably uniform along the hinge longitudinal axis 545b of the hinge body 545a. In embodiments having more than one flexible hinge 544, each of the flexible hinges 544 can have a similar hinge body profile 545c. Alternatively, the hinge body profile 545c of the flexible hinge bodies 545a can differ from the profile of at least one other of the flexible hinge bodies 545a.

The folding tonneau cover assembly 530 of the present invention may include one of several different hinge body embodiments 545a, 545a', 545a'', 545a''' (see also FIGS. 17C-18F). The first embodiment 545a, shown in FIGS. 5A-5C and FIGS. 17A-17D, is a dual durometer hinge having a more flexible polymer material 547c making up the central portion 546a and a portion of the intermediate portion 546d, 546e adjacent to and on each side of the central portion 546a, and a more rigid or stiff polymer material 547d making up the side portions 546b, 546c and a portion of the intermediate portion 546d, 546e on each side of the central portion 546a of the first embodiment of the hinge body 545a. The first embodiment of the hinge body 545a will take more than one form depending on the format of the adhesive material attached to the hinge body for the purpose of sealing and sealing the hinge body 545a to the underside of the respective rigid panels 536 on either side of the respective hinge 544a, 544b, 544c. In reference to the first embodiment of the hinge body 545a shown in FIG. 5A, hinge body 545a is secured to the underside of the respective rigid panels 546 by an adhesive material 570a described elsewhere herein. In reference to the hinge body 545a shown in FIG. 5B, hinge body 545a is secured to the underside of the rigid panels 536a, 536b, respectively, by an adhesive member 571a described elsewhere herein. In reference to the hinge body 545a shown in FIG. 5C, the hinge body 545a is secured to the underside of the respective rigid panels 536a, 536b with a three-part adhesive member having first, second, and third layers 572a, 572b, 572c, as further described elsewhere herein. The first embodiment is also shown in FIGS. 17A-17D in the first adhesive format employing the adhesive material 570a.

Figure 17A:
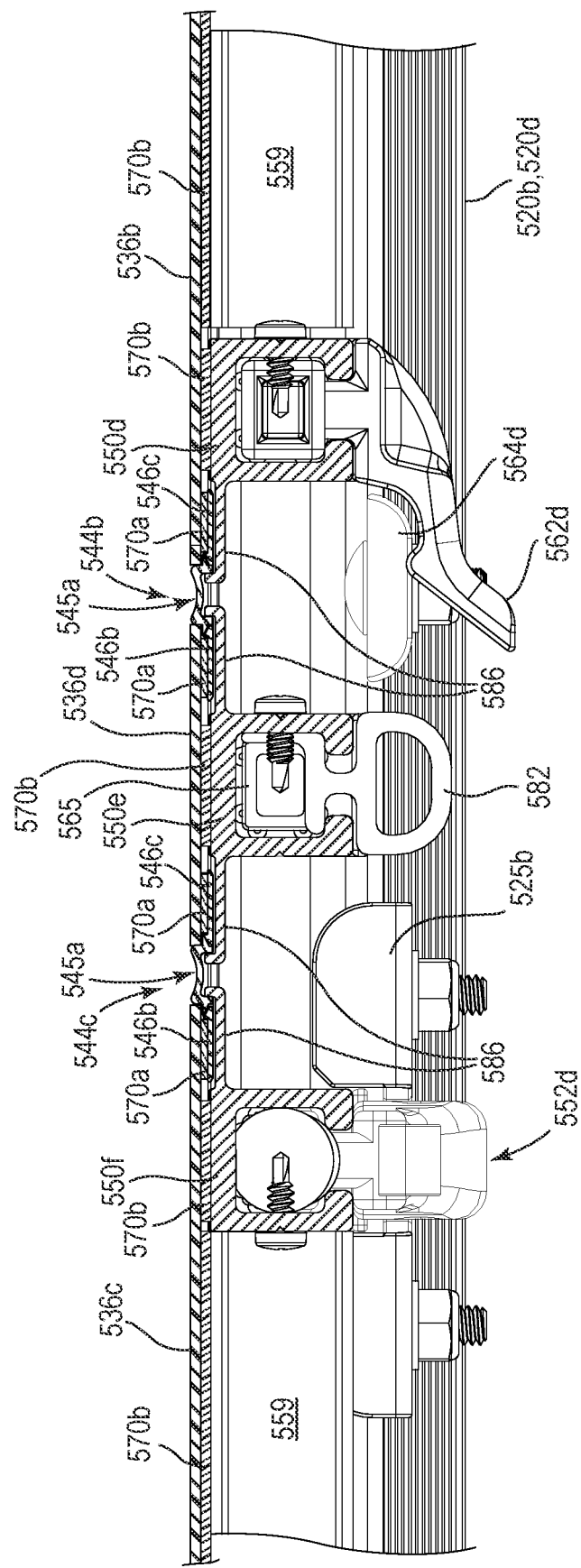
FIG. 17A is a cross sectional detail view as seen from the line 17A-17A in FIG. 3A, showing additional details in the vicinity of the side of the spacer panel, and showing two flexible hinges, a latch, a containment bracket, a hook, and a catch.
Figure 17B:
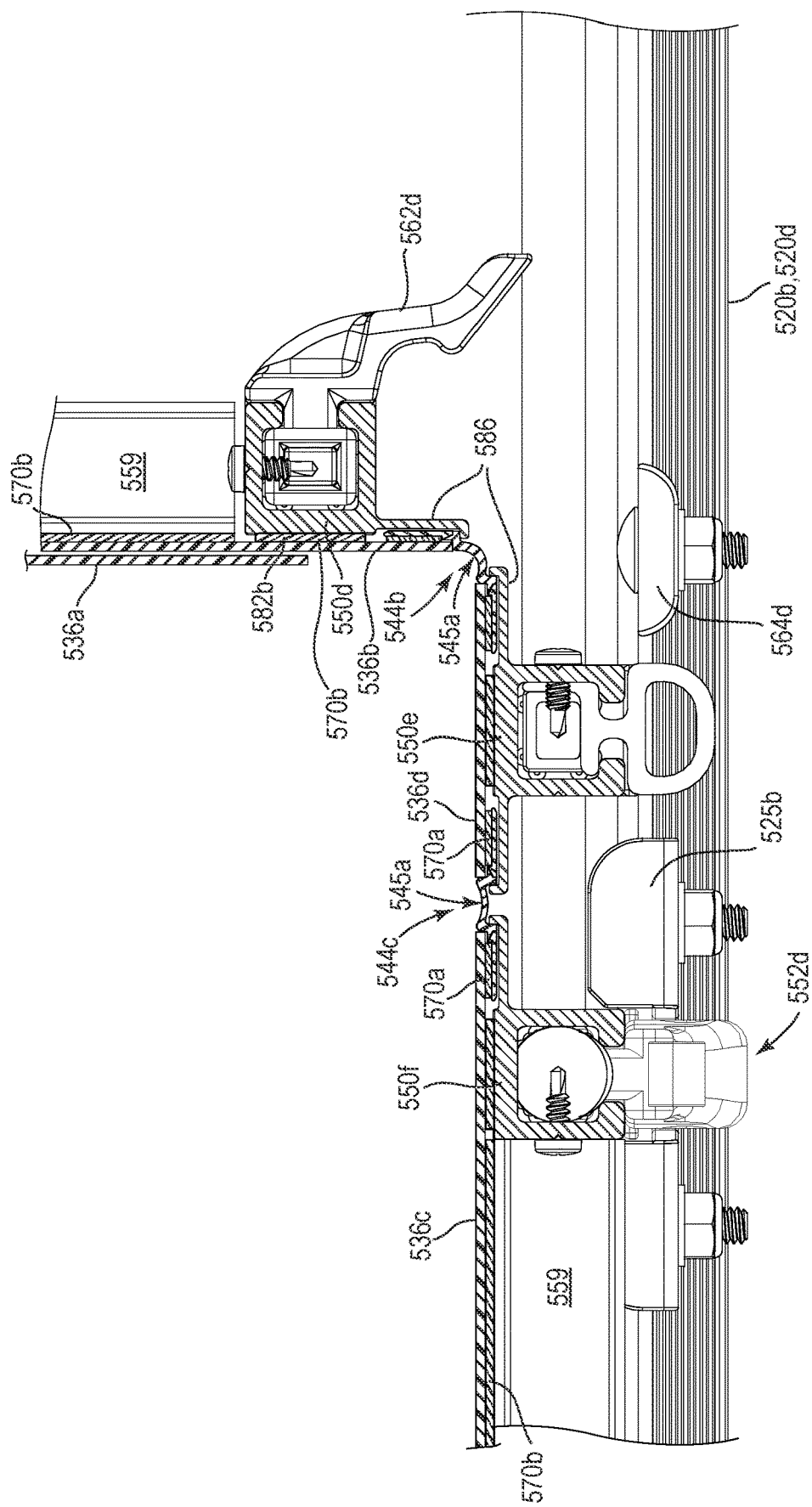
FIG. 17B is a cross sectional detail view similar to the view shown in FIG. 17A, but with one of the flexible hinges folded up from the side rail, similar to the configuration of FIG. 8A.
Figure 17C:
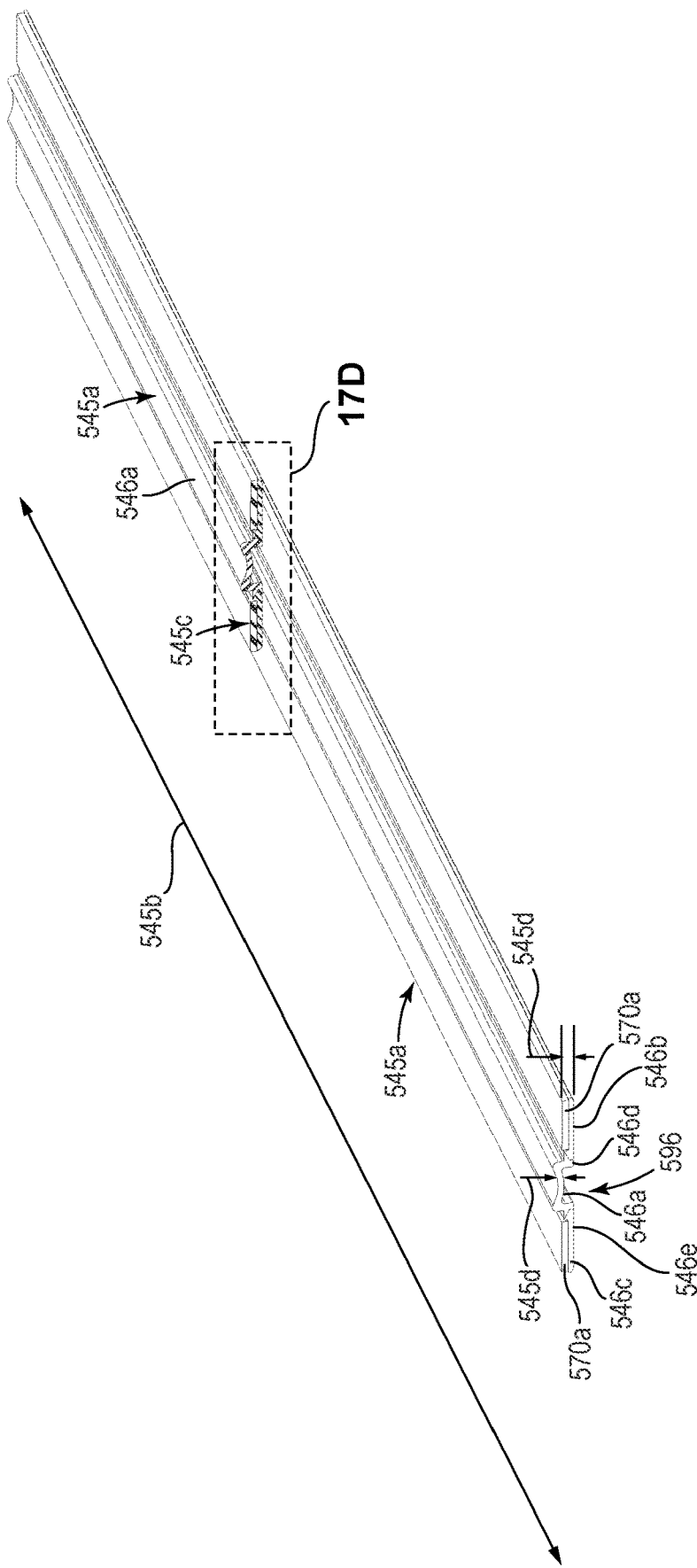
FIG. 17C is a perspective view of a hinge body of the folding cover assembly of FIG. 1 shown isolated and in an unfolded configuration.
Figure 17D:
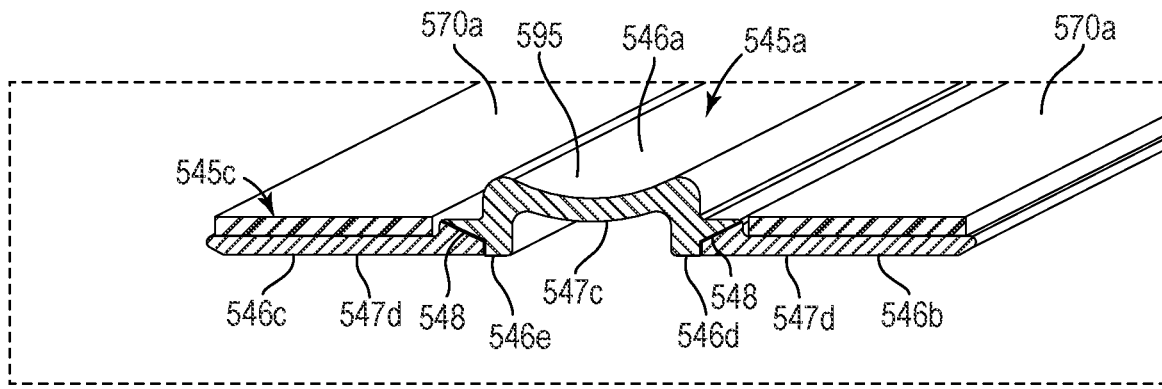
FIG. 17D is a perspective view of a portion of the hinge body including a transverse vertical cross sectional view of the hinge body taken from the dashed rectangle 17D shown in FIG. 17C.
Figure 17E:
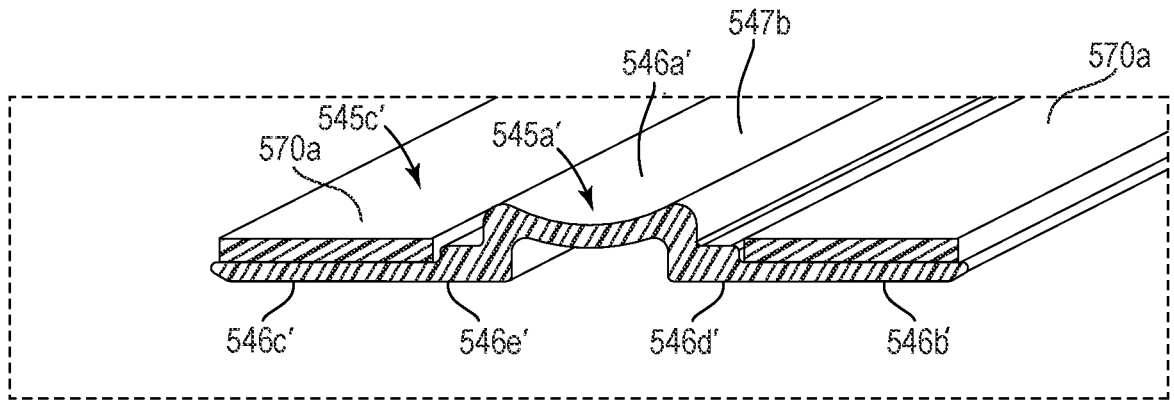
FIG. 17E is a view that is similar to the view shown in FIG. 17D, except that the hinge body that is shown is an alternate hinge body.

A further embodiment of the hinge body 545a' having similar adhesive 570a for sealing and securing the hinge body 545a' to the underside of rigid panels 536 but having only a single durometer polymer design is shown in FIG. 17E. This single-durometer embodiment of the hinge body 545a' is also shown in FIG. 18B, but with a different adhesive 571 format. A further embodiment of the hinge body 545a'' is shown in FIG. 18C and is generally the same as the single-durometer hinge body 545a' shown in FIG. 18B, except that the central portion 546'' of the hinge body 545a'' does not include a concave upper surface like hinge body 545a', but has instead a flat central portion 546'' in which water will not pool or run off along the length of the hinge body toward the sidewalls of the pickup truck 2. The hinge body 545a''' shown in FIGS. 17F-17H and FIGS. 18D-18F is also a single-durometer hinge body made of a flexible polymer material 547c and it does not need an adhesive member to secure it to the underside of the rigid panels, because the close proximity of the rigid panel 536 and the support bow 550, which has ha hinge support flange 586 having a flange lip 587, which cooperate to form a partial enclosure 592, described elsewhere herein, which will hold the hinge body 545a''' in place on each side of the hinge body 545a''' as shown in FIGS. 17G, 17H, and 18D-18F. The inventors have found that even when adhesive 570a, 5701a, or other adhesives or adhesive members as described herein are not required for securement of the hinge body 545a, 545a', 545a'', 545a''' to the partial enclosure 592, such adhesives or adhesive members can be advantageously included to provide a seal between the hinge body and the respective adjacent panels 536 against intrusion by moisture or debris into the cargo box 5 when the folding cover apparatus 530 is unfolded and covering the cargo box 5.

The flexible hinge body 545a''' preferably includes a single polymer material 547a, and provides an effective barrier against influx of moisture, precipitation or debris into the cargo box 5 between the adjacent rigid panels 536 when the folding cover assembly 530 is unfolded and in place covering the cargo box 5. The hinge body polymer material 547a preferably includes an elastomeric polymer material 547b and more preferably includes a thermoplastic polymer. The elastomeric polymer material 547b is preferably extruded to form an elongated structure having the desired hinge body profile 545c. Examples of the preferable elastomeric polymer material 547b include Sarlink® TPE RV-2250D BLK 111 thermoplastic elastomer and Sarlink® TPV 5765B thermoplastic vulcanizate, both available from Teknor Apex Company, Pawtucket, RI.

Each flexible hinge body 545a preferably includes the two side portions 546b and 546c, and the central portion 546a located between the two side portions 546b and 546c; each flexible hinge body 545a preferably includes the two intermediate portions 546d and 546e, each one of the intermediate portions 546d and 546e located between the central portion 546a and one of the two respective side portions 546b and 546c. The central portion 546a, side portions 546b and 546c, and intermediate portions 546d and 546e of the flexible hinge body 545a preferably extend along the length of the flexible hinge body 545a, and the hinge thickness 545d of the central, side, and intermediate portions 546a-546e together at least partially define the hinge body profile 545c. Each of the two side portions 546b and 546c is preferably secured to a respective adjacent rigid panel 536. When it is desired to fold up the folding tonneau cover assembly 530, one of the adjacent rigid panels 536 is lifted up and folded towards the other of the adjacent rigid panels 536, and the central portion 546a bends to function as a hinge as further described herein.

Figure 5A:
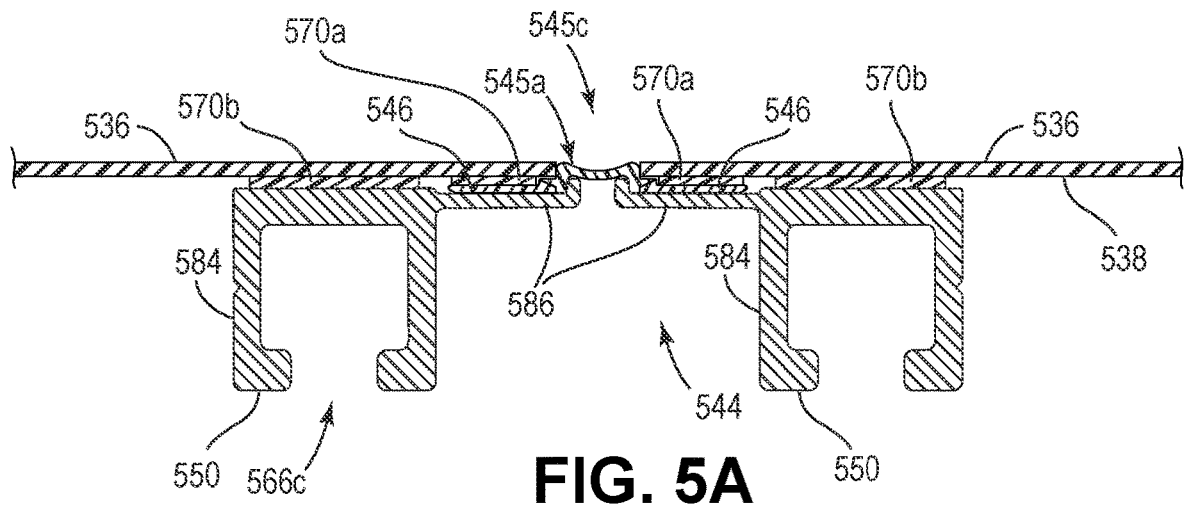
FIG. 5A is schematic illustration of a vertical cross section along a front-to-back plane as seen from the line 5A-5A of FIG. 2A of one of the hinges of the folding tonneau cover assembly of FIG. 1 showing the basic configuration with the hinge unfolded.
Figure 5B:
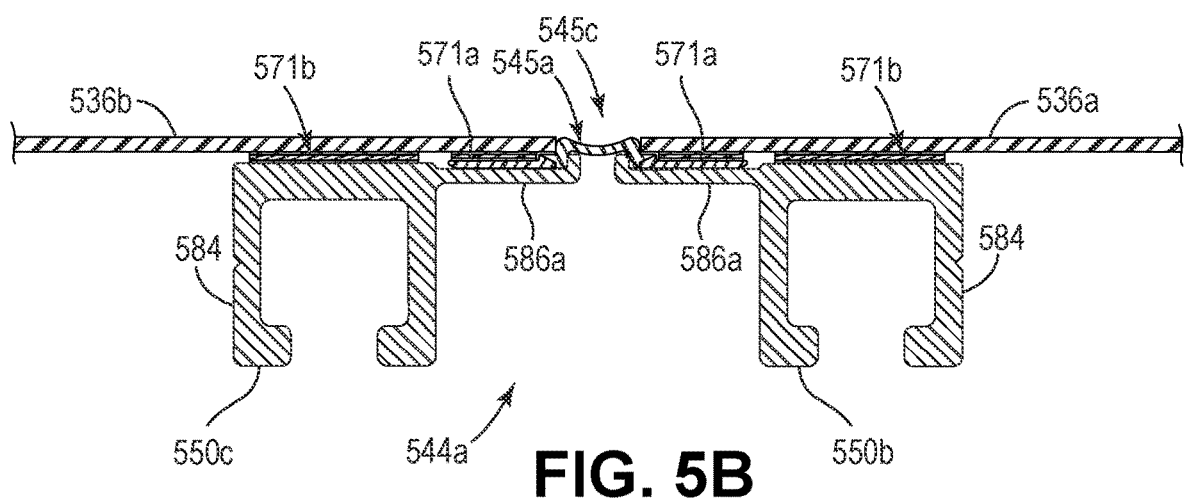
FIG. 5B is a schematic illustration similar to FIG. 5A of a transverse vertical cross section along a front-to-back plane showing an alternate embodiment of one of the hinges of the folding tonneau cover assembly of FIG. 1 showing the hinge unfolded.
Figure 5C:
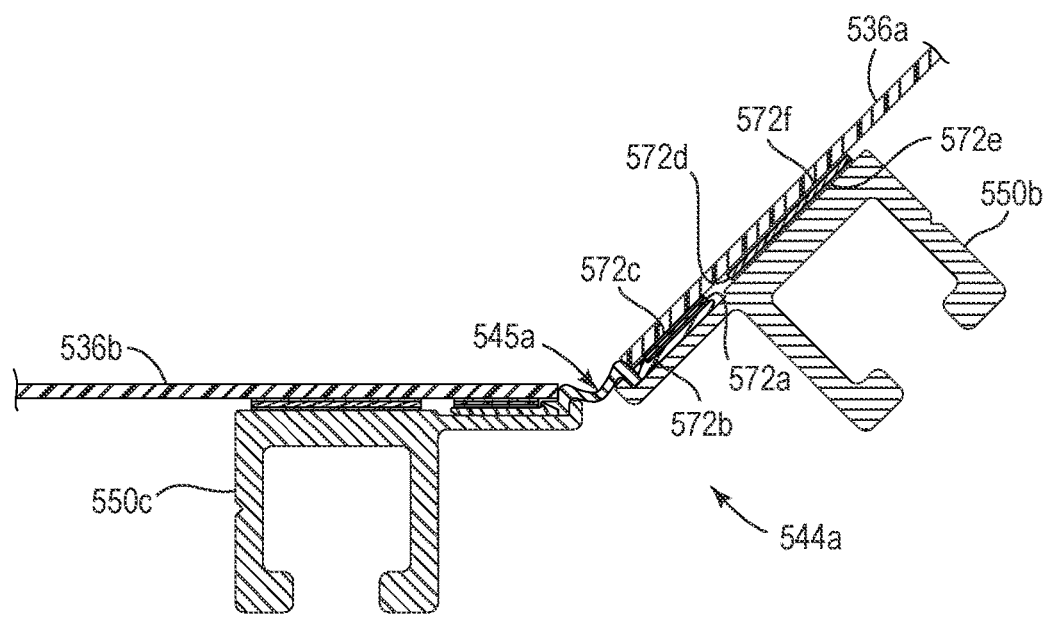
FIG. 5C is a schematic illustration showing the hinge of FIG. 5B, but with the hinge folded at about 45 degrees from the unfolded orientation shown in FIG. 5B.

In some embodiments, such as schematically illustrated in FIGS. 5A-5C, the flexible hinge body 545a includes more than one polymeric material such as those described herein; for example, the flexible hinge body 545a may include a softer or lower-durometer elastomeric polymer material 547c and a harder or higher-durometer elastomeric polymer material 547d. The central portion 546a preferably includes the softer elastomeric polymer material 547c, and the side portions 546b and 546c, which are secured to the rigid panels 536 as stated, preferably include the harder elastomeric polymer material 547d. In such embodiments, a transition or mixing of the materials preferably occurs in the intermediate portions 546d and 546e. This arrangement preferably provides a structure with the central portion 546a being more flexible in bending than the intermediate portions 546d and 546e and the side portions 546b and 546c, so that bending of the flexible hinge body 545a preferentially occurs in the central portion 546a, although some flexing and bending can occur in other portions of the flexible hinge 544 in addition to the central portion. This arrangement is schematically illustrated in FIG. 5C, which shows the hinge illustrated in FIG. 5B somewhat bent. In the drawings, which illustrate embodiments of the hinge body 545a having more than one polymeric material, the intermediate portions 546d and 546e have a transition between polymeric materials schematically indicated by a partially diagonal line in the drawings. As just described, the transition between materials may be gradual with a mixing of the polymeric materials in the intermediate portions, which will generally occur during either a molding process or an extrusion process, either of which could be used to manufacture a dual-durometer hinge body, so, for that reason, the line is not intended to define a precise sudden transition, but rather just generally indicate that the respective intermediate portion includes a transition between the different polymeric materials that have different durometers. Depending on the process and mixing of materials during fabrication of the hinge body, the transition can be more sudden or more gradual. The transition between polymeric materials will generally be located in the respective intermediate portions 546d and 546e as indicated by the schematic transition line shown in these portions.

For example, in one preferred embodiment, the central portion 546a includes the softer elastomeric polymer material 547c, one example of which is Sarlink® TPE RV-2250D BLK 111 thermoplastic elastomer, and the side portions 546b and 546c include the harder or higher-durometer elastomeric polymer material 547d, one example of which is Sarlink® TPV 5765B thermoplastic vulcanizate. These materials can be extruded together to form the disclosed structure, with a mixing of these materials occurring in the intermediate portions 546d and 546e. The thickness 545d of the various portions of the flexible hinge body 545a can also affect the bending properties, but the variation of polymeric materials as just described can be useful in facilitating bending of the hinge 544 in the central portion 546a, which in use is located between the adjacent panels 536, and in facilitating securement of the side portions 546b and 546c to the adjacent panels 536.

While forming the flexible hinge body 545a by extrusion of thermoplastic elastomers such as those listed above is preferred, other materials and fabrication methods can be utilized. For example, the flexible hinge body 545a can include a structure fabricated by molding or other additive or subtractive manufacturing process. The flexible hinge body 545a may have additional material added, such as reinforcing fibers or filaments (not shown) adhered to or incorporated into the flexible hinge body 545a, including cloth-inserted, cloth-reinforced, fiberglass-reinforced, and fiber-reinforced polymer materials. The hinge body polymer material 547a can include a vinyl material, natural or synthetic rubber or other flexible polymeric material, EPDM rubber, neoprene rubber, nitrile rubber, latex, silicone rubber, polyurethane material, or other polymer materials known in the art, or combinations of materials. The flexible hinge body 545a preferably includes a flexible material that can withstand deformation without failure due to cracking or breakage to allow bending of the hinge 544 to fold up the folding cover assembly 530, and that is moisture-resistant to avoid leakage into the cargo box 5.

Figure 7C:
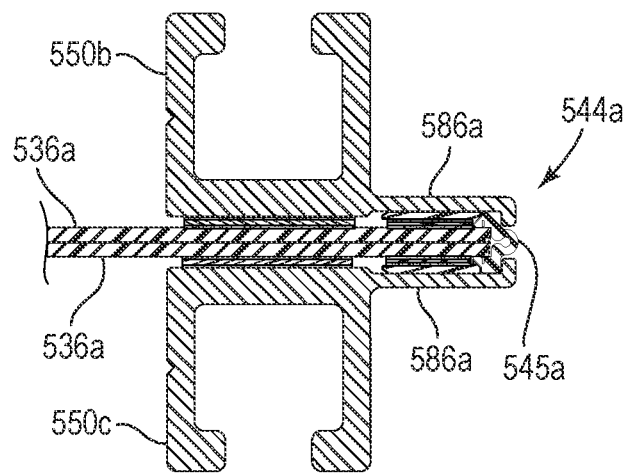
FIG. 7C is a schematic illustration similar to that shown in FIG. 5C showing the alternate hinge body of FIG. 5B but with the hinge body folded about 180 degrees as shown in the configuration illustrated in FIGS. 7A-7B.

As stated above, adhesive 570a is preferably located between each side portion 546b and the respective rigid panel 536 as illustrated in FIG. 5A to protect against passage of debris or precipitation into the cargo box 5; the adhesive 570a can also aid in securement of the flexible hinge 544 to the respective rigid panel 536. The adhesive 570a can include known adhesives and sealant materials which can be used to protect against passage of debris or precipitation between the rigid panel 536 and the respective flexible hinge 544 or to secure the flexible hinge 544 to the respective rigid panel 536. In some preferred embodiments, the adhesive 570a includes a double-sided adhesive tape 571a, which preferably includes an acrylic foam material 572a, with adhesive layer 572b arranged on one side of the acrylic foam material 572a, and adhesive layer 572c arranged on the other side of the acrylic foam material 572a, for example. For example, the double-sided adhesive tape 571a can be 3M 5933 from 3M, St. Paul, Minn. ("thermal adhesive tape"), the adhesive layer 572b includes heat-activated adhesive and an adhesive layer 572c includes pressure-sensitive adhesive which may be protected by a release strip (not shown) until it is desired to activate the pressure-sensitive adhesive layer 572c. Preferably, the adhesive layer 572b (in this example, heat-activated adhesive) is aligned with the flexible hinge body 545a while the heat-activated adhesive is activated to adhere the double-sided adhesive tape 571a to the flexible hinge body 545a; the flexible hinge body 545a together with the attached double-sided adhesive tape 571a is subsequently aligned with the rigid panel 536 and the release strip is removed. Preferably, after the adhesive layer 572c is aligned with the panel 536, the flexible hinge body 545a is attached to the rigid panel 536 by activating the adhesive layer 572c (in this example, pressure-sensitive adhesive). The adjacent rigid panel 536 is similarly attached to the flexible hinge body 545a with double-sided adhesive tape 571a forming the structure of hinge 544 illustrated in FIG. 5B. The flexible hinge body 545a allows the hinge 544 to take a flat or open configuration as illustrated in FIGS. 5A and 5B, or to flex or bend as illustrated in FIGS. 5C, 7C, and other figures herein, providing a flexible hinge 544 that allows the folding cover assembly 530 to fold as illustrated throughout the Figures and described herein, with rigid panels 536 folding up and rotating towards other rigid panels 536 as shown. Preferably, the flexible hinge body 545a is adhered to the respective bottom or underside 538 of the rigid panels 536 (specifically, the underside 538a-538d off respective adjacent panels of 536a-536d as described herein) of the folding cover assembly 530 as shown. In the preferred arrangements discussed herein, the hinges 544 are securely attached to the respective rigid panels 536 and are sealed to prevent water or debris from entering the cargo box through the folding cover assembly 530 at the hinges 544, and are generally impervious to environmental factors such as precipitation, wind, and temperatures to which a typical cargo box 5 would be exposed.

The support bows 550 are also schematically illustrated in FIGS. 5A-5C. The support bows preferably include a bow main portion 584 including a generally C-shaped channels with a bow upper portion 585 configured for attachment to the bottom surface 538 of the respective panel 536 and oriented with a channel opening 566c at the bottom. The support bows 550 which are located at the flexible hinges 544 preferably include the hinge support flange 586, 586a, 586b; the support bows which are located at the flexible hinges 544 preferably also include the flange lip 587, 587a, 587b.

As stated above, the support bows 550 are secured to the respective panel 536. The support bows 550 are preferably located at the bottom surface 538 of the respective panel 536, and near the front edge 541b or rear edge 541c of the respective panel 536. The support bows 550 are preferably secured to the bottom surface 538 of the respective panel 536 by an adhesive 570b, which may include a layer or coating of adhesive or a double-sided adhesive tape 571b, for example. Alternatively, a thermal or hot-melt or chemically activated adhesive, or a mechanical attachment, or a weld, or a combination, can be used to attach the support bows 550, to the respective panels 536. The double-sided adhesive tape 571b preferably includes an acrylic foam material 572d with adhesive layer 572e arranged on one side of the acrylic foam material 572d and adhesive layer 572f arranged on the other side of the acrylic foam material 572d, for example. Preferably, the adhesive 570b includes a double-sided adhesive tape 571b such as 3M CV62F from 3M, St. Paul, Minn. ("pressure adhesive tape"), wherein the double-sided adhesive tape 571b is an acrylic foam tape having an adhesive layer 572e which includes pressure-sensitive adhesive and having an adhesive layer 572f which includes pressure-sensitive adhesive which may be protected by a release strip (not shown) until it is desired to activate the pressure-sensitive adhesive, adhesive layer 572f. Preferably, the adhesive layer 572e (in this example, pressure-sensitive adhesive) is aligned with and adhered to the upper surface 566d of the support bow 550 to adhere the double-sided adhesive tape 571b to the support bow 550; the support bow 550 together with the attached double-sided adhesive tape 571b is subsequently aligned with the panel 536 and the release strip is removed. Preferably, the adhesive layer 572f is then aligned with the panel 536 and the support bow 550 is attached to the respective panel 536 by activating the adhesive layer 572f (in this example, pressure-sensitive adhesive). While the arrangement just described is a preferred configuration, any of the adhesive layers just described can include heat-activated adhesive or pressure-sensitive adhesive, and the acrylic foam material 572a, 572d is also preferable but not always required. For example, in alternative configurations, a single layer of adhesive could be used, similar to the arrangement schematically illustrated in FIG. 5A. Other pressure-activated acrylic adhesive foam tape can be used, such as Lamatek 5357 from Lamatek, Inc., West Deptford, N.J. The sidebars or handles 559 are preferably also attached to the bottom surface or underside 538 of the respective panels 536, preferably in a similar manner as that just described for the support bow 550. Although adhesive 570b can be applied at selected portions of the length of the support bow 550 or the sidebar 559, adhesive 570b is preferably applied along substantially the entire length of the support bow 550 and the sidebar 559, to enhance stability and to minimize unwanted vibrations. Alternatively, the sidebars 559 and support bows 550 can be attached to the panels 536 with adhesives such as glue, or with fasteners, or spot welds.

Figure 5D:
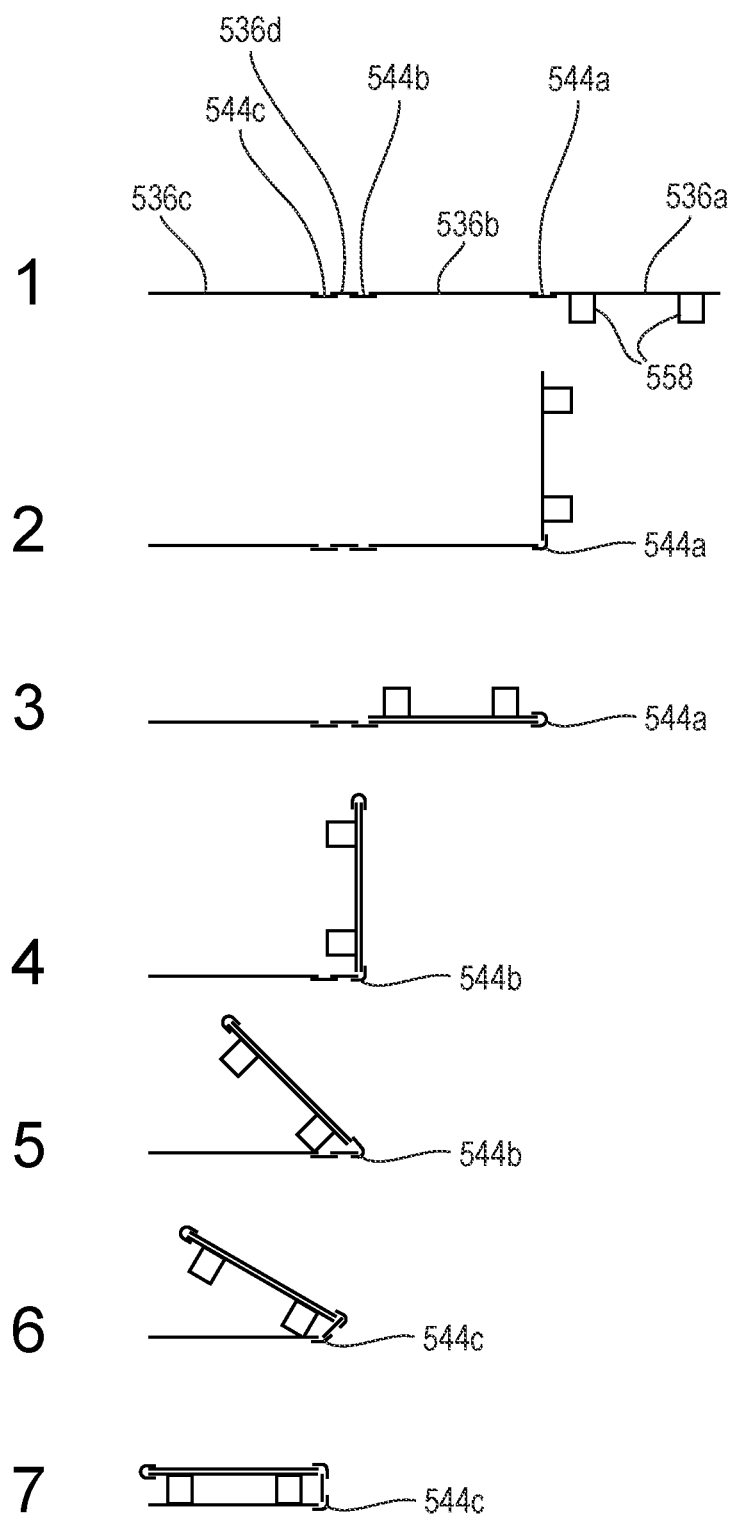
FIG. 5D is a schematic illustration showing the general steps and configurations of the folding tonneau cover assembly of FIG. 1 as it is folded up into a fully folded orientation.

In some apparatus and methods embodiments, the folding cover assembly 530 folds in stages or steps; a preferred embodiment is schematically illustrated in FIG. 5D. In this embodiment, starting from the unfolded or closed configuration of the folding cover assembly 530 (configuration 1), the hinge 544a flexes to allow the rear panel 536a to fold up, passing through 90 degrees (configuration 2) towards the middle panel 536b, and fold over onto the middle panel 536b (configuration 3). The hinge 544b flexes to allow the middle panel 536b (together with the rear panel 536a which is folded onto the middle panel 536b) to fold up, passing through 90 degrees (configuration 4) towards the spacer panel 536d, passing through a point at which standoffs 558 contact the front panel (configuration 5). The hinge 544b flexes back towards 90 degrees as the hinge 544c flexes to allow the spacer panel 536d to fold up, and continue to fold over (together with the rear panel 536a which is folded onto the middle panel 536b, and the middle panel 536b) towards the front panel 536c (configuration 6), until the folding cover assembly 30 is folded up (configuration 7). Note that FIG. 5D is a schematic overview of the general folding of the folding cover assembly 530; the various configurations are further illustrated and described elsewhere herein in greater detail.

Figure 5E:
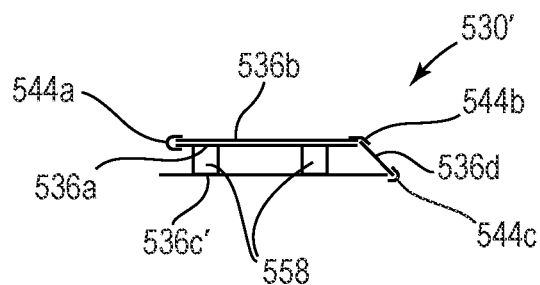
FIG. 5E is a further schematic illustration showing an alternate configuration of the fully folded orientation of the tonneau cover assembly of FIG. 5D.

An alternate configuration of an alternate folding cover assembly 530' folded up is schematically illustrated in FIG. 5E. In some embodiments, the front panel 536c' is noticeably longer than panels 536a and 536b. In some embodiments, the spacer panel 536d is oriented approximately vertically when the folding cover assembly 530 is folded up, and the front panel 536c simply extends farther frontward than the middle panel 536b and the rear panel 536a. In the example illustrated in FIG. 5E, the spacer panel 536d is correspondingly longer to accommodate the lengths of the panels 536a, 536b, and 536c' as illustrated. In this case, the spacer panel 536d is noticeably non-vertical when the folding cover assembly 530' is folded up. The alternate folding cover assembly 530' also preferably includes corresponding flexible hinges 544a, 544b, 544c and standoffs 558.

Figure 5F:
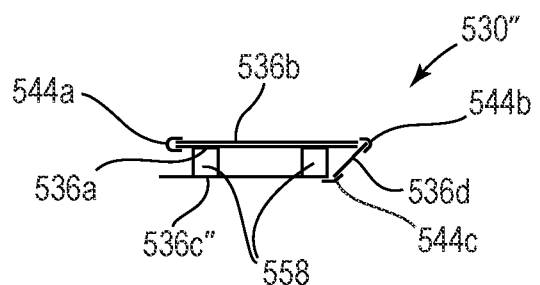
FIG. 5F is a further schematic illustration similar to that of FIG. 5E, but showing yet another alternate configuration of the fully folded tonneau cover assembly.

Another alternate configuration of an alternate folding cover assembly 530" folded up is schematically illustrated in FIG. 5F, similar to the illustration of FIG. 5E. In some embodiments, the front panel 536c" is noticeably shorter than panels 536a and 536b. In some embodiments, the spacer panel 536d is oriented approximately vertically when the folding cover assembly 530 is folded up, and the middle panel 536b and the rear panel 536a simply extend farther frontward than the front panel 536c. In the example illustrated in FIG. 5F, the spacer panel 536d is correspondingly longer to accommodate the lengths of the panels 536a, 536b, and 536c" as illustrated. In this case, the spacer panel is noticeably non-vertical when the folding cover assembly 530" is folded up. The alternate folding cover assembly 530" also preferably includes corresponding flexible hinges 544a, 544b, 544c and standoffs 558.

Figure 14A:
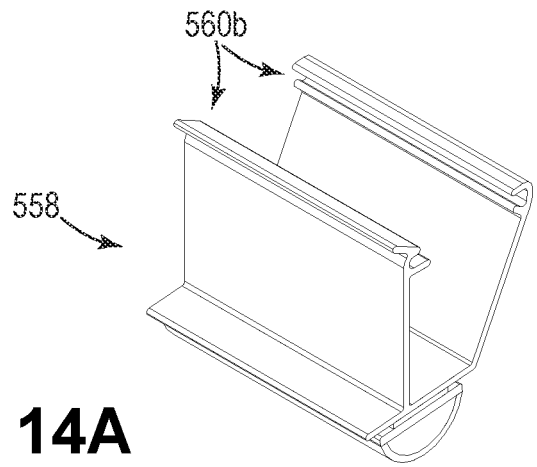
FIG. 14A is a perspective view illustrating a standoff.
Figure 14B:
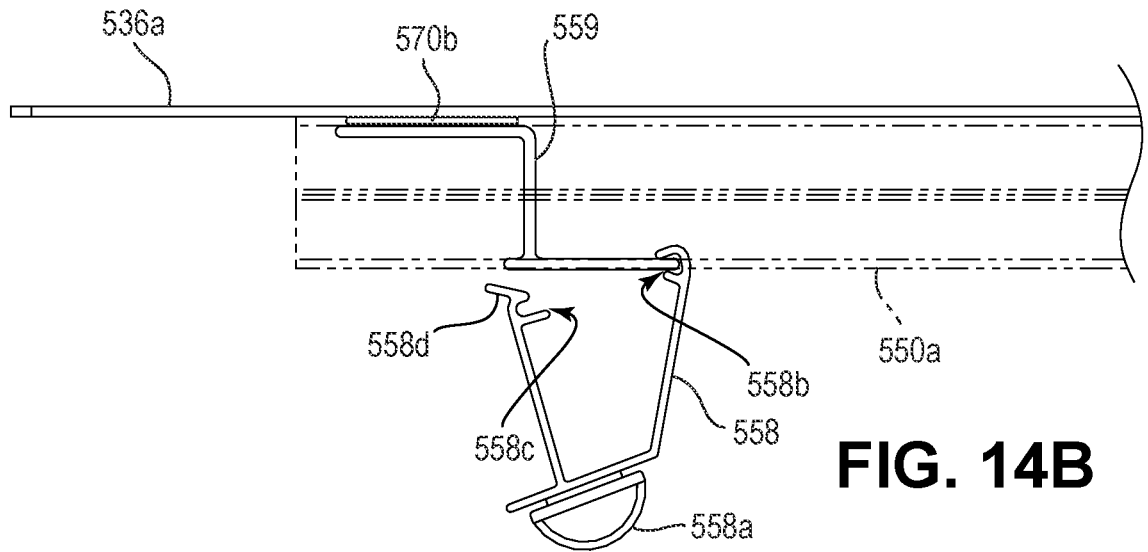
FIG. 14B is a side view illustrating the standoff of FIG. 14A with longitudinal groove 558*b* engaged with a sidebar 559 secured to the bottom surface of the rear panel 536*a* and showing the support bow in phantom.
Figure 14C:
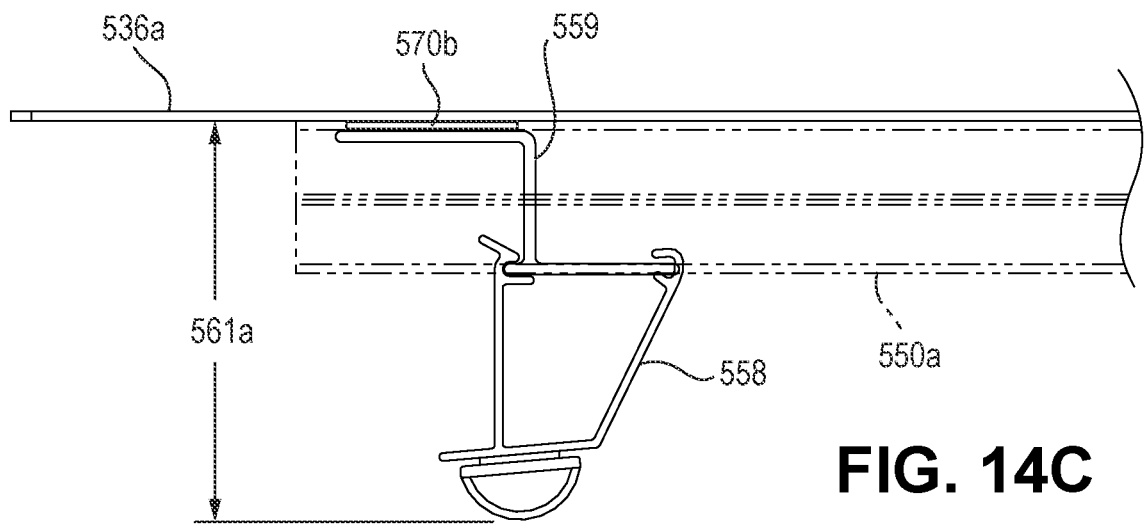
FIG. 14C is a side view illustrating the standoff of FIGS. 14A and 14B pivoted upward so that the longitudinal groove 558*c* is engaged with the sidebar as shown and illustrating a standoff distance between a top of the protective pad on the standoff and the top surface of the rear panel and showing the support bow in phantom.

In the examples illustrated in FIGS. 5E and 5F, the spacer panel 536d can be oriented preferably from about zero to about 60 degrees from a vertical orientation; the orientation is determined by the various lengths of the panels 536 and a standoff distance 561a (see FIG. 14C). When the cover assembly is in the fully folded position, the top surface 537d of the spacer panel 536d can stand generally at an angle of from about 30 to about 150 degrees to the top surface 537c of the front panel 536c, preferably from about 40 to about 140 degrees to the top surface 537c of the front panel 536c; more preferably from about 50 to about 130 degrees to the top surface 537c of the front panel 536c; even more preferably from about 60 to about 120 degrees to the top surface 537c of the front panel 536c, and even more preferably from about 80 to about 100 degrees to the top surface 537c of the front panel 536c, generally depending upon the length of the front panel 536c, which can be varied in various embodiments of the cover assembly. In the preferred embodiment shown in FIG. 1, the top surface 537d of the spacer panel 536d will generally reside at an angle of about 90 degrees to the top surface 537c of the front panel 536c.

Figure 20A:
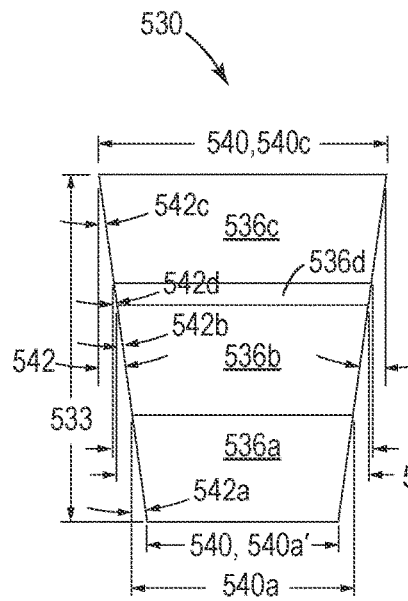
FIG. 20A is a schematic illustration of the folding tonneau cover apparatus of FIG. 1, as configured for a cargo box having angled sides.
Figure 20B:
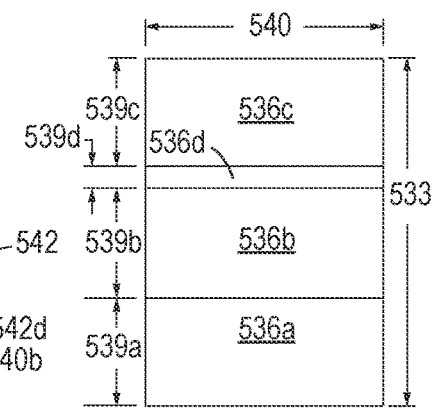
FIG. 20B is a schematic illustration of the folding tonneau cover apparatus of FIG. 1, as configured for a cargo box having parallel sides.

Referring now also to FIGS. 20A-20B, the length 539a of the rear panel 536a is preferably somewhat smaller than the length 539b of the middle panel 536b so that the rear panel 536a does not interfere with the hinges 544b, 544c, support bow 550e, or other nearby structures when the folding cover assembly 530 is folded up or unfolded. If the length 539a of the rear panel 536a is too much smaller than the length 539b of the middle panel 536b, the standoffs 558 attached to the support bow 550a will be farther removed from the respective edges of the front panel 536c and the middle panel 536b and may not provide the desired support in the folded up configuration. More preferably, the length 539a of the rear panel 536a is from about 0.25 inch to about 8 inches smaller than the length 539b of the middle panel 536b. Still more preferably, the length 539a of the rear panel 536a is from about 0.5 inch to about 2 inches smaller than the length 539b of the middle panel 536b. Even more preferably, the length 539a of the rear panel 536a is about 0.75 inch smaller than the length 539b of the middle panel 536b.

Figure 10A:
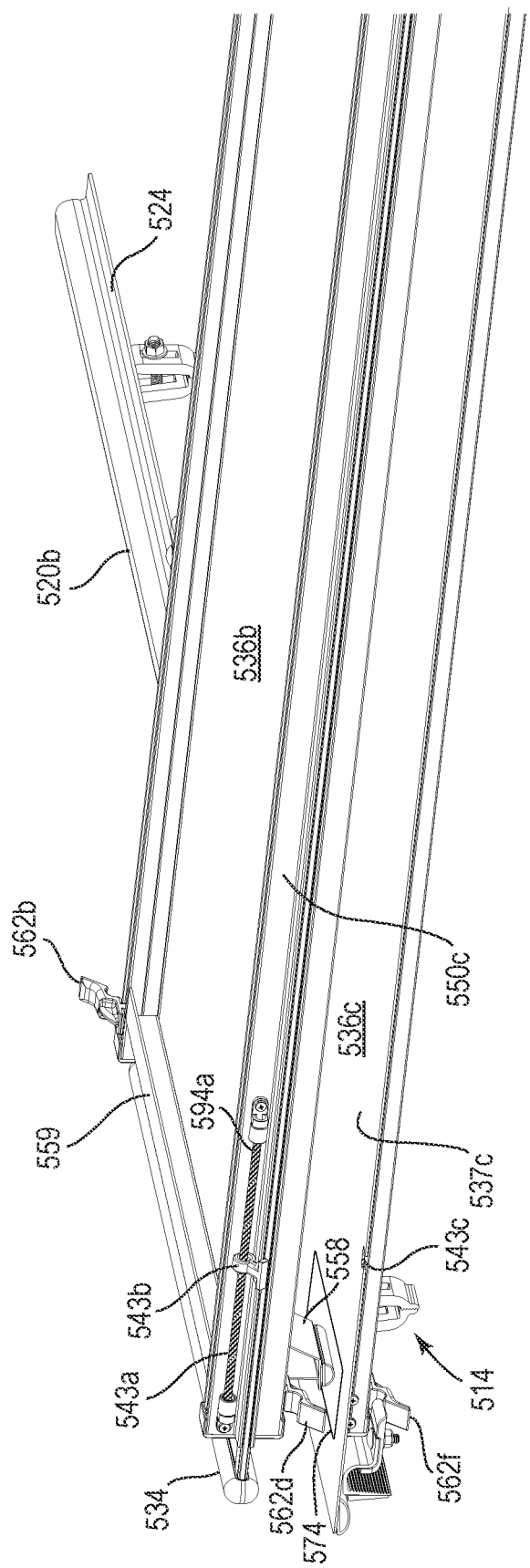
FIG. 10A is a front perspective view of the folding tonneau cover apparatus of FIG. 1 wherein the rear panel together with the middle panel and the spacer panel have been pivoted or rotated forward so that the middle panel and the rear panel are resting on the top surface of the front panel as in FIG. 9A and showing the alternate protective film on the front panel engaged by the standoff 558 which rests on the protective film 574.
Figure 10B:
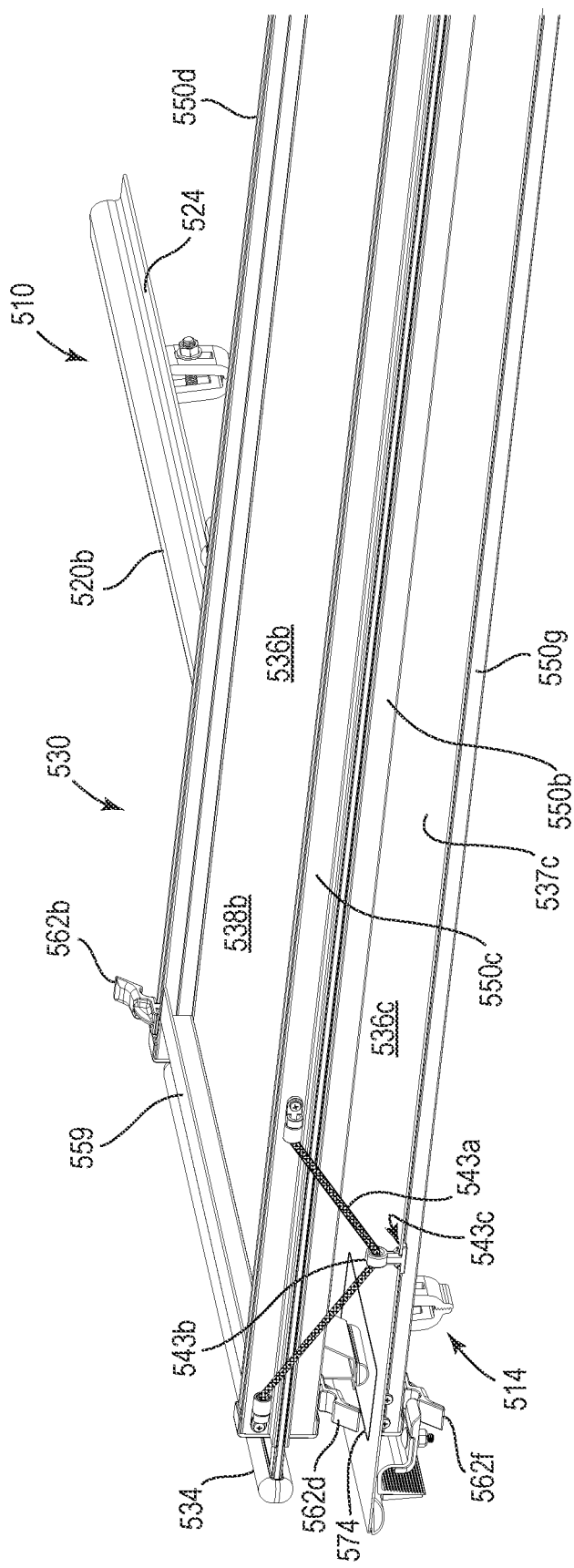
FIG. 10B is a front perspective view of the folding tonneau cover apparatus of FIG. 1 similar to the view of FIG. 10A, but showing the storage strap 543*a* pulled down and a strap bracket 543*b* engaged with a bracket slot 543*c* on the front edge of the front panel, securing the folding tonneau cover assembly 530 in the fully folded up configuration.
Figure 10C:
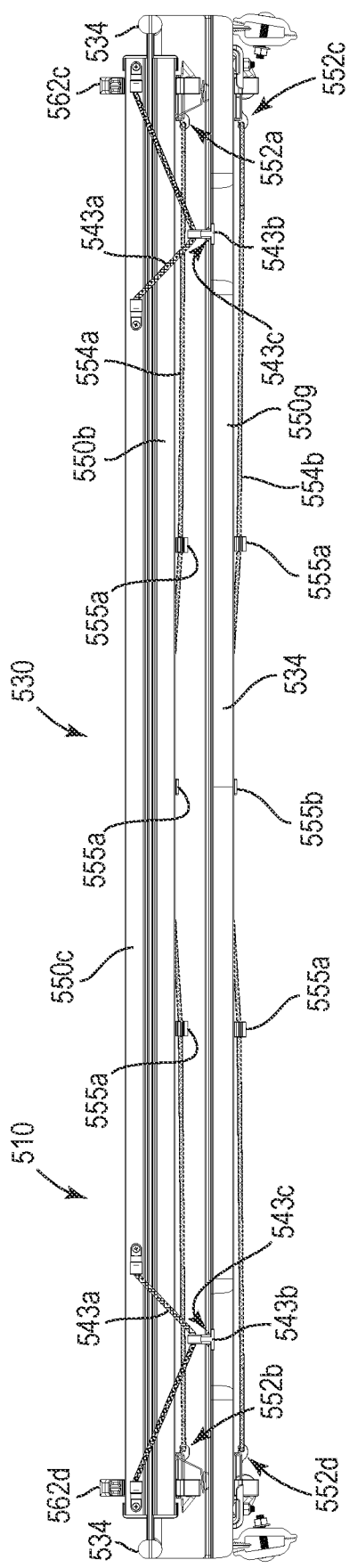
FIG. 10C is a front view of the folding tonneau cover apparatus of FIG. 1 showing a storage strap toward each side of the folded tonneau cover, with each storage strap pulled down and a strap bracket engaged with a bracket slot on the front edge of the front panel, securing the folding tonneau cover in the folded up configuration.
Figure 10D:
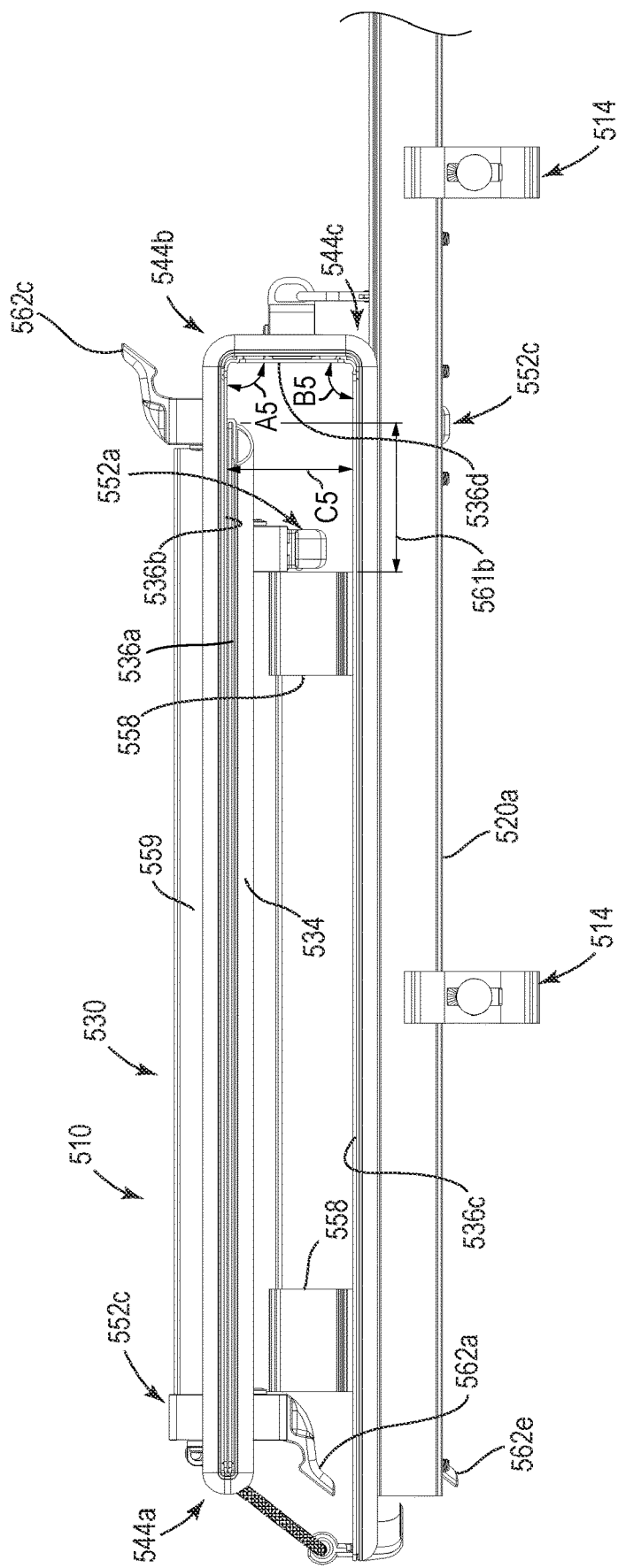
FIG. 10D is a side view from the driver's side of the folding tonneau cover apparatus of FIG. 1 in the configuration of FIG. 10C further showing the fully folded configuration and schematically illustrating the flexible hinges in the folded-up configuration, with one of the storage straps being visible and a strap bracket engaged with a bracket slot on the front panel, securing the folding tonneau cover in the fully folded up configuration.

Preferably, the length 539d of the spacer panel 536d is large enough to accommodate the hinges 544b and 544c without interference with the support bow 550e, but is preferably not significantly larger than required to accommodate the hinges 544b, 544c and support bow 550e so that the stored profile of the folding cover assembly 530 is minimized, and the folded profile when the folding cover assembly 530 is folded up but remains attached to the side rails 520a, 520b as illustrated in FIG. 10D is minimized, which is believed to reduce any tendency for the folding cover assembly 530 to catch wind when the folding cover assembly 530 is folded up but remains attached to the side rails 520a, 520b and when the truck 2 is in motion. In some embodiments, the length 539d of the spacer panel 536d is no greater than about one-third the lengths 539a, 539b, 539c of the other respective panels 536a, 536b, 536c.

Preferably, the length 539b of the middle panel 536b is somewhat smaller than the length 539c of the front panel 536c so that the driver or operator 8 can easily grasp the storage straps 543a and strap brackets 543b, when the folding cover assembly 530 is in the folded up configuration illustrated in FIG. 10A, to hook the strap brackets 543b in the bracket slots 543c at the front of the front panel 536c as described below and illustrated in FIG. 10A-10D. If the length 539c of the front panel 536c is longer than the length 539b of the middle panel 536b, the folded up configuration of the folding cover assembly 530, as illustrated in FIG. 10D, will cover a larger portion of the cargo box 5 so that there is a more limited opening to the cargo box 5 when the folding cover assembly 530 is folded up and secured on the truck 2 as illustrated in FIG. 10D. More preferably, the length 539b of the middle panel 536b is from about 0.25 inch to about 6 inches smaller than the length 539c of the front panel 536c. Still more preferably, the length 539b of the middle panel 536b is from about 1 inch to about 3 inches smaller than the length 539c of the front panel 536c. Even more preferably, the length 539b of the middle panel 536b is about 1.733 inches smaller than the length 539c of the front panel 536c.

Figure 6A:
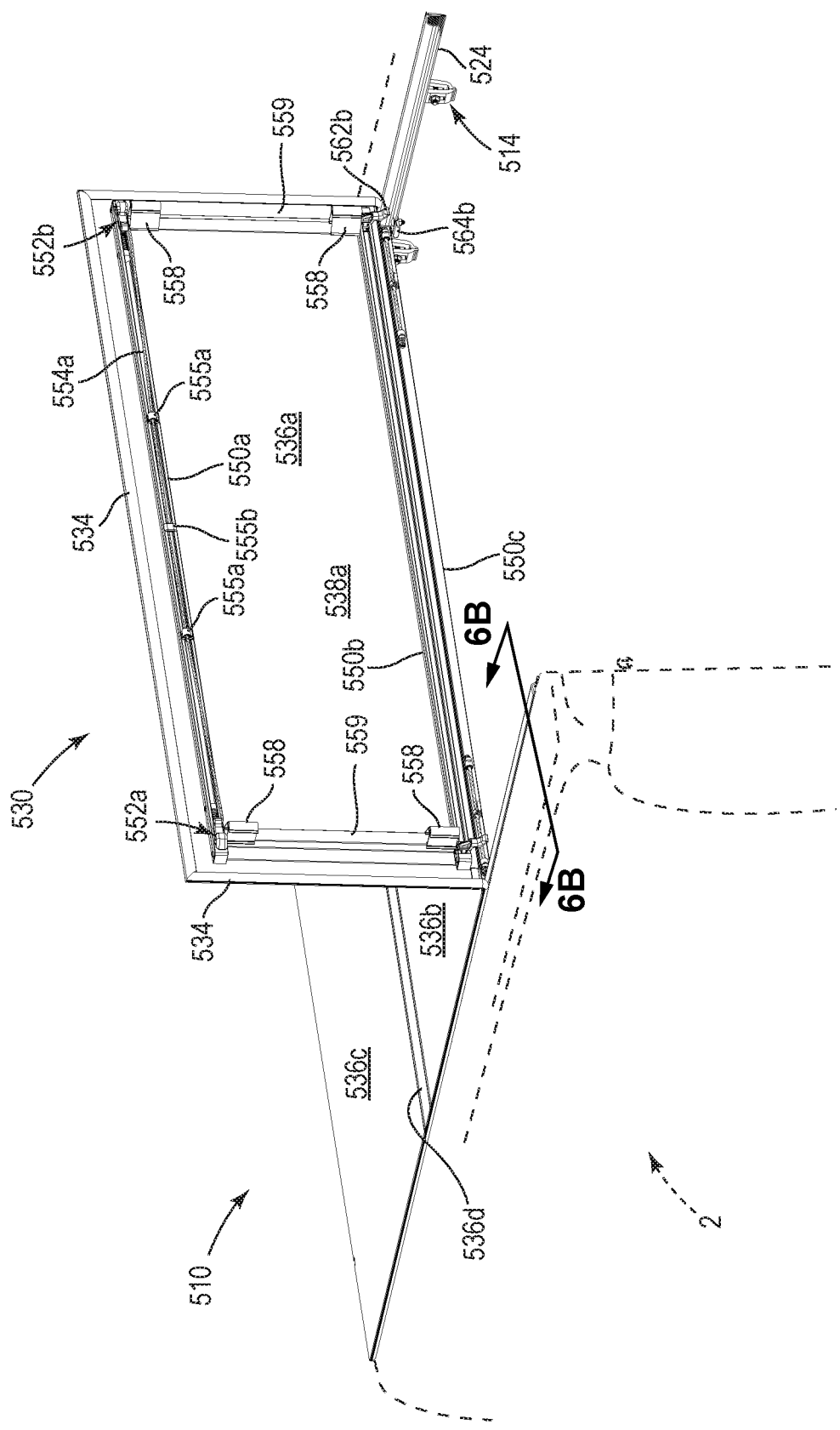
FIG. 6A is a rear perspective view of the folding tonneau cover apparatus of FIG. 1 wherein the latches on the rear panel have been released to allow the rear panel to be lifted up in a first step toward folding up the tonneau cover assembly.
Figure 6B:
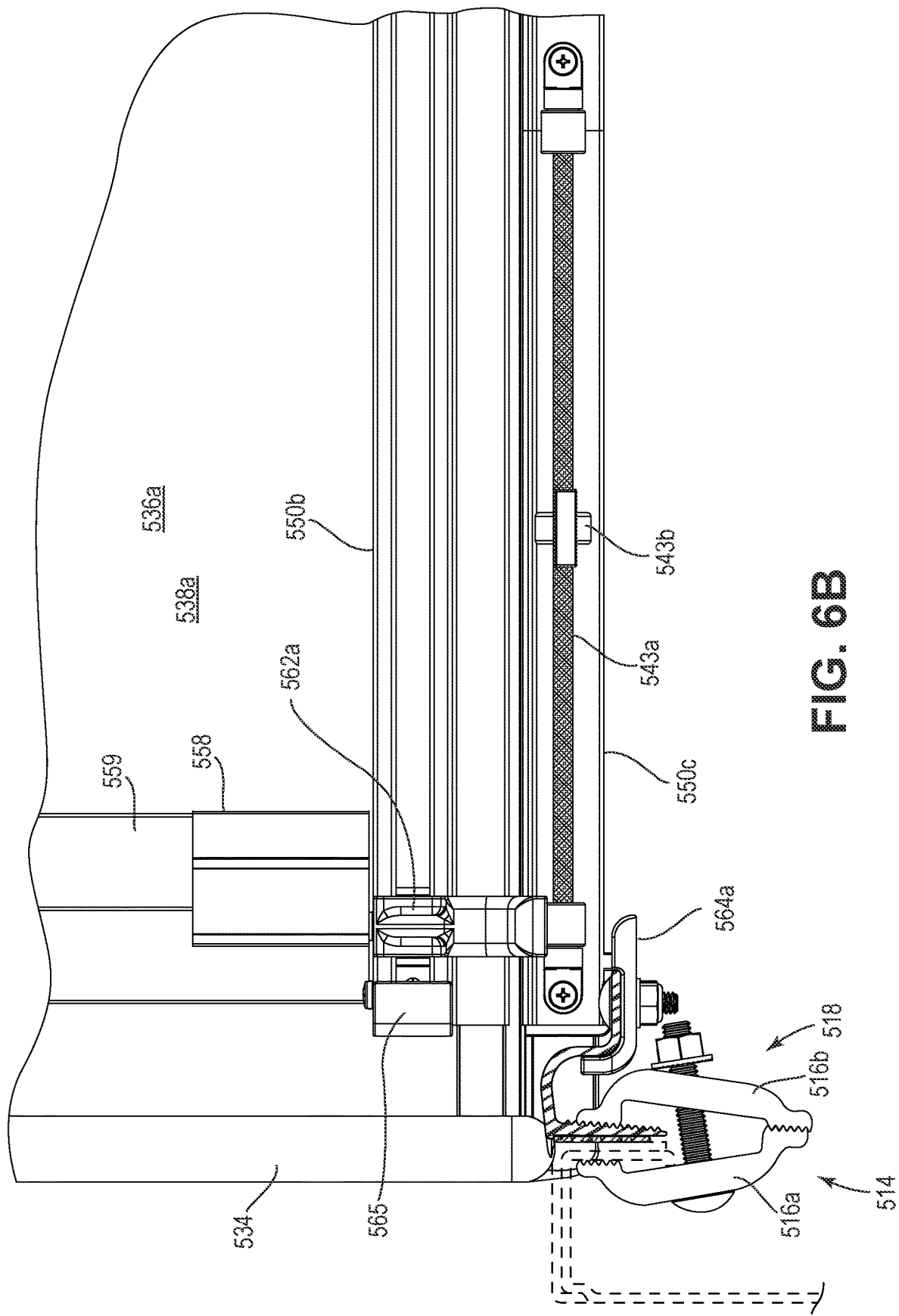
FIG. 6B is a partial section view as seen from line 6B-6B of FIG. 6A showing the hook or swing latch 562*a* near the driver's side end portion of the rear support bow of the middle panel retracted from catch 564*a* secured to the lip of the side rail.

Once the latches 552 at both ends of the support bow 550a are retracted as shown in FIGS. 4A and 4B and described above, the rear end of the rear panel 536a can be lifted up from both side rails 520a and 520b, bending the hinge 544a as illustrated in FIGS. 6A and 6B. As the rear panel 536a is lifted up, hooks 562 at the ends of the support bow 550 at the front of the rear panel 536a disengage from the respective catches 564; specifically, hook 562a disengages from catch 564a attached to side rail 520a, and hook 562b disengages from catch 564b attached to side rail 520b. The structure and function of the hooks 562 and catches 564 are described in further detail elsewhere herein (see, for example, FIG. 19A).

The rear panel 536a is rotated further, onto the middle panel 536b as illustrated in FIGS. 7A and 7B. At this point, the middle panel 536b can be lifted from the side rails 520a and 520b, with the middle panel 536b (together with the rear panel 536a which is folded onto the middle panel 536b) pivoting upwards and frontwards, bending the hinge 544b. A portion of the folding cover assembly 530 in schematic cross section view similar to the views of FIGS. 5A and 5B is illustrated in FIG. 7A, which shows the hinge 544a folded in the configuration of FIGS. 7A and 7B.

Figure 8C:
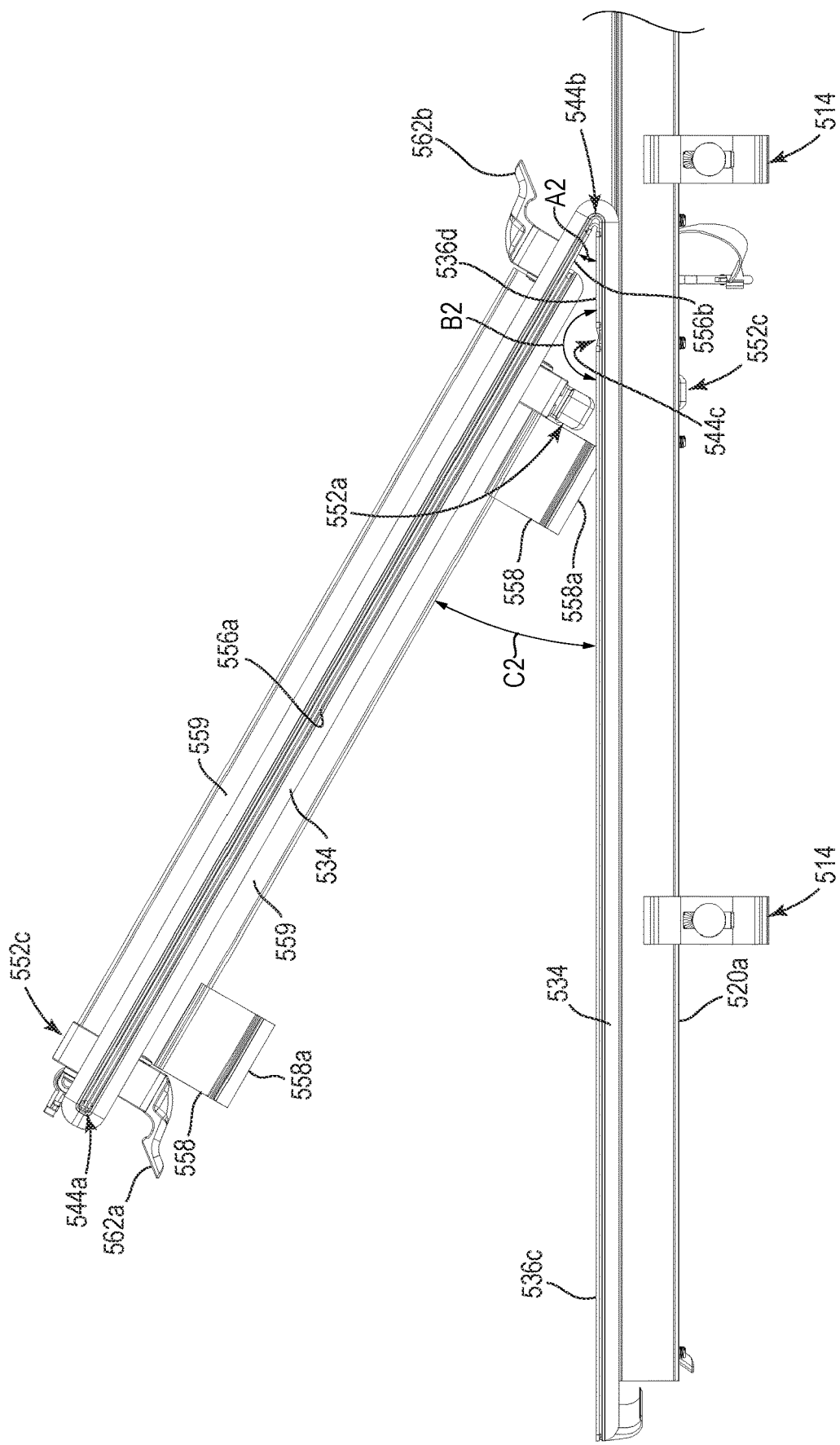
FIG. 8C is a side view as seen from the line 8C-8C of FIG. 8A, but illustrating the rear panel together with the middle panel engaged top surface to top surface as shown in FIG. 8A, but showing the two panels rotated forward further than shown in FIG. 8A to the point that the standoff 558 touches the front panel 536*c;*
Figure 8D:
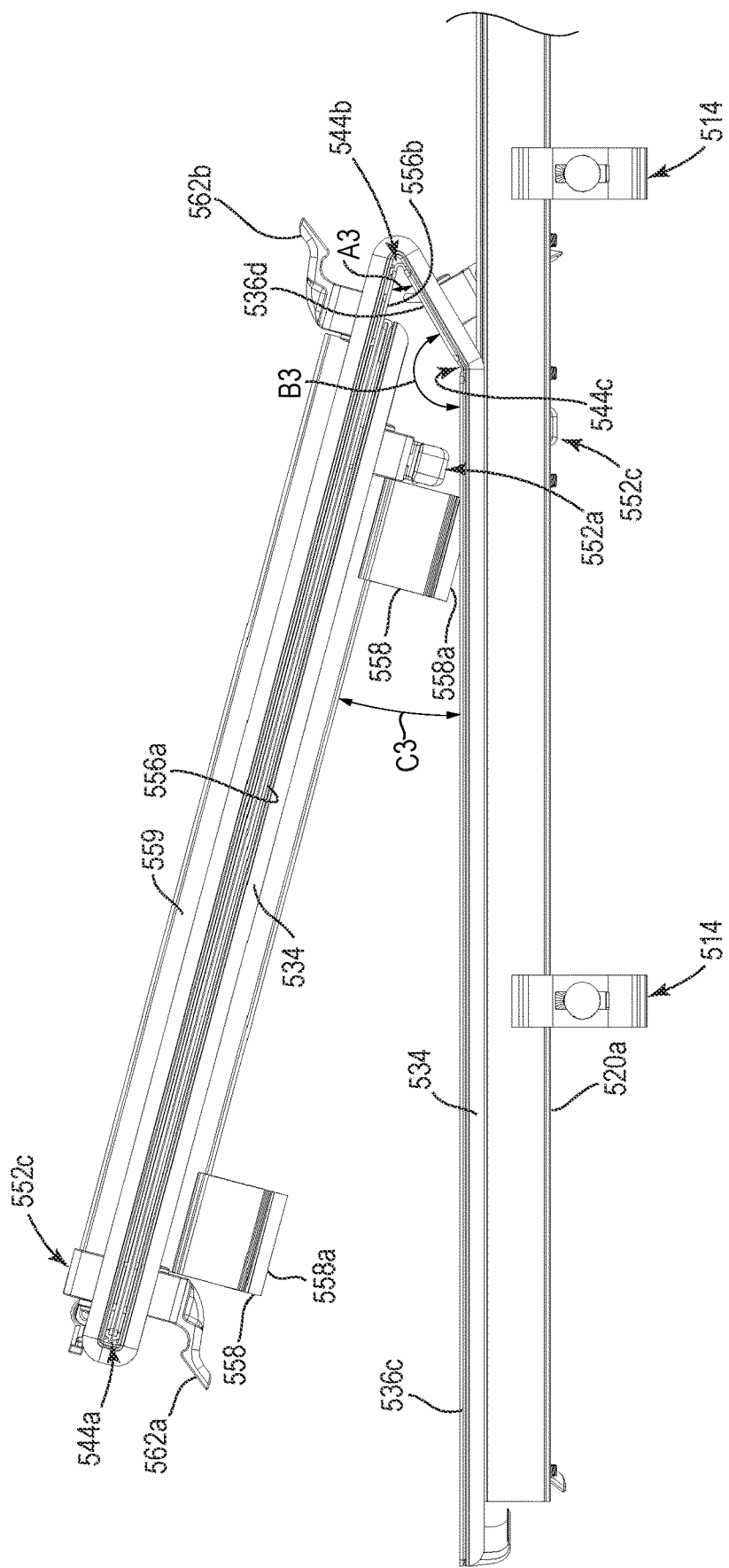
FIG. 8D is a side view similar to FIG. 8C, except that the rear panel together with the middle panel are rotated further forward so that the standoff is touching the front panel and the spacer panel is lifted up and rotated partially forward.
Figure 8E:
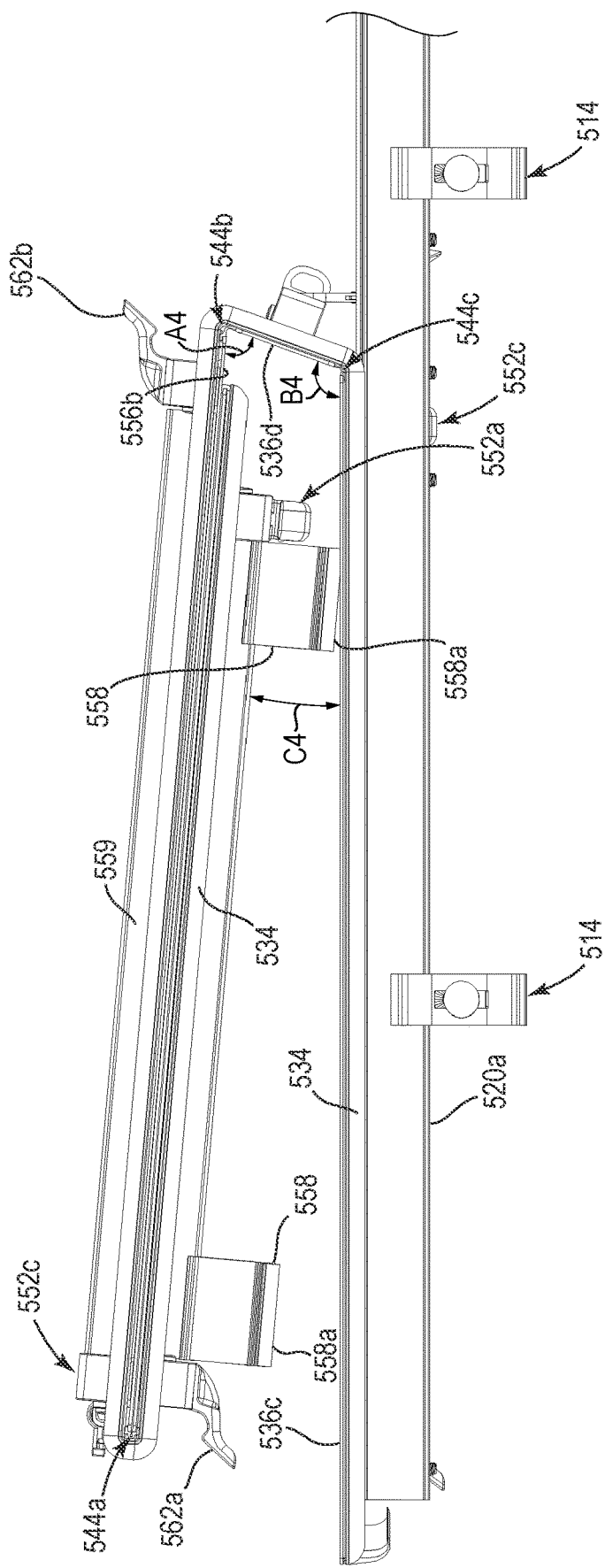
FIG. 8E is a side view similar to FIG. 8D, except that the rear panel together with the front panel are rotated still further forward and the standoff is touching the front panel and the spacer panel is lifted up further and rotated further forward.
Figure 8F:
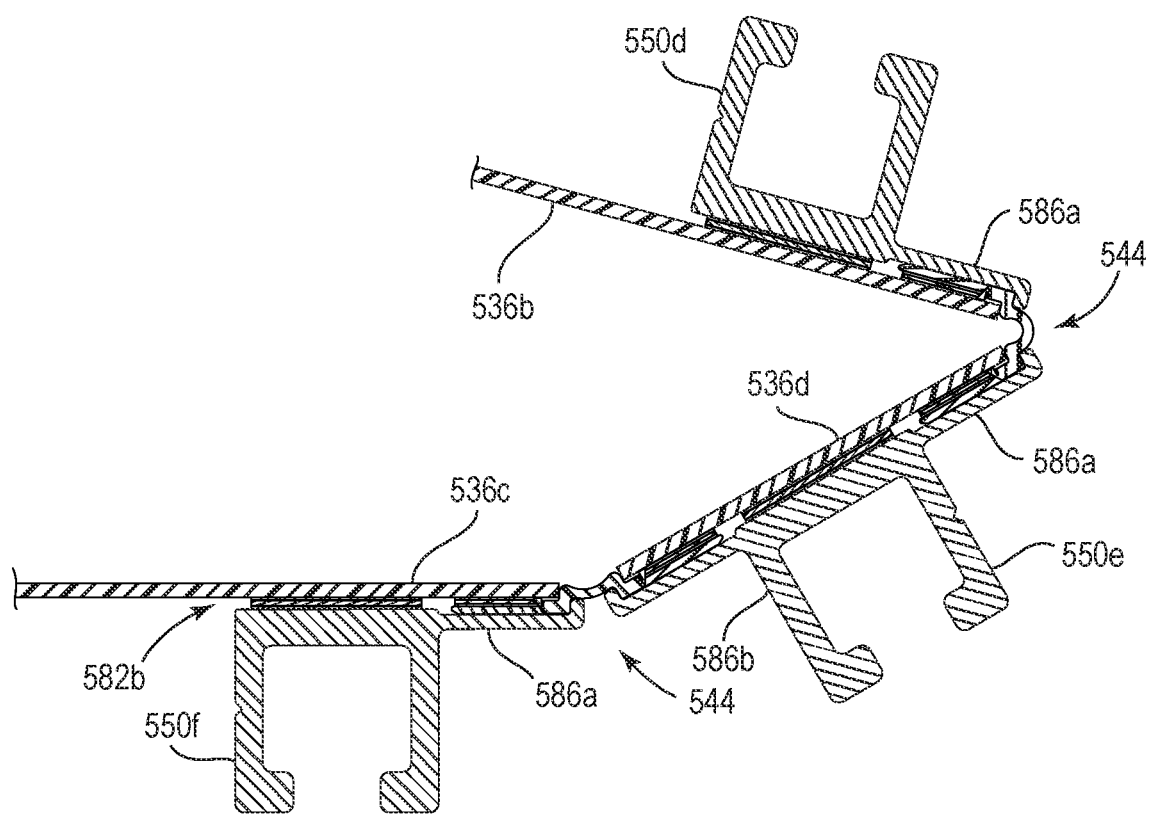
FIG. 8F is a schematic illustration showing a transverse vertical cross section similar to that of FIGS. 5C and 7C, but showing the spacer panel and two adjacent alternate hinges of the folding tonneau cover assembly of the present invention, illustrating both of the alternate hinges in a partially folded configuration similar to the partially folded orientation shown in FIG. 8D.
Figure 9A:
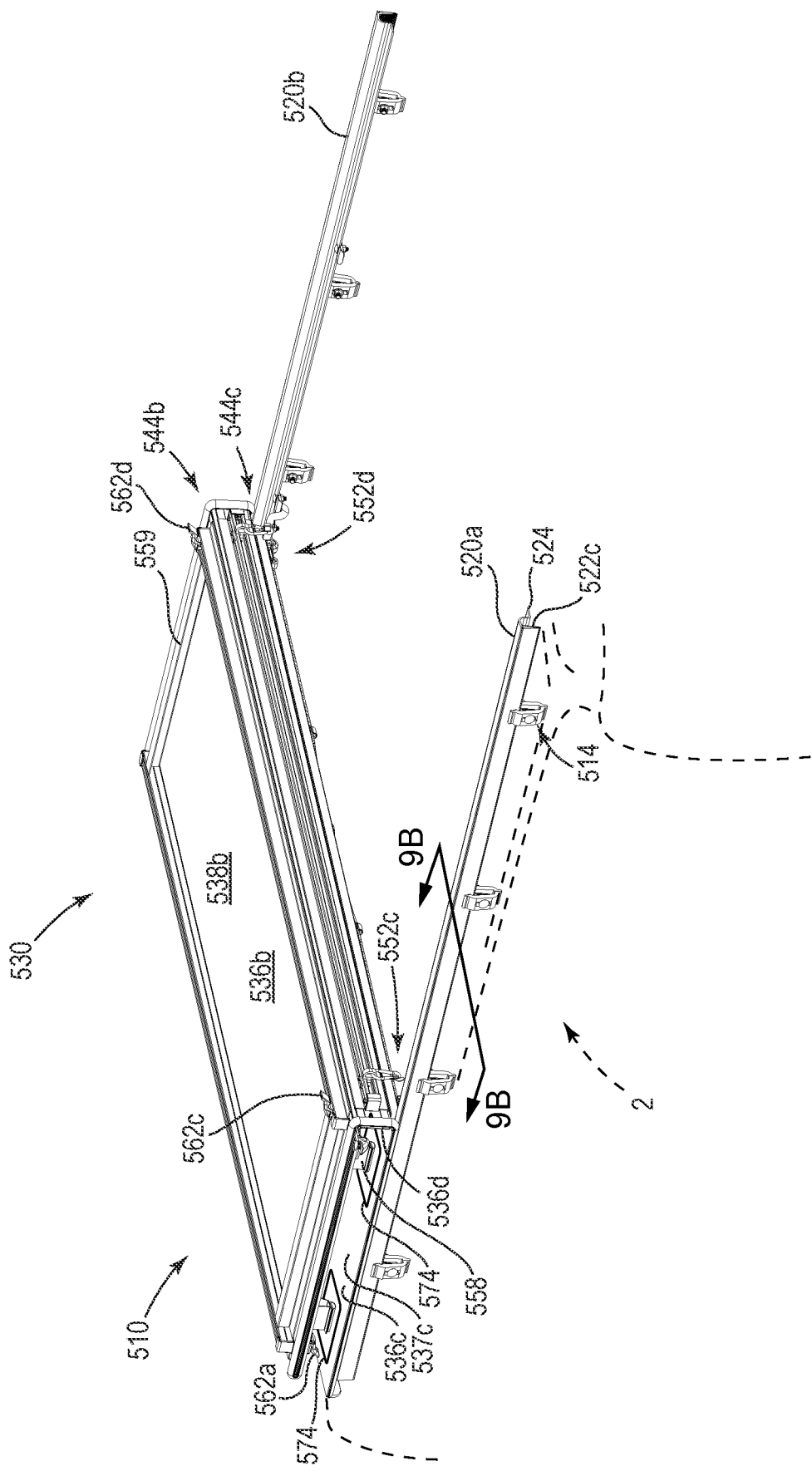
FIG. 9A is a rear perspective view of the folding tonneau cover apparatus of FIG. 1 showing the rear panel together with the middle panel and the spacer panel rotated forward so that the middle panel and the rear panel are resting together on the top of the front panel, with the spacer panel rotated upward generally at a 90 degree angle to the other panels in a fully folded orientation, but also showing the standoffs 558 resting on alternate protective films 574 shown only in FIGS. 2A, 9A, 10A, and 10B as an alternate element in those figures.
Figure 10E:
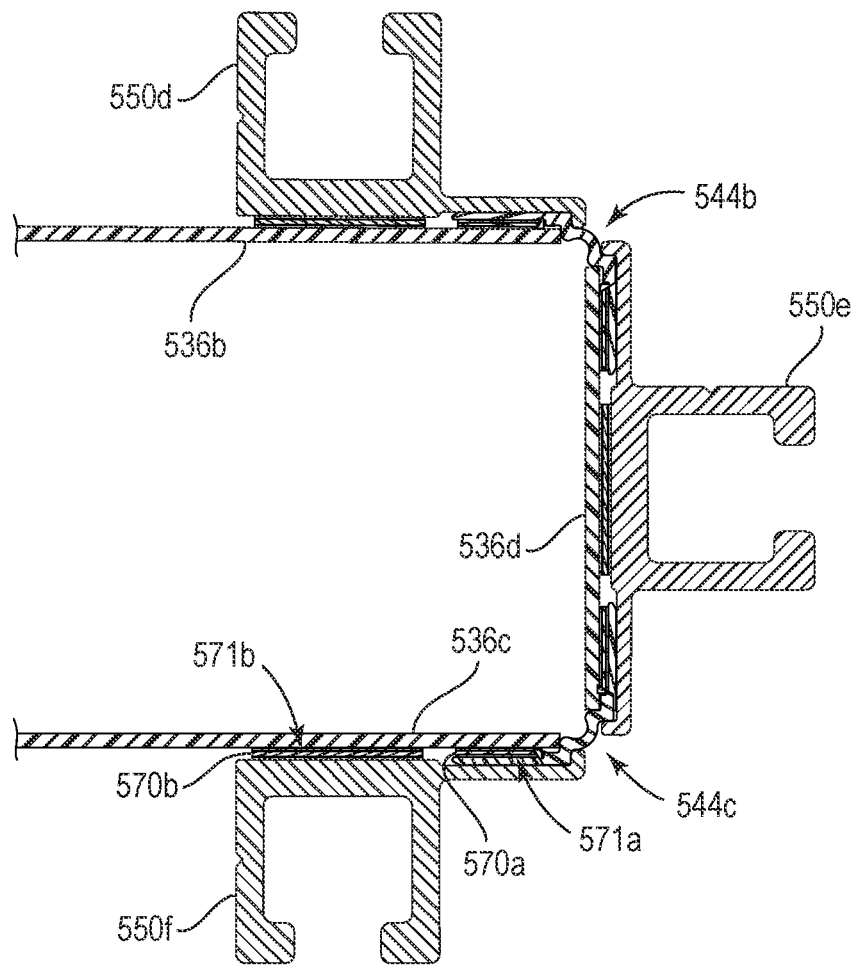
FIG. 10E is a schematic illustration showing a transverse vertical cross section similar to that of FIG. 8F, showing the a spacer panel and two adjacent hinges of the folding tonneau cover of FIG. 1, illustrating both of the alternate hinges in a 90-degree folded configuration.

With lifting and rotating of the middle panel 536b together with the rear panel 536a until the middle panel 536b is approximately vertical, the configuration is as depicted in FIG. 8A-8B. With continued lifting and rotating of the middle panel 536b frontwards, the middle panel 536b together with the rear panel 536a rotates frontwards towards the front panel 536c. Preferably, the folding cover assembly 530 includes standoffs 558, located on the underside 538a of the rear panel 536c. The standoffs 558 can be attached to the bottom side of the rear panel 536a or attached to other structures such as support bows 550 or handles 559; in the example illustrated in FIGS. 8A-8E, there are four standoffs 558, two of which are attached to each of two sidebars or handles 559 on the underside 538a of the rear panel 536c. The standoffs 558 are preferably located so that two are proximate the front edge 541b of the rear panel 536a, and two are proximate the rear edge 541c of the rear panel 536a. The standoffs 558, and a preferred attachment of the standoffs 558 to the handles 559, are described further below, including with reference to FIGS. 14A-14C. Through the folding and rotating of the middle panel 536b and the rear panel 536a as just described, the standoffs 558 proximate the rear edge 541c of the rear panel 536a contact the top surface 537c of the front panel 36c as shown in FIG. 8C. The standoffs 558 help to maintain a spaced relationship between the rear panel 536a and the front panel 536c. With continued rotating of the middle panel 536b (together with the front panel 536a) the hinge 544c bends and the spacer panel 536d lifts off the side rails 520a and 520b as illustrated in FIG. 8D. With continued rotating of the middle panel 536b frontwards, together with the rear panel 536a and the spacer panel 536d, and pivoting and sliding of the standoffs 558, the middle panel 536b, the rear panel 536a, and the spacer panel 536d rotate progressively farther frontwards towards the front panel 536c, as illustrated in FIG. 8E, until the standoffs 558 all contact the front panel 536c (FIG. 9A). During this folding of the folding cover assembly 530, the hinges 544b and 544c flex as the middle panel 536b, the rear panel 536a, and the spacer panel 536d rotate towards the front panel 536c as schematically illustrated in FIGS. 8F and 10E. Depending on forces applied by the driver or other operator 8, the hinges 544b and 544c can flex to pass through various increasing or decreasing angles. Most commonly, however, the angles will vary in the following manner. Referring to FIGS. 8A, 8C-8E, and 10D, during the folding up of the folding cover assembly 530, the angle A between the middle panel 536b and the spacer panel 536d (which is about 180 degrees before beginning the folding of the middle panel 536b onto the front panel 536c, as in the configuration illustrated in FIG. 7A) initially decreases to angle A1 which is about 90 degrees as shown in FIG. 8A, then decreases past 90 degrees to angle A2 at which point the standoffs 558 contact the top surface 537c of the front panel 536c as shown in FIG. 8C; angle A2 may be about 35 degrees, but may be somewhat larger or smaller than about 35 degrees depending on the standoff distance 561a (FIG. 14C) and a setback distance 561b (FIG. 10D) between the standoff 558 proximate the rear edge 541c of the rear panel 536a and the rear edge 541c of the rear panel 536a, and also depending on the relative lengths 539a and 539b of the rear panel 536a and the middle panel 536b, respectively. Angle B between the spacer panel 536d and the front panel 536c (which is about 180 degrees before beginning the folding up of the folding cover assembly 530, as in the configuration illustrated in FIG. 7A) is shown as angle B1 in the configuration of FIG. 8A as about 180 degrees, and is shown as angle B2 in the configuration of FIG. 8C, preferably remaining at about 180 degrees until the standoffs 558 contact the top surface 537c of the front panel 536c as shown in FIG. 8C. Angle C between the rear panel 536b and the front panel 536c (which is about 180 degrees before beginning the folding up of the folding cover assembly 530, as in the configuration illustrated in FIG. 7A) initially decreases to angle C1 which is about 90 degrees as shown in FIG. 8A, then decreases past 90 degrees to angle C2 at which point the standoffs 558 contact the top surface 537c of the front panel 536c as shown in FIG. 8C. With continued rotation of the rear panel 536a and middle panel 536b and spacer panel 536d, depending on the forces and manipulations applied by the driver or operator 8, the angle A may remain about the same or may increase again as the angle B begins to decrease and the angle C continues to decrease, as shown as angles A3, B3, and C3 in FIG. 8D. With still continued rotation of the rear panel 536a and middle panel 536b and spacer panel 536d, the angles A and B continue to approach about 90 degrees as the angle C continues to approach zero degrees as shown as angles A4, B4, and C4 in FIG. 8E. When the folding cover assembly 530 is completely folded, the angles A and B are preferably about 90 degrees and the angle C is preferably about zero degrees, as shown as angles A5, B5 and C5 in FIG. 10D, with the rear panel 536a, the middle panel 536b, and the front panel 536c being approximately parallel to each other, and the spacer panel 536d approximately vertical, oriented at about 90 degrees with respect to the panels 536a, 536b, and 536d.

As the folding cover assembly 530 is folded up, the angle C between the rear panel 536a and the front panel 536c decreases towards about zero degrees, passing through the configurations depicted in FIGS. 8C-8E. For embodiments in which the folded configuration of the folding cover assembly 530 has the rear panel 536a folded so that it is parallel to the front panel 536c, the approximate relationship between the angles A, B, and C is believed to be given by the equation (angle C)=(angle A)+(angle B)−(180 degrees).

Figure 9B:
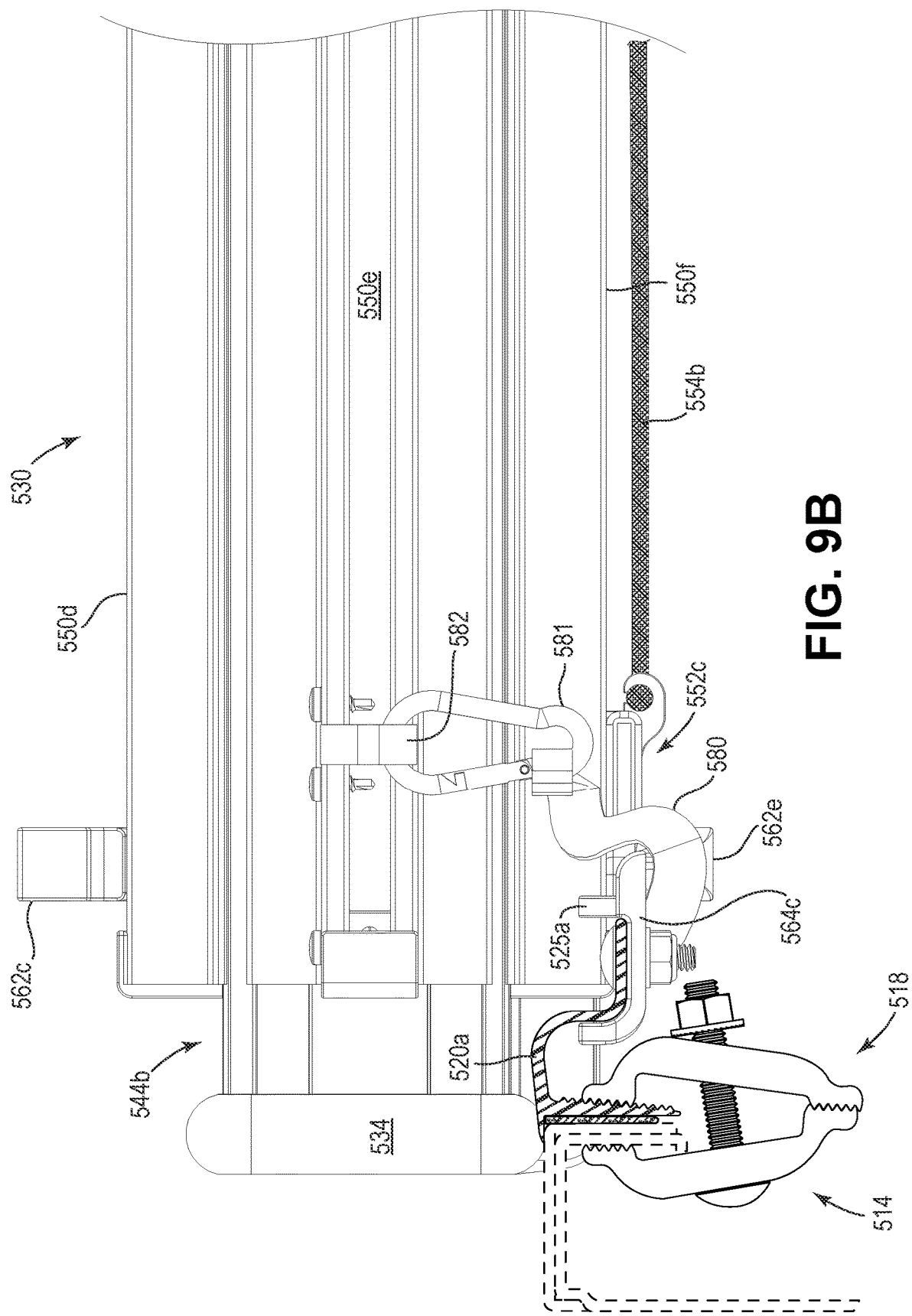
FIG. 9B is a partial section view as seen from the line 9B-9B of FIG. 9A illustrating the driver's side of the completely folded tonneau cover assembly showing the rear support bow of the front panel resting on the lip of the driver's side side rail.

At this point, as illustrated in FIGS. 9A, 9B, and 10A, the folding cover assembly 530 is folded up, but is still attached to the side rails 520a and 520b, with the latches 552c and 552d (proximate the ends of the support bow 550f) engaged with the side rail lip 524 of the side rails 520a and 520b, respectively, and the hooks 562e and 652f proximate ends of the support bow 550g engaged with the catches 564e and 564f, respectively, as illustrated in FIGS. 10C-11A. Preferably, the containment bracket or anchor socket 525a is affixed to the side rail 520a (see for example FIGS. 2E and 9B), and a mirror-image anchor socket 525b is affixed to side rail 520b (see for example FIG. 11A). The anchor sockets or containment brackets 525a and 525b keep the engaging portion 553b of the latches 552 proximate each end of the support bow 550g in a desired location along the side rail lip 524 of the side rails 520a and 520b and thereby aid in positioning the folding cover assembly 530 in a desired alignment with respect to the cargo box 5 when the engaging portion 553b of the latches 552 at each end of the support bow 550g are engaged with the side rail lip 524 of the side rails 520a and 520b.

Referring now to FIGS. 10A-10D, bundling means such as bungee cords or storage straps 543a can be utilized to fix the folding cover assembly 530 in the folded configuration; other straps, buckles, or hooks can be utilized as bundling means. FIGS. 10A-10D show a preferred embodiment, in which two elastic storage straps 543a are provided, one towards either side of the middle panel 536b, for securing the folding cover assembly 530 in a folded configuration. Preferably, strap brackets 543b are provided for each storage strap 543a, for hooking the storage straps 543a to the front panel 536c; the strap brackets 543b are preferably formed of a strong polymer such as a polyamide, although other materials, including composites and metals, can be used. More preferably, the strap brackets 543b are formed of nylon. Preferably, bracket slots 543c are provided in the front panel 536c, and accommodate the strap brackets 543b. The strap brackets 543b are attached to or captured on the storage straps 543a, and the strap brackets 543b hook to the bracket slots 543c in the front panel 536c to secure the folding cover assembly 530 in the folded configuration when desired. In the front perspective view of FIG. 10B of the folded folding cover assembly 530, a storage strap 543a is hooked to the front panel 536c with a strap bracket 543b. Also illustrated on FIG. 10B are support bows including support bows 550b, 550c, 550d, and 550g, swing latches 562b, 562d, and 562f, standoff 558, protective pad 558a, and protective film 574. FIG. 10C is a front view which illustrates a storage strap 543a near each side of the middle panel 536b which is hooked to the front panel 536c with corresponding strap brackets 543b to secure the folded folding cover assembly 530 in a folded configuration as shown. FIG. 10D shows a side view of this folded configuration of the folding cover assembly 530, with the rear panel 536a secured to the front panel 536c. The folding cover assembly 530 can be left in this folded configuration, as illustrated in FIG. 10D, covering only the front portion of the cargo box 5.

The protective film(s) 574 is preferably located on the top surface 537c of the front panel 536c so that the protective film 574 is aligned with the respective standoff 558 as illustrated in FIGS. 9A, 10, and 10B, which illustrate the folding tonneau cover assembly 530 folded up. When the protective film 574 is located as shown between the standoff 558 and the top surface 537c of the front panel 536c, damage to the top surface 537c by contact and abrasion by the protective pad 558a is minimized. When traveling, the folding tonneau cover assembly 530 may be in the folded up configuration such as illustrated in FIG. 10B, with the strap bracket 543b of each storage strap 543a engaged with the bracket slot 543c as illustrated.

Figure 11A:
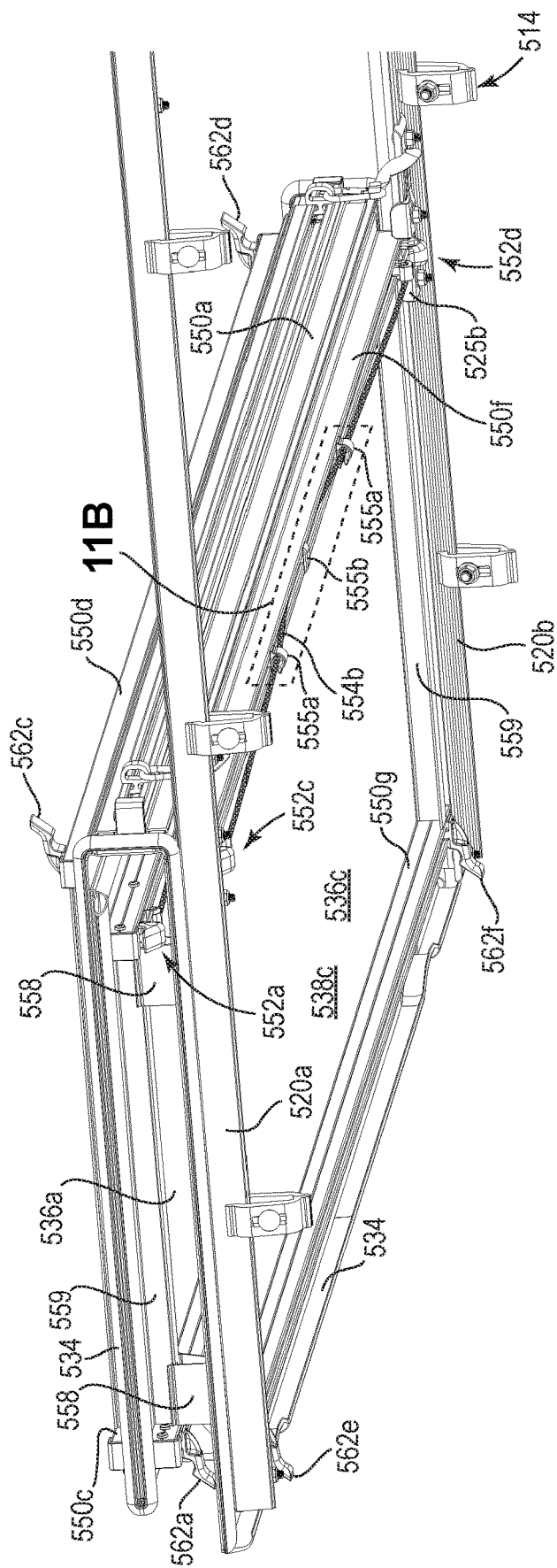
FIG. 11A is a rear perspective view of the folding tonneau cover apparatus of FIG. 1 viewed from slightly below and to the driver's side of the folding tonneau cover apparatus, wherein the folding tonneau cover assembly is secured in the fully folded up configuration similar to that of FIGS. 10B-10D, showing a release cord for pulling the latches on the front panel against the bias of the springs to release the latches and schematically illustrating the flexible hinges in a manner similar to that in FIG. 10D.

The folding cover assembly 530, folded up and bundled and left secured to the side rails 520a and 520b in the configuration of FIGS. 10B-10D is illustrated in a rear perspective view, viewed from slightly below and to the driver's side of the folding tonneau cover apparatus in FIG. 11A. As state above, the cord guides 555 preferably include clip cord guides 555a and retainer cord guides 555b; the clip cord guides 555a and retainer cord guides 555b are further illustrated in FIG. 11B. The truck can be driven with the folding cover assembly 530 in this folded up configuration if desired.

Figure 12:
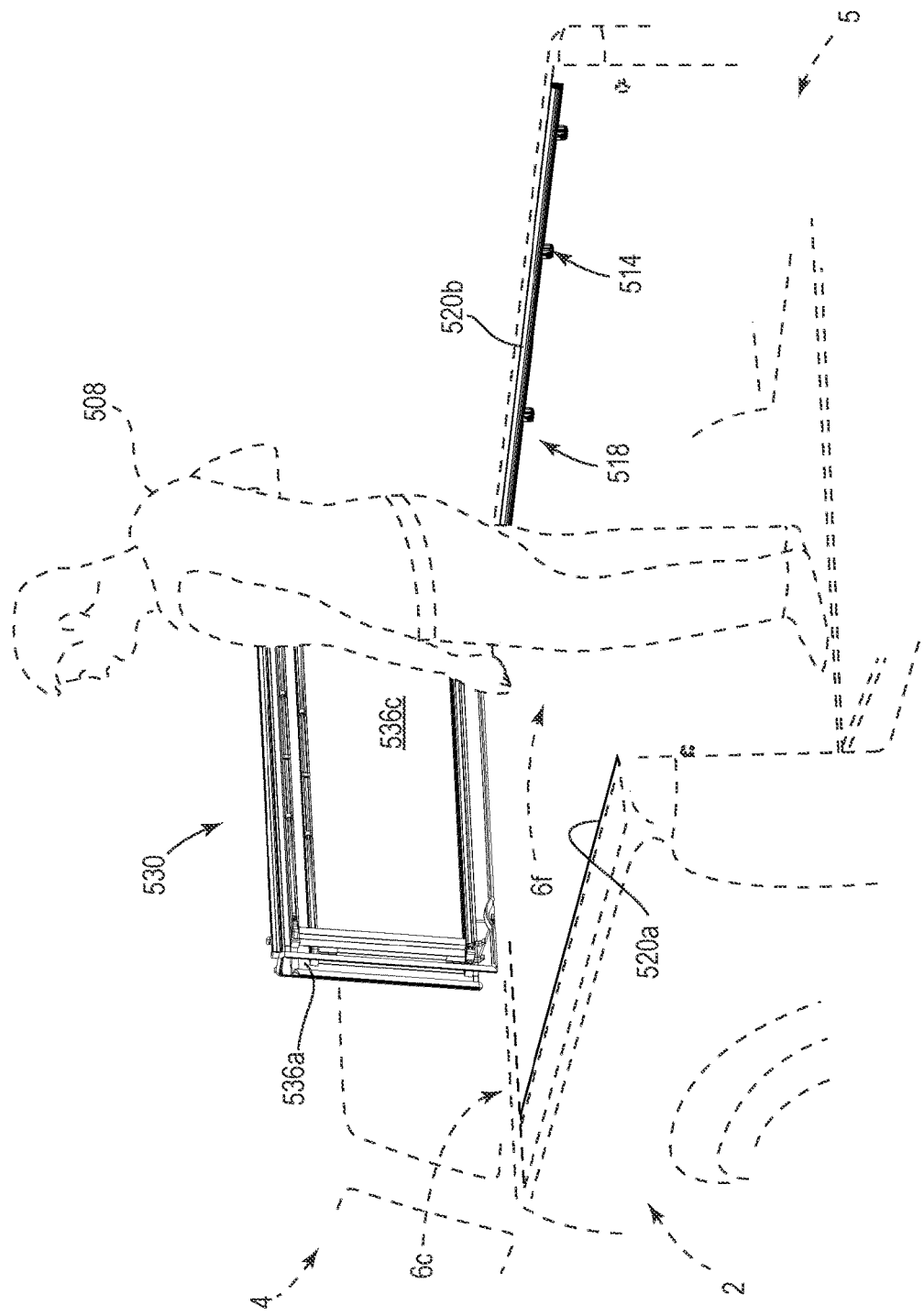
FIG. 12 illustrates the folding tonneau cover assembly 530 of FIG. 1, secured in the fully folded up configuration disengaged from the support frame assembly 518 and being held in the arms of an operator.

Alternatively, if it is desired to remove the folding cover assembly 530 to leave the cargo box 5 completely uncovered, the folding cover assembly 530 can be removed as follows. As illustrated in FIG. 11A the release cord 554b is accessible and can easily be grasped by a driver or other operator 8. Pulling on the release cord 554b will retract the latches 552 at the ends of the support bow 550f against the force of the biasing members or springs 556, similar to the way in which pulling on the release cord 554a retracts the latches 552 at the ends of the support bow 550a as illustrated in FIG. 4B. Typically, the release cord 554b will be pulled by a driver or other operator 8; the operator 8 preferably has entered the cargo box 5 via the tailgate 6d to grasp the release cord 554b. When the release cord 554b is pulled, the engaging portions 553b of the latches 552 at the ends of support bow 550f are retracted away from the lips side rail lips 524 of the side rails 520a and 520b, releasing the latches 552 from the side rails 520a and 520b, and allowing the rear portion of the front panel 536c to be lifted up from the side rails 20a and 20b and rotated to disengage the hooks 562e and 562f from the catches 564e and 564f, respectively. In this configuration, the folded folding cover assembly 530 is free from the side rails 520a and 520b of the support frame assembly 518 and can be lifted up and off the cargo box 5 as illustrated in FIG. 12; the folding cover assembly 530 can be moved away from the pickup truck 2, or stowed in the cargo box 5 or elsewhere as desired. In this case, the top opening 6f of the cargo box 5 is not partially covered by the folded up folding cover assembly 530.

When it is desired to replace the folding cover assembly 30 on the cargo box 5, or to close one or more panels 36, the various steps illustrated can be done in the reverse order, as described in further detail below in reference to FIG. 19C. To latch the various latches 552, however, it is not necessary to manually retract any of the release cords 554, since the latch slide 553 has an inclined bottom surface 553a. When the latch slide 553 contacts and is forced further towards the side rail lip 524 of the side rails 520a or 520b, the inclined bottom surface 553a of the latch slide 553 will retract the engaging portion 553b to allow the engaging portion 553b to move past the side rail lip 524, whereupon the spring 556 will move the engaging portion 553b into the secured configuration, such as illustrated in FIG. 3B and elsewhere herein.

Figure 13A:
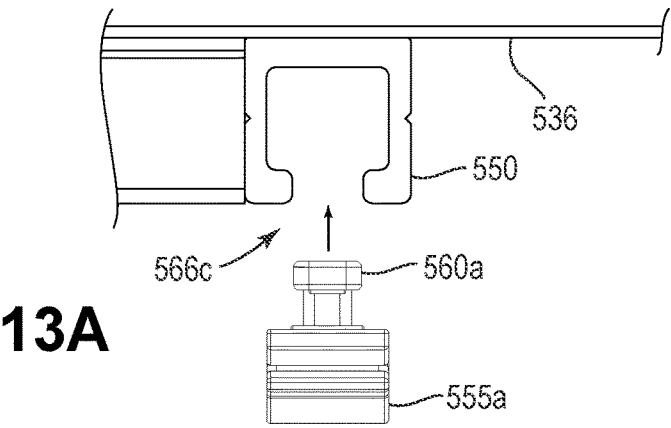
FIG. 13A illustrates a clip cord guide aligned for attachment to a support bow or support member.
Figure 13B:
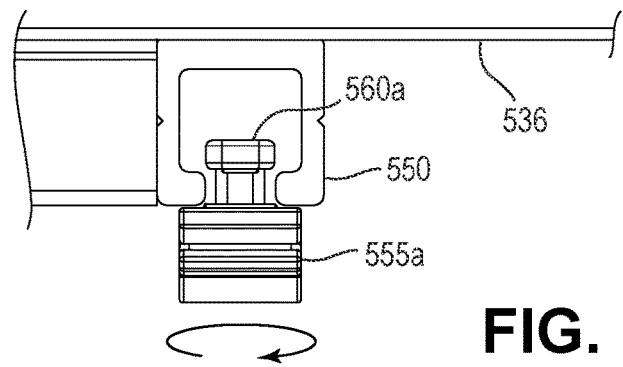
FIG. 13B illustrates the clip cord guide of FIG. 13A inserted into a channel of the support bow.
Figure 13C:
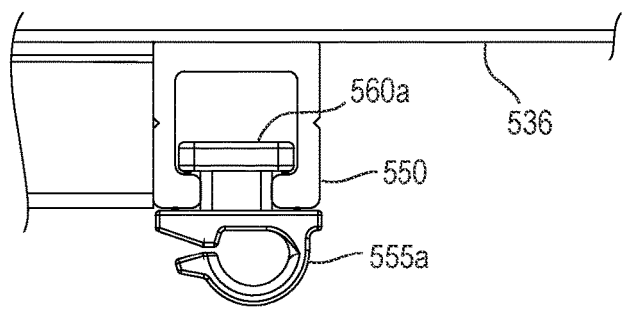
FIG. 13C illustrates the clip cord guide of FIGS. 13A and 13B rotated so that an oblong securement feature engages the clip cord guide within the channel of the support bow.
Figure 13D:
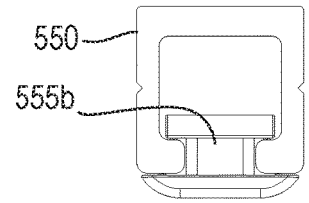
FIG. 13D illustrates a retainer cord guide secured to a support bow.

Referring now to FIGS. 13A-13D, the cord guides 555 are schematically illustrated. As stated above, the cord guides 555 preferably include clip cord guides 555a and retainer cord guides 555b. Each clip cord guide 555a is preferably attached to a support bow 550 as illustrated in FIGS. 13A-13C. The clip cord guide 555a preferably has a securement feature or securement portion 560a which is configured for attachment to the support bow 550. The securement feature 650a is preferably oblong and is narrow enough to fit into the channel opening 566c, and when aligned with the open bottom of the bow bottom portion 566b as illustrated in FIG. 13A, the securement feature 650a can be inserted into the support bow 550 as shown in FIG. 13B. The clip cord guide 555a is then rotated as indicated by the arrow on FIG. 13B so that the securement feature 650a secures the clip cord guide 555a to the support bow 550 as shown in FIG. 13C. Each retainer cord guide 555b is preferably inserted into the open end of the support bow 550 and slid along the support bow 550 to a desired location. The release cord 554 passes between the retainer cord guide 555b and the support bow 550 as schematically illustrated in FIG. 13D so that the retainer cord guide 555b retains the release cord 554. The combination of clip cord guide(s) 555a and retainer cord guide(s) 555b keep the respective release cord positioned in alignment with the latches 552 and adjacent to or within the respective support bow 550. Note that in the schematic illustrations of FIGS. 13A-13D, some elements are not shown, such as the adhesive 570b (which may include adhesive tape 571b), hinge 544, hinge support flange 586, and so forth, in order to highlight the particular features being described. The elements shown in the schematic illustrations of FIGS. 13A-13D are not necessarily drawn to scale.

Referring now to FIGS. 14A-14C, attachment of a standoff 558 to a sidebar or handle 559 is illustrated. The standoff 558 preferably has a securement portion 560b which is configured for attachment to the sidebar or handle 559. Preferably, the securement portion 560b preferably includes two longitudinal grooves 558b and 558c which can engage the handle 559. The standoff 558 preferably includes an elongated projection 558d which can be grasped to snap the standoff 558 onto the handle 559 or to remove the standoff 558 from the handle 559. Further, the elongated projection 558*d* is preferably angled to aid in guiding the standoff 558 into engagement with the handle 559. Preferably, the longitudinal groove 558*b* is hooked onto the handle 559 as illustrated in FIG. 14B, and the elongated projection 558*d* is used to aid in hooking the longitudinal groove 558*c* onto the handle 559 to secure the standoff 558 on the handle 559 as illustrated in FIG. 14C. The dimensions of the standoff 558 and position of the standoff 558, including the standoff distance 561*a* and the setback distance 561*b* (FIG. 10D) when secured to the handle 559 together determine the angle C2 (FIG. 8C) at which the standoff 558 contacts the front panel 536*c* when the folding cover assembly 530 is being folded up. Preferably, a protective pad or insert or rubber foot 558*a* is attached to the end of the standoff 558 as shown; the protective pad 558*a* preferably secures to the standoff 558 by adhesive such as those described herein or other adhesive known in the art. The protective pad 558*a* serves to reduce impact or abrasion damage to the front panel 536*c* when the folding cover assembly 530 is folded up onto the front panel 536*c*.

In this example, the length 539*d* of the spacer panel 536*d* is substantially smaller than the lengths 539*a*, 539*b*, 539*c* of the other panels 536*a*, 536*b*, 536*c* (FIG. 2A). The dimensions of the standoff 558 are chosen to accommodate the length 539*d* of the spacer panel 536*d*, so that the front panel 536*a* and the rear panel 536*c* are preferably parallel and separated from one another in the folded configuration such as is illustrated in FIG. 10D. The larger lengths 539*a*, 539*b*, 539*c* of panels 536*a*, 536*b*, 536*c* provide for efficient coverage of the cargo box 5, while the smaller length 539*d* of the spacer panel 536*d* provides for folding up of the folding cover assembly 530 to a convenient folded size, while providing space for the various hinges 544, support bows 550, and other components within the folded-up folding cover assembly 530. As the spacer panel 536*d*, the middle panel 536*b*, and the rear panel 536*a* are folded together onto the front panel 536*c*, the standoff 558 the rear end of each of the handles 559 attached to the bottom surface 538*a* of the rear panel 536*a* contacts the front panel 536*c* and provides a pivot point and sliding support to aid in orienting the panels 536 in the folded configuration as shown. Preferably, the standoff 558 is long enough to ensure contact between the protective pad 558*a* and the top surface 537*c* of the panel 536*c* in order to minimize movement and stress on the hinges 544*b* and 544*c* and to minimize any damage due to abrasion between the protective pad 558*a* and the top surface 537*c* of the panel 536*c*. Preferably, the standoff 558 is short enough to avoid undue stress on the panel 536*c* and the hinges 544*b* and 544*c* when the folding cover assembly 530 is folded up as illustrated in FIGS. 10A-10D.

Figure 15A:
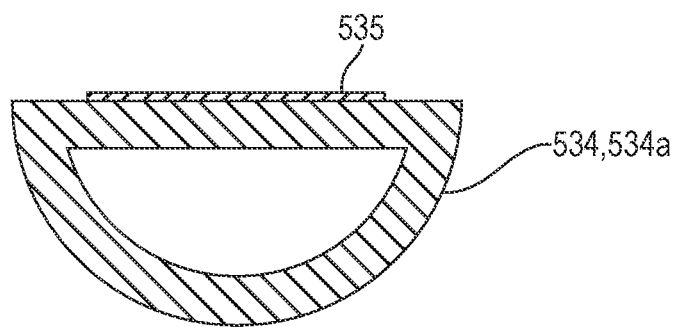
FIG. 15A illustrates a preferred perimeter seal in a transverse vertical cross section.
Figure 15B:
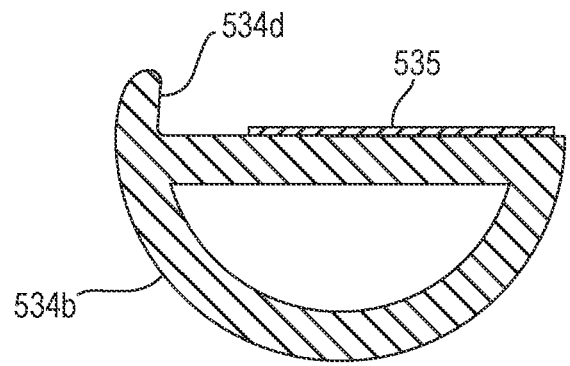
FIG. 15B illustrates an alternate perimeter seal in a transverse vertical cross section.
Figure 15C:
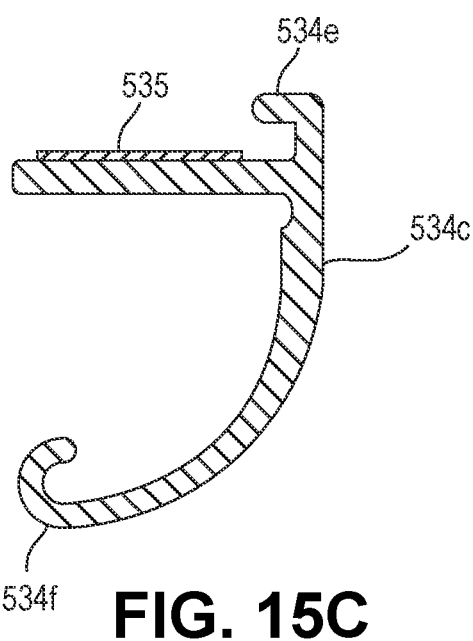
FIG. 15C illustrates a further alternate perimeter seal in a transverse vertical cross section.
Figure 15D:
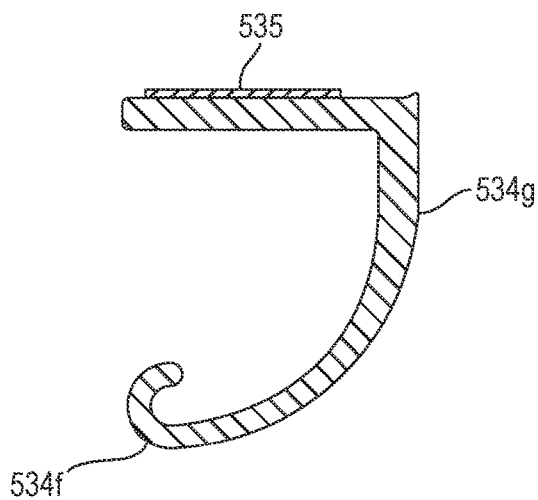
FIG. 15D illustrates another alternate perimeter seal in a transverse vertical cross section.

Referring to FIGS. 15A-15C, the perimeter seal 534 provides a seal against the entry of water, dust, or other debris into the cargo box 5 around the perimeter of the folding cover assembly 530. The perimeter seal 534 can also adapt to irregularities in the fit between the folding cover assembly 530 and the sidewalls 6*a*, 6*b*, front wall 6*c*, and tailgate 6*d* of the cargo box 5. The perimeter seal 534 is preferably attached to the panels 536 with adhesive such as adhesive 570*a*, 570*b* described above, although other attachment mechanisms can be used to secure the perimeter seal 534 to the underside 538 of the respective panel 536, such as those described herein for attachment of the flexible hinge 544 or the support bows 550 or the handle 559 to the panels 536. FIG. 15A schematically illustrates one example perimeter seal 534*a* having D-shaped cross section as shown.

Figure 15E:
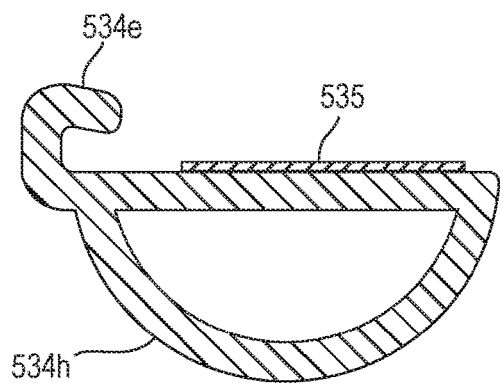
FIG. 15E illustrates another alternate perimeter seal in a transverse vertical cross section.
Figure 15F:
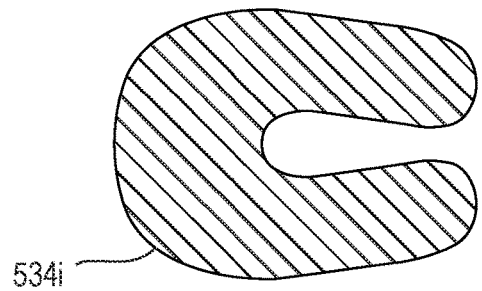
FIG. 15F illustrates a rigid panel edge guard in a transverse vertical cross section.
Figure 15G:
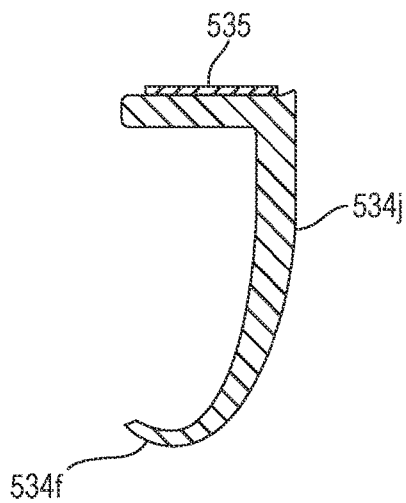
FIG. 15G illustrates a still further alternate perimeter seal in a transverse vertical cross section.
Figure 15H:
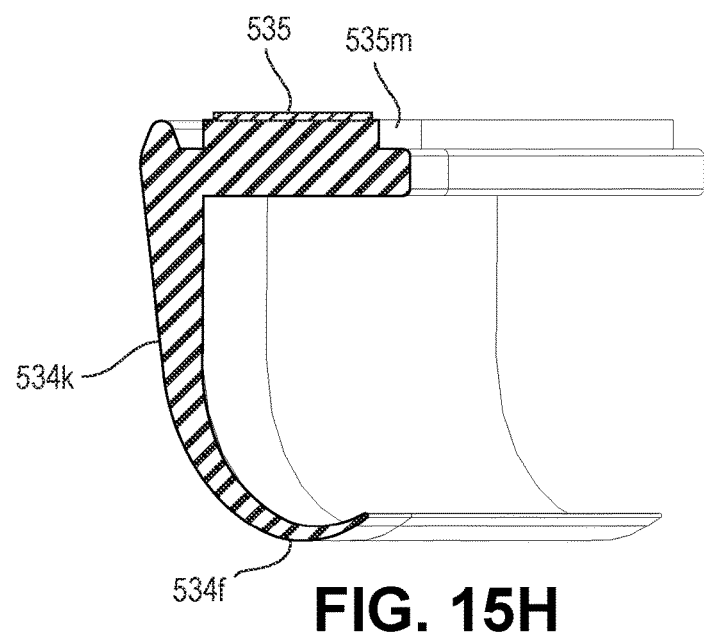
FIG. 15H illustrates a further alternate perimeter seal in a transverse vertical cross section.

Preferably, adhesive 535 is used to secure the perimeter seal 534 to the panels 536; although other types of adhesive, such as pressure-activated, heat-activated, UV-activated, chemical-reaction-cure, or other adhesives that are known in the art, can be used, preferably adhesive 535 is an adhesive such as the previously described adhesives 570*a*, 570*b*, 571*a*, 571*b*. FIG. 15B schematically illustrates another example perimeter seal 534*b* having a perimeter seal lip 534*d*; perimeter seal lip 534*d* can aid in alignment of the perimeter seal 534 at the edge of the panel 536, and can also provide some protection when manipulating panel 536 so that injury from contact with any narrow or sharp edges of the panel 536 is avoided. FIG. 15C schematically illustrates another example perimeter seal 534*c* having an extended perimeter seal flange 534*e* which provides similar advantages as the perimeter seal lip 534*d* but also extends a short distance over the top surface of the panel 536; the example perimeter seal 534*c* has an open cross section with an extended sealing feature 534*f*. Different configurations of the perimeter seal 534 can be used in different portions of the folding cover assembly 530. For example, the perimeter seal 534*a* could be used along the front of the front panel 536*c* to seal against the front wall 6*c* of the cargo box 5, while the perimeter seal 534*b* could be used along the sides of the panels 536 to seal against the sidewalls 6*a*, 6*b* (or sidewall cap 6*e*, if the truck 2 is so equipped), while the perimeter seal 534*c* could be used along the rear of the rear panel 536*a* to seal against the tailgate 6*d*. Further example perimeter seals include perimeter seal 534*g*, schematically illustrated in FIG. 15D, which has an open cross section similar to perimeter seal 534*c* but without an extended lip or flange. FIG. 15E illustrates an example perimeter seal 534*h* which is similar to perimeter seal 534*b* but also includes an extended perimeter seal flange similar to that shown in FIG. 15C. FIG. 15F shows an edge guard 534*i* for attachment at an exposed edge of a panel 536 but with minimal intrusion along the top surface 537 or the bottom surface or underside 538 of the respective panel 536 (corresponding to the top surface 532*a* or the bottom surface 532*b*, respectively, of the folding cover assembly 530); edge guard 534*i* can be used for protection at the rear edge of the rear panel 536*a*, for example. Edge guard 534*i* is preferably secured by an interference fit with the respective panel 536; alternatively, edge guard 534*i* can be secured to the respective panel 536 by an adhesive such as adhesive 535 illustrated in FIGS. 15A-15E, 15G-15H. FIG. 15G schematically illustrates a perimeter seal 534*j* similar to perimeter seal 534*g* of FIG. 15D but having an extended sealing feature 534*f* somewhat shorter than the perimeter seal of FIG. 15D, as shown. A preferred perimeter seal 534*k* is schematically illustrated in FIG. 15H. The perimeter seal 534*k* preferably includes extended sealing feature 534*f* and a thick back portion 534*m*, with the adhesive 535 located at the thick back portion 534*m* for securing the perimeter seal 534*k* to the respective panel(s) 536. The perimeter seal 534 can be formed into a bend at the corners of the cargo box 5, or separate segments of the perimeter seal 534 can be applied near each of the driver's side, passenger side, front side, and rear side of the folding cover apparatus 530, preferably cut to meet at a 45 degree angle to provide an essentially continuous perimeter seal around the perimeter. In a similar manner, differing configurations of perimeter seal 534, such as various perimeter seals 534*a*, 534*b*, 534*c*, 534*g*, 534*h*, 534*j*, and 534*k* described herein can be used along different portions of the perimeter, preferably cut to meet in close approximation and thereby providing an essentially continuous perimeter seal around the perimeter but with differing seal configurations at different portions of the perimeter. An edge guard such as edge guard 534i can be used to protect against damage or injury from the edge of the panel 536. Preferably, the perimeter seal 534 is arranged to provide an essentially continuous seal around the perimeter of the cargo box 5, and in addition, the rear edge of the rear panel 536a preferably has an edge guard 534i. Thus, some portions of the folding cover assembly 530 have perimeter seals 534 (which may include perimeter seals 534a, 534b, 534c, 534g, 534h, 534j, 534k, for example) in addition to edge guard 534i. Alternatively, the extended perimeter seal flange 534e can be incorporated into the perimeter seal 534 so that a separate edge guard 534i is not required. Various perimeter seals and edge guards made of polymeric material, as shown in FIGS. 15A-15H, are available from Lakeview Industries, Chaska, MN. Preferably, the folding cover assembly 530 described herein includes a perimeter seal such as a perimeter seal disclosed herein, such as perimeter seal 534, 534a, 534b, 534c, 534g, 534h, 534j, 534k. In some views in the drawings, the perimeter seal is not shown for clarity of illustration. The folding cover assembly 530 preferably includes the perimeter seal 534a along each of the sidewalls 6a and 6b, and the perimeter seal 534k along the front wall 6c, and the perimeter seal 534h along the rear portion (proximate the tailgate 6d).

The panels 536 preferably include sheet metal, although a rigid and tough polymer sheet can be used. In particular, lightweight and strong metal alloys, such as aluminum alloys, are preferred. The panels 536 are preferably relatively rigid as compared to the hinges 544, so that when the folding cover assembly 530 is folded up as described herein, the panels 536 remain relatively flat, while the hinges 544 can flex to fold up the folding cover assembly 530. Preferably, the panels 536 are from about 0.020 inches to about 0.200 inches thick. More preferably, the panel material is 5052-T34 rolled aluminum alloy from Aleris Inc., Cleveland, OH, which has a thickness of about 0.063 inches thick and is coated on the top with a Krystal Kote™ polyester paint system coating from Valspar Sourcing, Inc., Minneapolis, MN. and on the bottom with a clear epoxy coating while it is in the factory. The rolled aluminum alloy is manufactured into a coil of rolled aluminum. Once cooled, the coil is unrolled and separately coated on the top and the bottom surfaces of the aluminum material, heat treated and recoiled for delivery to a material handler or to the buyer. The coated panel material is then unrolled and panels are cut using a laser cutting machine or such other equipment that allows the panels to be effectively cut to desired size and shape specifications. The thickness of the respective panels is minimized to limit the weight of the respective panels and the cost of the materials, but it the panels are too thin they will be subject to deformation between supporting structures. The panel material will preferably have a thickness of from about 0.020 inches to about 0.200 inches, more preferably from about 0.030 inches to about 0.126 inches, still more preferably from about 0.040 inches to about 0.100 inches, even more preferably from about 0.050 inches to about 0.080 inches, and most preferably about 0.063 inches. Other protective coatings can be used, such as urethane coatings, which may include UV protection. Protective coatings may be obtained, for example, from BASF (Wyandotte, MI) and Glasteel (Moscow, TN). One preferred protective coating is BASF Elastocoat R85A92 WHT. Other rigid panels such as fiber reinforced plastic panels, such as can be obtained from Polser FRP Panels, Inc. (Izmir, Turkey).

This most preferred thickness was selected for a number of reasons including strength and process limitations. For the preferred coating described above, 0.063 inches is the thickest size that is believed to be presently available from manufacturers of the product. Since this was the thickest material that could be obtained with the preferred coating, the rigid alloy 5052-T34 with the aforementioned coatings was selected from a number of other materials having a number of other sizes. The inventors have determined that using an aluminum alloy allows the cover to be both light weight and rigid. The 5052-T34 material was chosen because it allows the cover to be strong and resistant to permanent deflections under static loads, denting, bending and long term abuse. The thickness also creates limitations if it is too thick because the panels 536 may interfere with one another at the hinge locations when the folding tonneau cover 530 is folded up and can therefore add a lot of unwanted stress on the hinge flexible hinge body 545a or the adhesive 570a, 571a where the respective hinges 544 are attached and sealed to the adjacent panels 536. If the panel material is too thin, the panels 536 will sag and easily deform with static loads. In alternate embodiments, other materials are used to make the panels 536 such as steel, aluminum, fiberglass, carbon fiber, ceramic, thermoset plastics, thermoplastics, HDPE, LDPE, ABS, PVC, Nylon, titanium alloy, magnesium alloy, copper, brass, stainless steel, rubber, fiber-reinforced or glass-containing polymeric materials and the like.

As noted, the preferred coatings on the panels 536 are a Kyrstal Kote™ polyester paint system from Valspar, preferably a black polyester base coat with a clear texture top coat on the top surface 537 and a clear epoxy coating on the underside or bottom surface 538 of the panels 536. Other coatings that could be used in alternate embodiments include acrylic paints, polyester paints, epoxy coatings, galvanized coatings, zinc plating, anodizing, other plating systems and the like. Alternative coatings include any combination of the above-mentioned coatings on either the top or the bottom sides of the panels 536. The texture on the top surface 537, bottom surface 538 of the respective panels 536 can be smooth, brushed, embossed, dented, sandblasted, rolled, waved and the like. Although a black top surface is preferred on the panels 536, coating including others colors that are well known in the art may also be applied on the top surfaces 537 and the bottom surfaces 538 of the respective panels 536 in alternative embodiments. It will be appreciated that the coating on the respective surfaces are desirable both aesthetically and functionally to enable the respective surfaces to hold up over time in harsh environments.

Figure 16F:
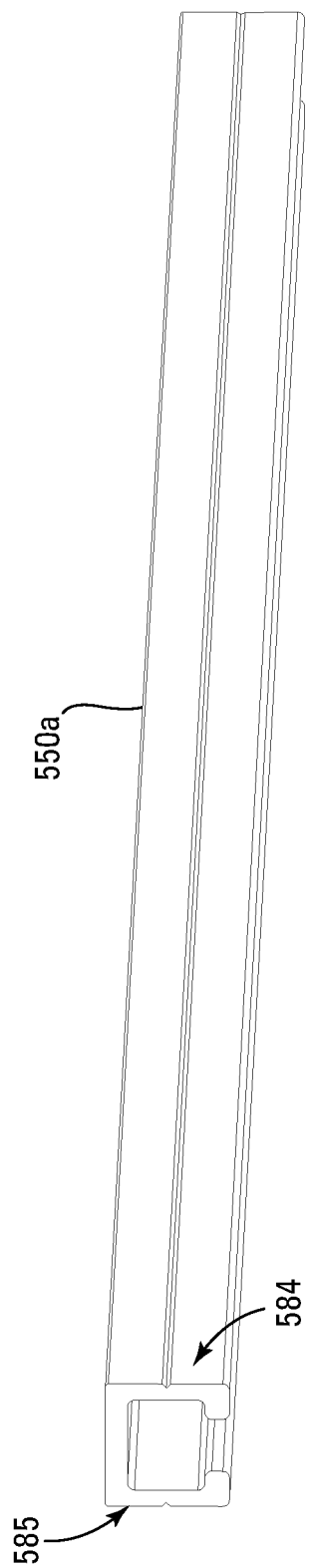
FIG. 16F is a perspective view of a straight support bow or support member with no hinge support flange and no downward deflection.

Now referring also to FIGS. 16A-16K, the support bows 550 are preferably metal channels, more preferably extruded aluminum, although a strong thermoplastic or other polymeric material that is either molded or extruded could be used. Preferably, the support bows 550b-550f have a slight bend or bow, and are curved so that they are downwardly concave or concave down as shown (deflection distance d is exaggerated in some views for clarity of illustration). When the panels 536 are attached to the bent support bows 550b-550f, the panels 536 deflect and take on a corresponding slight bend or bow, except for the rear portion of the rear panel 536a and the front portion of the front panel 536c, which are preferably flat so that they approximate the shape of the tailgate 6d and the front wall 6c of the cargo box 5. For this reason, the support bows 550a and 550g are preferably straight. The resulting slight bow in the folding cover assembly 530 aids in shedding of water or debris from the folding cover assembly 530. Although the support bows 550 preferably include extruded channel, as long as the upper surface 566d of the support bow 550 has this downward curvature, the curvature will be imposed upon the panels 536 in the manner described. An example support bow 550 which is straight is schematically illustrated in FIG. 16A; the support bow 550a at the rear of the rear panel 536a and support bow 550g at the front of the front panel 536c are preferably straight. Support bows 550 which are curved or bent are schematically illustrated in FIGS. 16B, 16C, 16E, 16G, 16I, and 16K; the support bows 550b, 550c, 550d, 550e, and 550f are preferably curved. Such curved support bows 550 are referenced as 550' in FIGS. 16B, 16C, and 16E, 550a' in FIG. 16G, 550d', 550f' in FIG. 16I, and 550e' in FIG. 16K, to distinguish them from the straight support bows 550, 550a, 550d, 550f, and 550e, respectively, in FIGS. 16A, 16F, and 16H, and 16J. The upper surface 566d of each respective support bow 550', 550a', 550d', 550f' is preferably curved so that the upper surface 566d at the ends of the respective support bow 550 are a deflection distance d lower than a highest extent of the upper surface 566d of the support bow 550 as shown (between the ends of the support bow 550, but preferably at the center portion of the support bow 550 as shown in FIG. 16B). The deflection distance d is preferably between about zero and about 1 inch; more preferably, the deflection distance d is preferably between about 1/64th inch and about 1/2 inch; still more preferably, the deflection distance d is about 1/8 inch. These example approximate deflection distances are for a typical cargo box 5 of a typical pickup truck 2; for wider or narrower cargo boxes, the length of the respective panels 536 and the respective support bows 50 may be longer or shorter, and the deflection distance d is preferably correspondingly larger or smaller, in order to provide a similar function in aiding the run-off of water or other debris from the panels 536. Currently, for example, most common pickup truck cargo boxes are from about 3.5 feet to about 6 feet in width; the deflection distance is preferably correspondingly smaller or larger when the folding cover assembly is sized to cover a cargo box which is narrower than about 3.5 feet or wider than about 6 feet, respectively. The inventors have found that for most common trucks, a deflection distance d which is about 1/16 inch or less typically does not provide the preferred water run-off. The inventors have also found that a deflection distance d which is about 3/16 inch or more can create unwanted stress particularly in the panels 536a and 536c which preferably have one curved support bow 550 and one generally straight support bow 550 configured to approximate the shape of the tailgate 6d and the front wall 6c of the cargo box 5. Therefore, we have found that for the typical truck cargo boxes 5 about 3.5 to about 6 feet in width, the preferred deflection distance is between about 1/16 inch and 3/16 inch. In some embodiments, support bows 550 include optional opposed support holes 574e in the front and rear portions of the support bow as illustrated.

Support bow 550e is shown in FIG. 16J, which also illustrates bow main portion 584, bow upper portion 585, hinge support flange 586, and flange lips 587a and 587b. Similarly, curved support bow 550e' is shown in FIG. 16K, which also illustrates bow main portion 584', bow upper portion 585', hinge support flanges 586a' and 586b', and flange lips 587a' and 587b'.

In preferred embodiments, the support bows 550 include the bow main portion 584 including a generally C-shaped channel with the bow upper portion 585 configured for attachment to the bottom surface 538 of the respective panel 536 and oriented with the channel opening 566c at the bottom. Some components of the folding tonneau cover apparatus 510 preferably slide into or are attached to the support bows 550, including the latch slides 553, the cord guides 555, the standoffs 558, spring 556, and the spring retainers 557a. The bow end caps 565 preferably slide into the ends of the support bows 550.

Figure 16G:
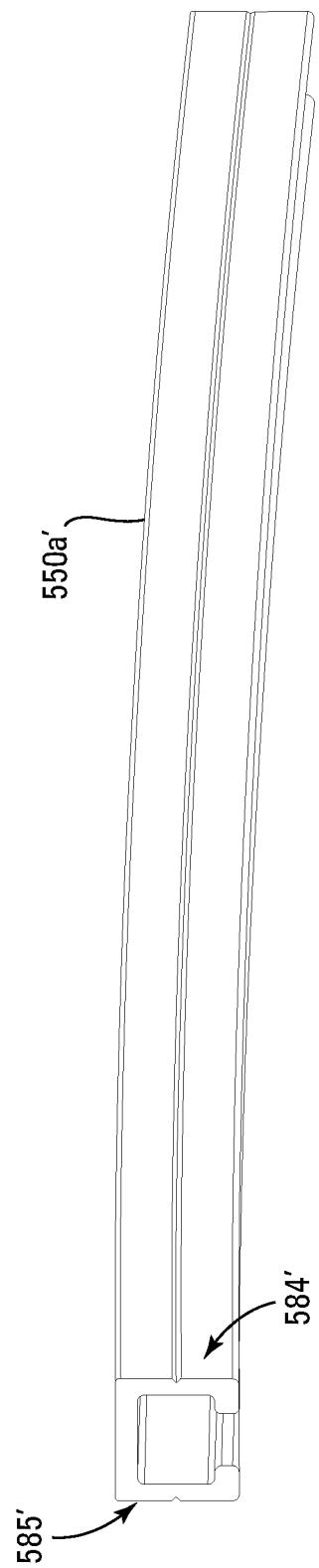
FIG. 16G is a perspective view of a curved support bow or support member with no hinge support flange and a downward curvature or deflection.
Figure 16H:
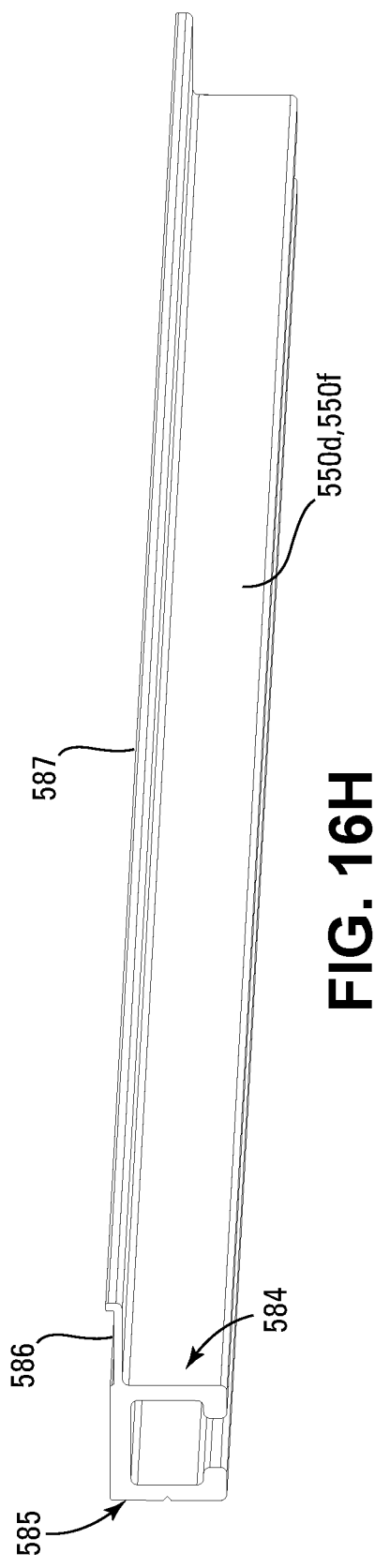
FIG. 16H is a perspective view of a straight support bow with one hinge support flange having a lip.
Figure 16I:
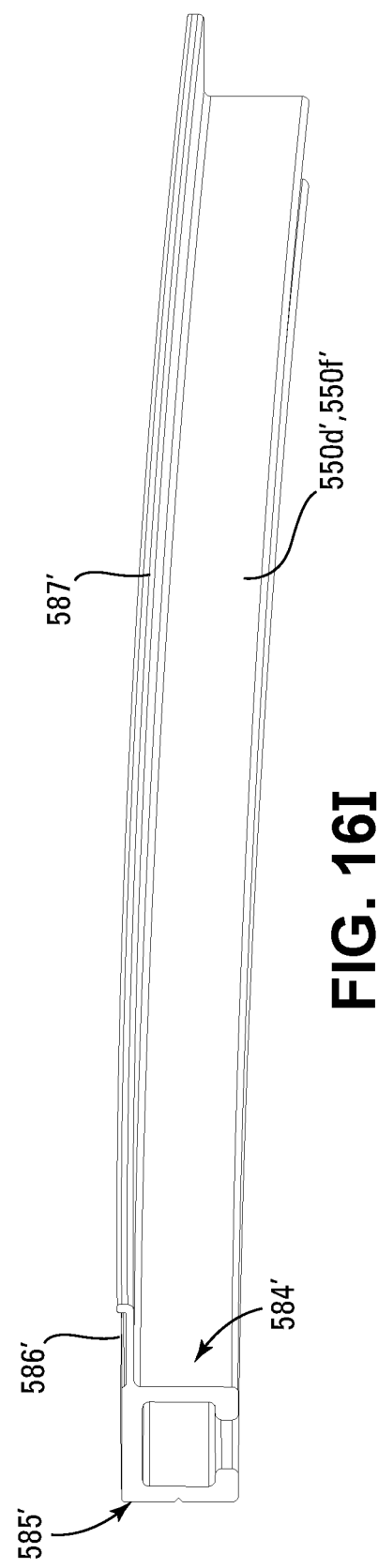
FIG. 16I is a perspective view of a curved support bow having a downward deflection and one hinge support flange having a lip.

Some embodiments include support bows 550 that are straight, such as the support bows 550 that are schematically illustrated in FIGS. 16F, 16H, and 16J, which include no hinge support flange 586a, 586b, one hinge support flange 586a, 685b, or two hinge support flanges 586a, 586b, respectively. Some embodiments include support bows 550 that are curved or bent, such as the support bows 550 that are schematically illustrated in FIGS. 16G, 16I and 16K, which include no hinge support flange 586a, 586b, one hinge support flange 586a, 685b, or two hinge support flanges 586a, 586b, respectively. The folding cover assembly 530 preferably includes support bows 550 that are straight as support bows 550a and 550g illustrated in FIGS. 2B, 16A, and 16F; support bows 550a and 550g are not adjacent to a hinge 544 and therefore do not require a hinge support flange 586a or 586b (FIGS. 16A, 16F). The folding cover assembly 530 preferably includes support bows 550 that are curved or bent (concave down) and include a hinge support flange 586a located to one side of the bow main portion 584 and extending to support the hinge side portion 546b, 546c as described above and further illustrated in FIGS. 16H and 16I. The folding cover assembly 530 more preferably includes support bows 550 that are bent and have a hinge support flange 586a as support bows 550b, 550c, 550d and 550f (FIG. 2B). Preferably, the folding cover assembly 530 includes a support bow 550 that includes two hinge support flanges 586a and 586b, located on opposed sides of the bow main portion 584, each hinge support flange 586a, 586b extending to support the hinge side portion 546b, 546c of hinge 544b, 544c, as described above and further illustrated in FIGS. 16J and 16K. The folding cover assembly 530 more preferably includes a support bow 550 that is bent and has two hinge support flanges as support bow 550e (FIGS. 2B, 16K).

The sidebars or handles 559 are attached to panels 536a, 536b, and 536c near each side of each panel 536. The sidebars 559 provide additional support along the side portions of the panels 536. The sidebars 559 are preferably metal, although a strong polymer can be used. More preferably, the sidebars 559 are formed of aluminum. The sidebars 559 are preferably formed with recesses or other grasping features, to facilitate grasping for lifting and positioning the panels 536 during opening and closing of the folding cover assembly 530. Preferably, the support bows 550 and the sidebars or handles 559 are elongated, so that they can provide support across the width 540 or length 539, respectively, of the respective panel 536.

Referring now to FIGS. 17A-17B, viewed along the viewing line 17A-17A in FIG. 3A, additional details in the vicinity of the side of the spacer panel 536d are illustrated. These views show hinges 544b and 544c, latch 552d, and support bows 550d, 550e, 550f, and the containment bracket 525b. In FIG. 17B, the middle panel 536b has been raised up to begin folding this portion of the folding cover assembly 530. The hinge 544b is shown flexing, and the hook 562d is rotated and displaced from the catch 564d so that the spacer panel 536d can also be lifted up. Some elements shown elsewhere herein are not shown in FIGS. 17A and/or 17B to show the hinge function more clearly.

The hinge body 545a is further illustrated in FIG. 17C, which is an isolated perspective view of the hinge body 545a and the adhesive 570a, illustrating the hinge longitudinal axis 545b, the hinge body profile 545c along a representative vertical front-rear section plane 597, the hinge body upper surface 595, the hinge body lower surface 596, representative hinge thickness 545*d* in two locations, the central portion 546*a*, the side portions 546*b*, 546*c*, and the intermediate portions 546*d*, 546*e*.

As described above in relation to the schematic illustrations in FIGS. 5A-5B, the flexible hinge body 545*a* preferably includes more than one polymeric material such as those described herein; for example, the flexible hinge body 545*a* may include a softer or lower-durometer elastomeric polymer material 547*c* and a harder or higher-durometer elastomeric polymer material 547*d*. The central portion 546*a* preferably includes the softer elastomeric polymer material 547*c*, and the side portions 546*b* and 546*c*, which are secured to the rigid panels 536 as stated, preferably include the harder elastomeric polymer material 547*d*. In such embodiments, a transition or mixing of the materials preferably occurs in the intermediate portions 546*d* and 546*e*. This arrangement preferably provides a structure with the central portion 546*a* being more flexible in bending than the intermediate portions 546*d* and 546*e* and the side portions 546*b* and 546*c*, so that bending of the flexible hinge body 545*a* preferentially occurs in the central portion 546*a*, although some flexing and bending can occur in other portions of the flexible hinge 544 in addition to the central portion. Embodiments of the hinge 544*a* are further illustrated in FIGS. 18A-18F, which are schematic illustrations similar to those of FIGS. 5A and 5B, with similar orientation as viewed from line 5A-5A on FIG. 2A.

A portion of the hinge body 545*a* is shown in a perspective view in FIG. 17D taken from the dashed rectangle 17D shown in FIG. 17C, which shows the hinge body profile 545*c* of the hinge body 545*a*, and also showing the central portion 546*a*, the side portions 546*b* and 546*c*, the intermediate portions 546*d* and 546*e*, more flexible polymer material 547*c*, stiffer polymer material 547*d*, intermediate polymer material 547*e*, adhesive 570*a* and 570*b*, hinge body upper surface 595, and hinge body lower surface 596.

A portion of the hinge body 545*a*' is shown in perspective view in FIG. 17E which is similar to the view shown in FIG. 17D, except that the hinge body that is shown is an alternate hinge body 545*a*', which shows the hinge body profile 545*c*' of the hinge body 545*a*', and also showing the central portion 546*a*', the side portions 546*b*' and 546*c*', the intermediate portions 546*d*' and 546*e*', hinge body polymer material 547*a*', and double-sided adhesive tape 571*a*.

Figure 17F:
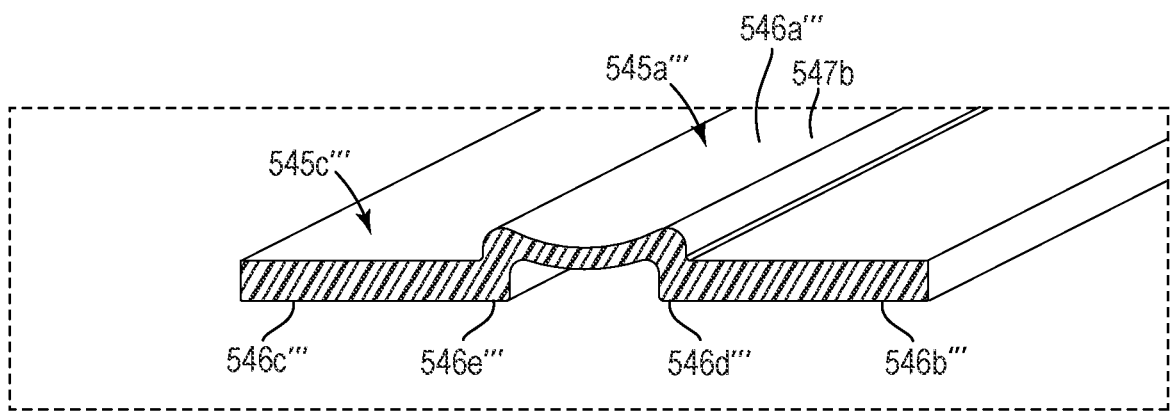
FIG. 17F is a view that is similar to the view shown in FIG. 17D, except that the hinge body that is shown is an alternate hinge body.

A portion of the hinge body 545*a*''' is shown in perspective view in FIG. 17F which is similar to the view shown in FIG. 17D, except that the hinge body that is shown is an alternate hinge body 545*a*''', which shows the hinge body profile 545*c*''' of the hinge body 545*a*''', and also showing the central portion 546*a*''', the side portions 546*b*''' and 546*c*''', the intermediate portions 546*d*''' and 546*e*''', hinge body polymer material 547*a*', and double-sided adhesive tape 571*a*.

Figure 17G:
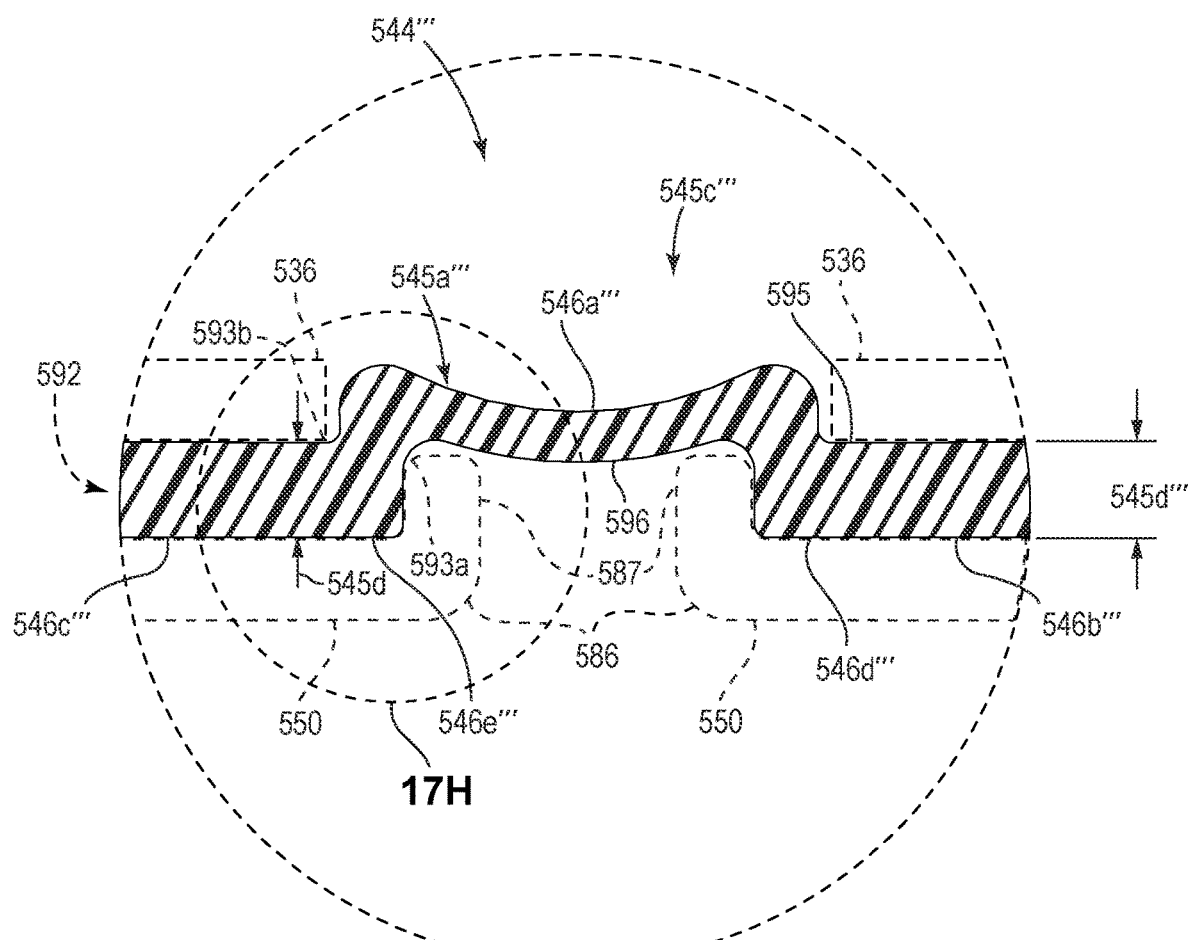
FIG. 17G is an enlarged schematic illustration similar to that shown in FIG. 18J, which is referenced herein below, except that the hinge body is different which allows the configuration of the partial enclosure 592 to engage the alternate hinge body 545*a*''' in a slightly different manner wherein the panel 336 does not abut against the hinge body 545*a*''' the same way that is shown in FIG. 18J.
Figure 18A:
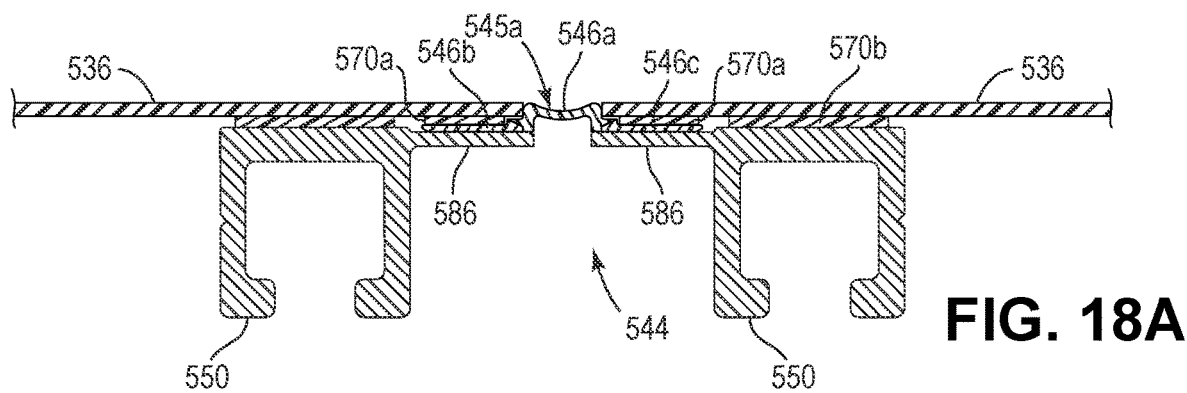
FIG. 18A is a schematic illustration similar to that of FIG. 5A, but illustrating an alternative embodiment of the support bows each having a flange, but neither of which have a flange lip.
Figure 18B:
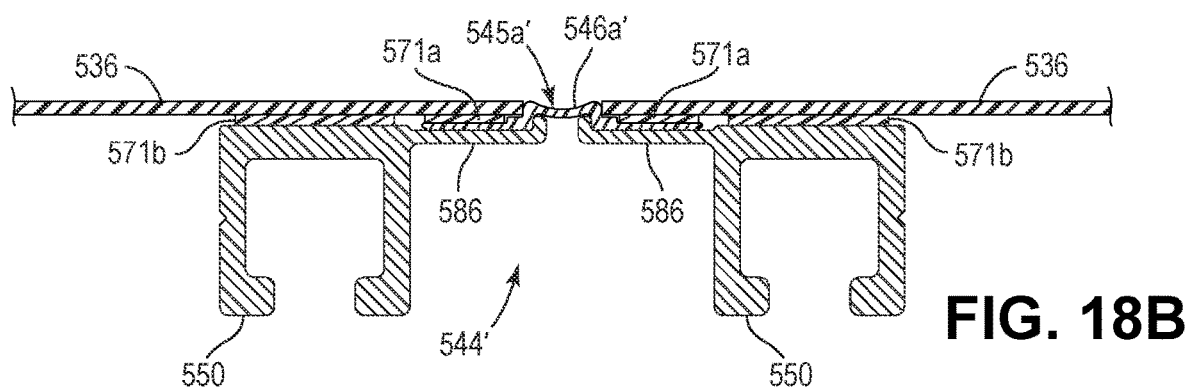
FIG. 18B is a schematic illustration similar to that of FIG. 5A, but illustrating an alternative embodiment of the hinge body 545a' having a single hinge body polymer material and having support bows that have a lip at the end of each of the support flanges of the partial enclosure.
Figure 18C:
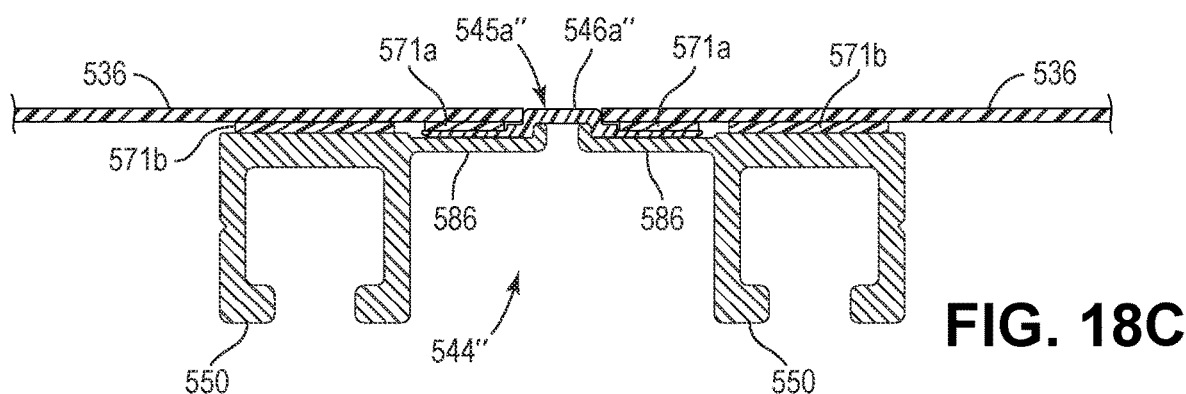
FIG. 18C is a schematic illustration similar to that of FIG. 18B, but illustrating a further alternative embodiment of the hinge body 545a" made of a single polymeric material and having a flat central portion.
Figure 18D:
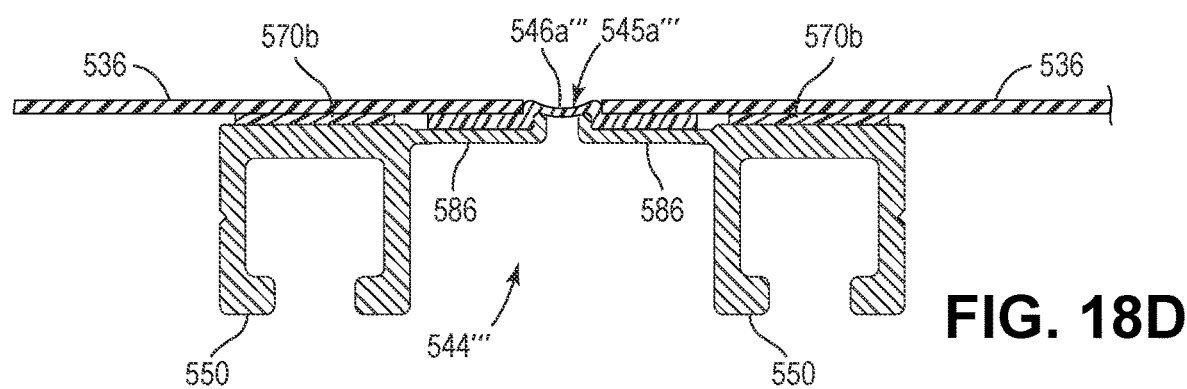
FIG. 18D is a schematic illustration similar to that of FIG. 18B, but illustrating a further alternative embodiment of the hinge body 545a'" made of a single polymeric material that is secured on each side within a partial enclosure created by the panel 536 and the support bow 550 without an adhesive securing the side portion to the rigid panel.
Figure 18E:
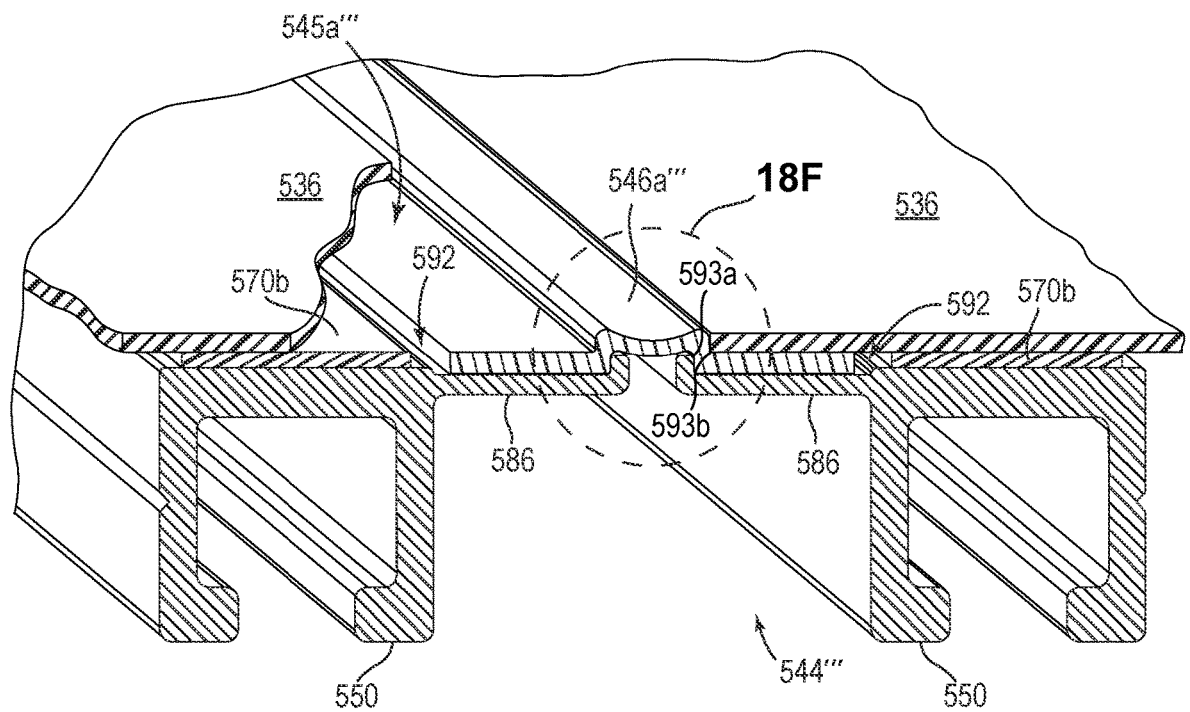
FIG. 18E is an enlarged schematic perspective illustration similar to that of FIG. 17G, but with the hinge body shown partially secured within a partial enclosure 592 created by rigid panels 536, one of which is partially broken away, and support bows having a lip at the end of each of the support flanges of the partial enclosure.
Figure 18F:
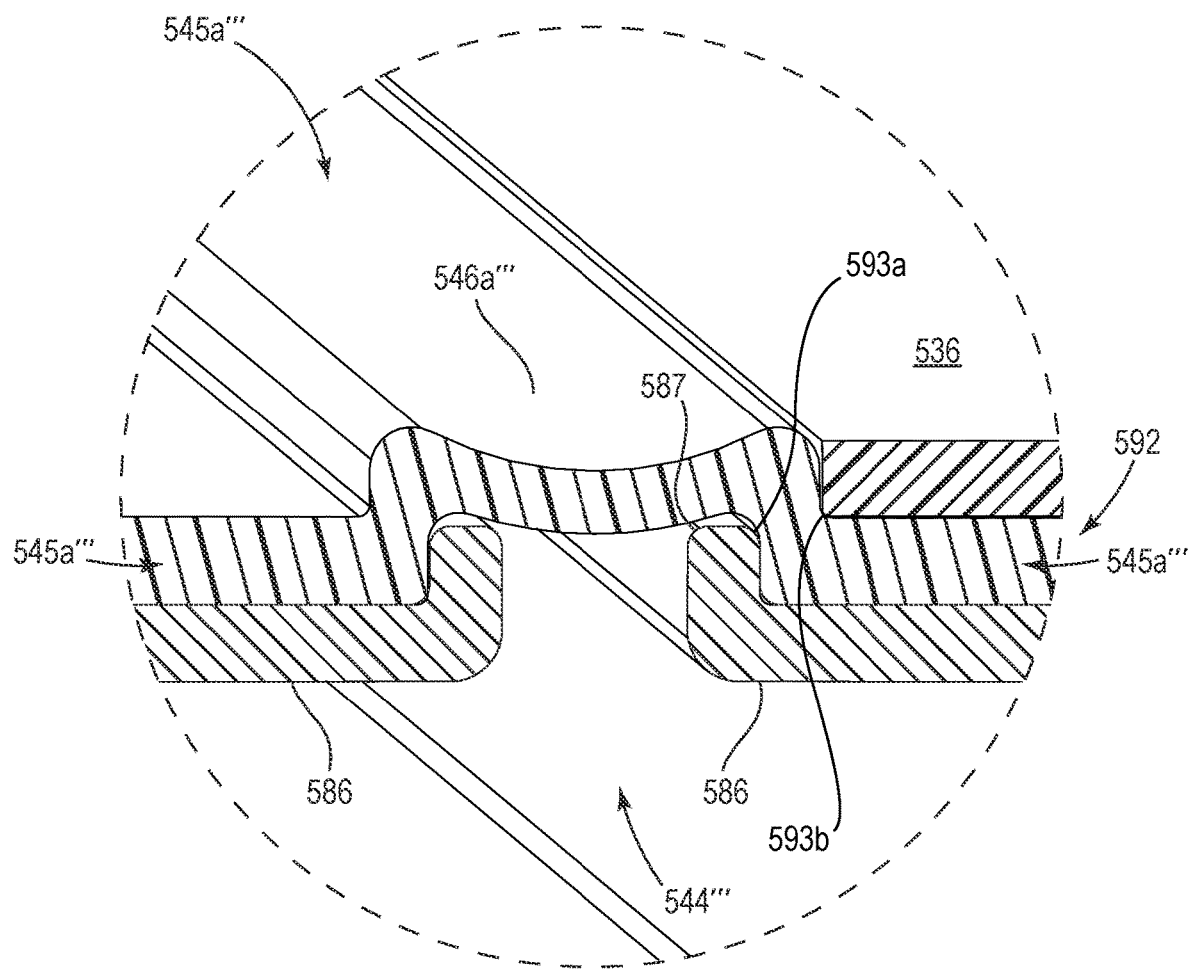
FIG. 18F is an enlarged schematic perspective view of the portion of FIG. 18E shown in the dashed circle 18F, but with the rigid panels and support bows shown only in part.
Figure 18G:
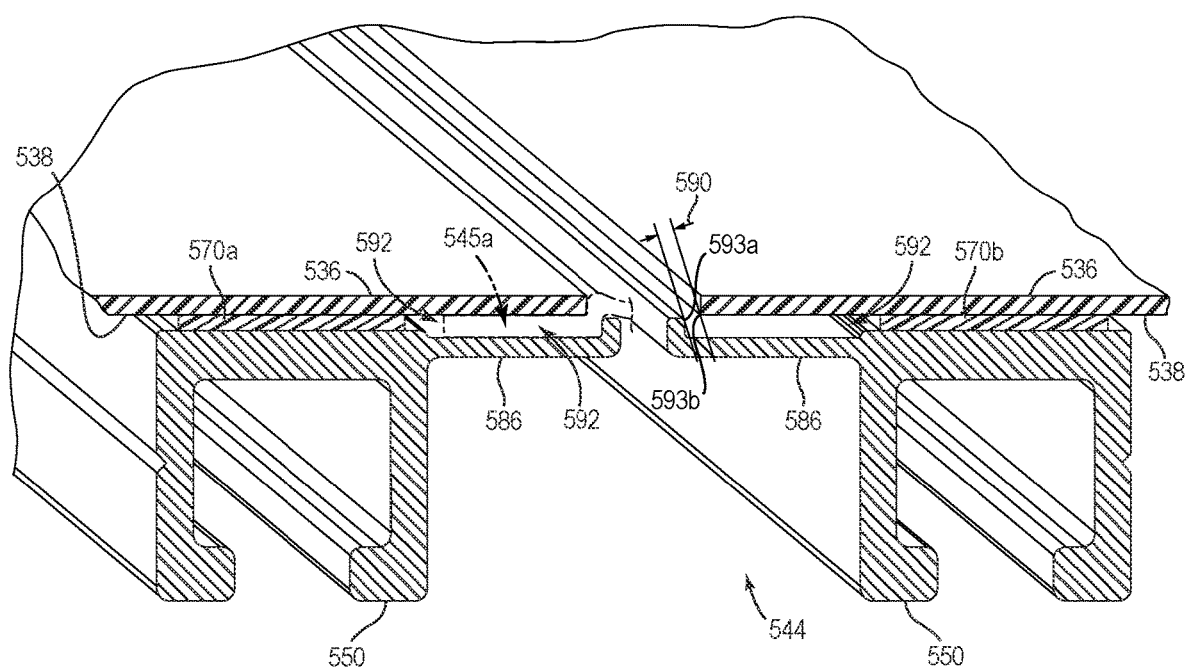
FIG. 18G is a further schematic perspective view similar to FIG. 18E but showing the structure of the partial enclosure 592 with the hinge body shown only partially in phantom, with the rigid panels and support bows shown in cooperation with one another as shown in FIG. 18D.
Figure 18J:
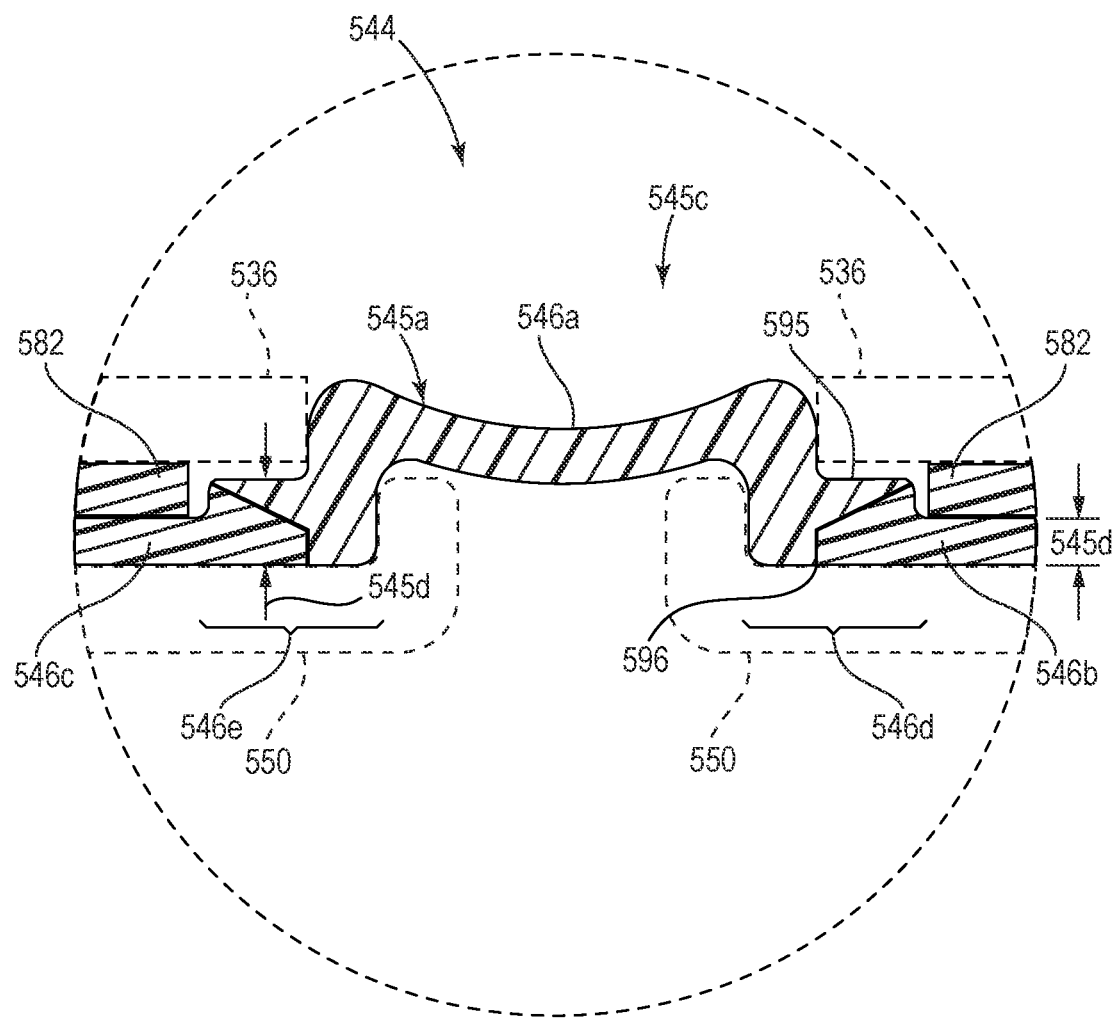
FIG. 18J is an enlarged view of the portion of the folding tonneau cover assembly 530 shown in the dashed circle 18J of FIG. 18I.

A portion of the hinge body profile 545*c*''' of hinge body 545*a*''' is shown in FIG. 17G, in an enlarged schematic illustration similar to that shown in FIG. 18J, which is referenced herein below, except that the hinge body 545*a*, shown in FIG. 18J, is somewhat different from that of the hinge body 545*a*''' which allows the configuration of the partial enclosure 592 to engage the alternate hinge body 545*a*''' in a slightly different manner wherein the panel 336 does not abut against the hinge body 545*a*''' the same way that is shown in FIG. 18J.

Figure 17H:
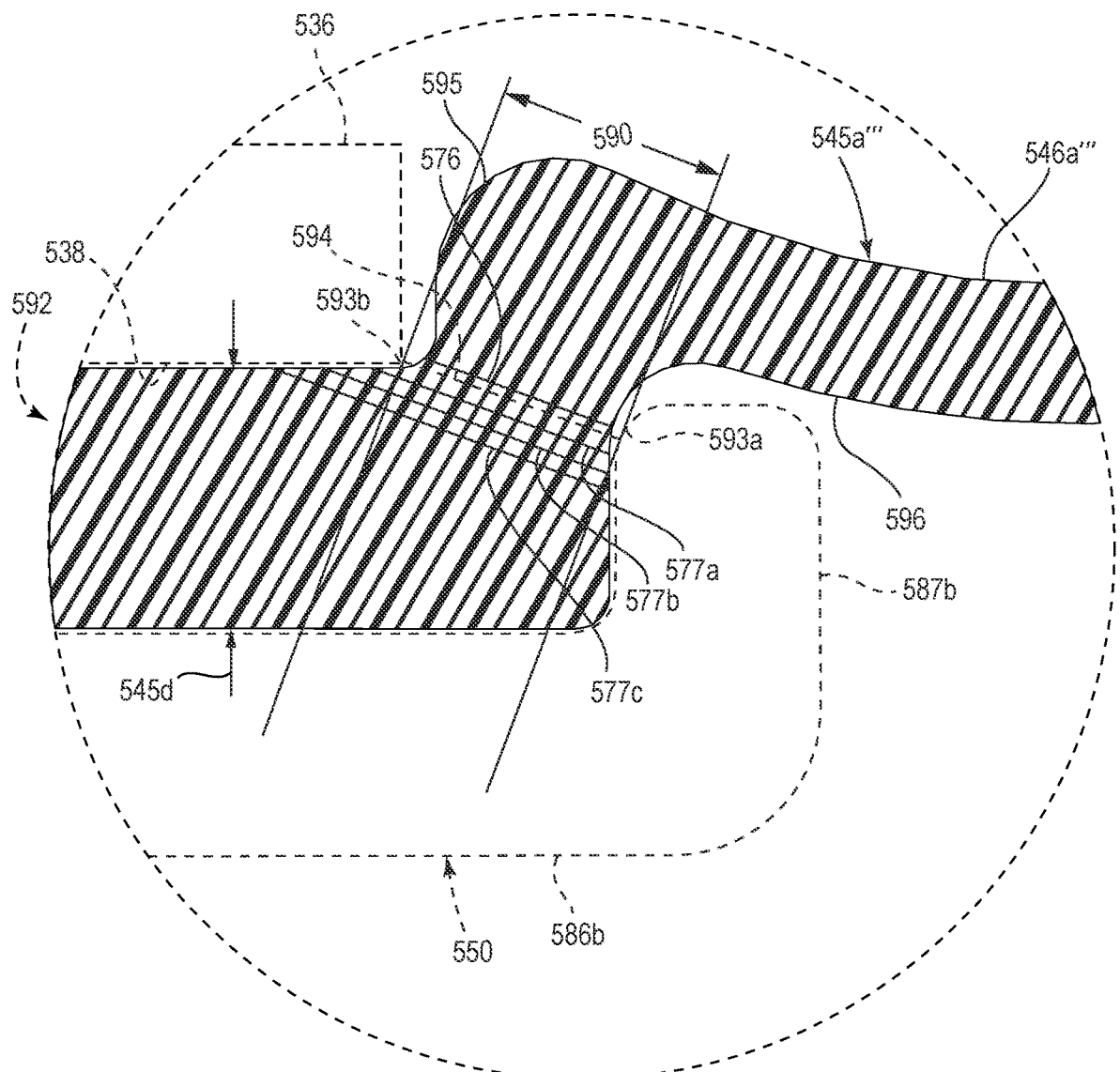
FIG. 17H is a further enlargement of a portion of the hinge body 545*a*''' and the partial enclosure 592 in which the hinge body is secured and also showing the gap 590 between a first point 593a on the lip 587b of the flange 586b of the support bow 550 and a second point 593b at the lower corner of the panel 536 which is taken from the dashed circle 17H of FIG. 17G.

The hinge body 545*a*''' is shown in a further enlargement, shown in FIG. 17H, which is taken from the dashed circle 17H of FIG. 17G, which illustrates a portion of the hinge body 545*a*''' and the partial enclosure 592 in which the hinge body is secured and also showing the gap 590 between a first point 593*a* on the lip 587*b* of the support flange 586*b* of the support bow 550 and a second point 593*b* at the lower corner of the rigid panel 536.

In preferred embodiments of the present folding tonneau cover assembly 530, the preferred hinge body 545*a*''' will be made of a single polymeric material 547*a* having a single durometer, as shown in FIGS. 17F, 17G, 17H, 18D, 18E and 18F and no adhesive material will be required to secure the hinge body 545*a*''' within the partial enclosure 592 created in part by both the bottom surface 538 of the respective rigid panel 536 and a support bow 550 secured to the bottom surface 538 of the rigid panel 536 on each side of the hinge 544 so as to secure the respective side portion 546*b*, 546*c* and intermediate portion 546*d*, 546*e* at least partially within the respective partial enclosure 592. In other embodiments disclosed herein, various ways of incorporating adhesive materials into the folding tonneau cover assembly 540 are used to secure the respective hinge body 545*a* within the respective partial enclosure 592, but with this embodiment of the hinge body 545*a*''' it will be appreciated that the partial enclosure 592 is sufficient to retain the hinge body 545*a*''' without having a need for adhesive material to secure the hinge body 545*a*''' within the partial enclosure 592. The hinge body 592*a*''' may also be made of multiple polymeric materials and be made of dual or multiple durometer material (not shown) and not require adhesive material for suitable securement in the partial enclosure 592 and adhesive material can, of course, be used to secure the alternate hinge body within the partial enclosure 592.

Referring now further to FIGS. 17F, 17G and 17H, the partial enclosure 592 on each side of the hinge body 545*a*''' is constructed and arranged to retain one of the respective side portions 546*b*, 546*c* and the adjacent intermediate portions 546*d*, 546*e* within the partial enclosure 592 without a need for any adhesive. It will be appreciated that the lack of a need for an adhesive is especially advantageous during the assembly process and also if a need arises to remove and replace the hinge body after manufacture. The key to retaining the hinge body 545*a*''' within the partial enclosure 592 is the limited width of a gap 590 that exists between a first point 593*a* on an inside surface of the lip 587 of the support flange 586 of the support bow or support member 550 that is secured to a bottom surface 538 of the proximate panel 536 and a second point 593*b* at the bottom corner of the adjacent rigid panel 536. This gap 590 is constructed and arranged to be large enough to accommodate a portion of the hinge body 545*a*''' that resides between the central portion 546*a*''' and the respective intermediate portion 546*d*''', 546*e*''' to fit within the gap 590. As shown in FIG. 17H, the length of gap 590, which is the same as the length of the dashed line 594, that extends from the first point 593*a* on the inside surface of the lip 587*b* to the second point 593*b* at the lower corner of the bottom surface 538 of the rigid panel 536. This dashed line 594, which has the same length as the gap 590, is longer than the line 576 that extends from the upper surface 595 of the hinge body 545*a*''', proximate the second point 593*b*, to the lower surface 596 of the hinge body 545*a*''', proximate the first point 593*a*. Lines 577*a*, 577*b*, and 577*c* are each parallel to line 576 and also parallel to dashed line 594. As can be seen, lines 577*a* 577*b*, and 577*c* are each successively longer in length than the line 594 and line 576, because the width of the intermediate portion 546*d*''' and 546*e*''' on each side of the central portion 546*a*''' become progressively wider or larger as the lines grow progressively further away from the gap 590 and the upper surface 595 and the lower surface 596 diverge from one another as these respective surfaces become farther away from the gap in the immediate vicinity of the intermediate portions 546d''', 546e''', respectively. As the respective intermediate portion 546d''', 546e''' descends away from the central portion 546a''', the hinge thickness 545d of the respective intermediate portion 546d''', 546e''' becomes enlarged, so much so that respective intermediate portion or shoulder 546d''', 546e''' is restricted from passing through the gap 590 under normal conditions that generally exist during the use of such a folding tonneau cover assembly 530. This restriction is generally believed to be sufficient to prevent the disengagement of the respective shoulders 546d''', 546e''' and side portions 546b''', 546c''' from the partial enclosure 592 under normal conditions generally experienced by truck owners.

The edges of the gap 590 are generally unyielding because the preferred rigid panels 536 and the preferred support bows 550 are preferably made of aluminum which is generally unyielding when a polymeric material such as the polymeric material preferably used to make the hinge bodies 545a of the present invention are drawing against the aluminum under great force. In most cases, the polymeric material will tear or deform before the aluminum material will bend significantly or break, but in any case, such levels of force are not generally expected under the anticipated conditions under which such tonneau cover assemblies are generally required to operate. As shown in the drawings, the thickness of the respective shoulder or intermediate portion 546d''', 546e''' of the hinge body 545a''' becomes greater as the thickness is measured in lines 577a, 577b, and 577c, which are each of incrementally greater length than the prior line as the distance from the central portion 546a''' of the hinge body 545a''' increases in series: 577a to 577b to 577c. Each of these lines are incrementally greater in length than line 575 that stretches from a point on the upper surface 595 of the hinge body proximate the second point 593b on the lower corner of the most proximate rigid panel 536 to a point on the lower surface 596 proximate the first point 593a on the lip 587 of the support flange respective 586. Each of the lines 577a, 577b, 577c are parallel to line 275 and each is incrementally longer and incrementally farther away from the line 275. Because the shoulder 546d''', 546e''' becomes wider or thicker as the shoulder becomes farther removed from the central portion 546a''' the shoulders 546d''', 546e''' and the side portions 546b''', 546c''' of the hinge body 545a''' are restricted from becoming disengaged from the partial enclosure 592 by being drawn out of the partial enclosure 592 through the gap 590.

In the embodiment schematically illustrated in FIG. 18A, the configuration is similar to that illustrated in FIG. 5A; the support bows 550b and 550c have hinge support flanges 586a and 586b, respectively, but lack the flange lips 587a and 587b which are present in the embodiment illustrated in FIG. 5A. In the embodiment of FIG. 18A, the arrangement preferably includes adhesive 570a to secure and seal the respective side portions 546b, 546c to the bottom surface 537 of the respective rigid panels 536a and 536b.

In the embodiment schematically illustrated in FIG. 18B, the configuration is similar to that illustrated in FIG. 5A, except that an alternate hinge 544' is shown, having a hinge body 545a' that has a single hinge body polymer material 547a (which preferably includes an elastomeric polymer material 547b and more preferably includes a thermoplastic polymer as stated above) is used throughout the central portion 546a' and the side portions 546b' and 546c' of the flexible hinge body 545a'. Preferably, bending of the flexible hinge body 545a' preferentially occurs in the central portion 546a' based on the hinge thickness 545d of the central portion 546a' and the side portions 546b' and 546c' of the flexible hinge body 545a'.

In the embodiment schematically illustrated in FIG. 18C, the configuration is similar to that illustrated in FIG. 18B, but an alternate hinge 544'' is shown, having a hinge body 545a'' that has hinge body profile 545c'' that is different, having a more uniformly flat profile in the central portion 546a'' than in the embodiment illustrated in FIG. 18B.

In the embodiment schematically illustrated in FIG. 18D, the configuration is similar to that illustrated in FIG. 18B, but an alternate hinge 544''' is shown, having a hinge body 545a''' but the adhesive 570a is not used at the side portions 546b''' and 546c''' and instead the hinge thickness 545d at the side portions 546b''' and 546c''' is such that each side portion 546b''', 546c''' preferably contacts both the respective hinge support flange 586a, 586b and the respective bottom surface 538 of the respective rigid panel 536 without intervening adhesive 570a.

The portion of the folding cover assembly 530 illustrated in FIG. 5A is schematically illustrated in further detail in FIG. 18E, which shows a portion of one of the panels 536 broken away to show the underlying structure of the hinge 544''', and which shows the flexible hinge body 545a''', and the central portion 546a''', and illustrates the partial enclosure 592 in which a portion of the hinge body 545''' is secured;

An enlarged view of the portion of the flexible hinge 544''' shown in the encircled area labeled 18F in FIG. 18E is illustrated in FIG. 18F. A portion of the hinge body 545a''' and the central portion 546a''', and the lip 587 are shown, and the hinge body 545a''' is partially enclosed in the partial enclosure 592. The lip 587 has a point 593a closest to the panel 536.

The partial enclosure 592 is illustrated in FIG. 18G in a further schematic perspective view similar to FIG. 18E but showing the structure of the partial enclosure 592 with the hinge body 545a shown only partially and in phantom, with the rigid panels 536 and support bows 550 shown in cooperation with one another as shown in FIG. 18D.

A portion of the folding tonneau cover assembly 530 is illustrated in FIG. 18H, which is an enlarged view providing a transverse vertical cross section of the portion of the folding tonneau cover assembly shown in FIG. 18A, but showing the hinge body 545a in phantom. A portion of the folding tonneau cover assembly 530 is illustrated in FIG. 18I in a further enlarged view similar to that shown in FIG. 18H, except that the hinge body 545a is shown in cross section and the rigid panels 536 and the support bows 550 are shown in phantom.

A further enlarged view of the portion of the folding tonneau cover assembly 530 shown in the dashed circle 18J of FIG. 18I is illustrated in FIG. 18J. Portions of the partial enclosure 592, hinge 544, hinge body 545a, central portion 546a, side portions 546b and 546c, intermediate portions 546d and 546e, hinge body profile 545c, hinge thickness 545d, hinge adhesive 570a, hinge body upper surface 595, and hinge body lower surface 596 are shown. Portions of the support bows 550 and rigid panels 536 are shown in phantom.

Preferably, the hinge thickness 545d between the hinge upper surface 595 and the hinge lower surface 596 is large enough in comparison to the gap 590 to provide a degree of securement of the flexible hinge body 545a so that respective side portion 546b, 546c is retained between the hinge support flange 586a, 586b and the respective bottom surface 538a, 538b of the respective rigid panel 536a, 536b.

The hinge thickness 545d at the respective intermediate portion 546d, 546e is greater than the gap 590, thereby reducing the possibility of the respective intermediate portion 546d, 546e passing through the gap 590 due to movements and stresses anticipated in use of the folding tonneau cover apparatus 510. In embodiments which include the adhesive 570a (such as the double-sided adhesive tape 571a, for example), the adhesive 570a provides further securement of the flexible hinge body 545a to the respective rigid panels 536.

As described above, adhesive 570a is preferably located between each side portion 546b, 546c and the respective rigid panel 536 (536a, 536b, 536c, 536d) to protect against passage of debris or precipitation into the cargo box 5; the adhesive 570a can also aid in securement of the flexible hinge body 545a to the respective rigid panel 536. Alternatively, the side portions 546b, 546c can fit tightly between the respective extended flange or hinge support flange 586 (586a, 586b) and the respective rigid panel 536, to provide a degree of protection against passage of debris or precipitation into the cargo box 5. The folding cover assembly 530 preferably includes support bows or channels 550 (550a, 550b, 550c, 550d, 550e, 550f, 550g) secured to the underside 538 (538a, 538b, 538c, 538d) of at least some of the rigid panels 536, near the front edge 541b and/or the rear edge 541c of the respective rigid panels 536, and which extend between the driver's side and the passenger side of the rigid panels 536. The support bows 550 are preferably secured to the underside 538 of the respective rigid panels 536 by adhesive 570b. In preferred embodiments, the support bows 550 include the hinge support flanges 586.

The extended flanges 586 are preferably separated a short distance from the respective rigid panel 536, so that there is a gap 590 between the hinge support flange 586 and the respective rigid panel 536. The hinge support flange 586 and the respective rigid panel 536 form a partial enclosure 592 into which the side portions 546b, 546c extend. The hinge support flanges 586 each preferably include a raised lip 587a, 587b to further secure the flexible hinge body 545a to the respective rigid panel 536. The raised lip is preferably positioned to create a restricted gap 590 between the raised lip 587a, 587b and the respective rigid panel 536, so that the side portion 546b, 546c cannot easily slip out from the partial enclosure 592 through the gap 590, further securing the flexible hinge body 545a to the respective rigid panel 536. The intermediate portion 546b, 546c preferably has a hinge thickness 545d which does not permit the intermediate portion 546b, 546c to easily pass through the restricted gap 590, further securing the flexible hinge body 445a to the respective rigid panel 536. In some embodiments, the geometry of the partial enclosure 592, gap 590, side portion 546b, 546c, and intermediate portion 546b, 546c provides a mechanical interlock to secure the flexible hinge body 545a to the respective rigid panel 536 without the need for adhesive or other fastening mechanism. In other embodiments, adhesive 570a is used to secure the flexible hinge body 545a to the respective rigid panel 536; in alternative embodiments, adhesive 570a is located at an interface between the flexible hinge body 545a and the hinge support flanges 586, adhesive 570a is located at an interface between the flexible hinge body 545a (at the hinge body upper surface 595) and the bottom surface or underside 538 of the respective rigid panel 536, or adhesive 570a is located both at an interface between the flexible hinge body 545a (at the hinge body lower surface 596) and the hinge support flanges 586 and at an interface between the flexible hinge body 545a and the bottom surface or underside 538 of the respective rigid panel 536. In further embodiments, a mechanical interlock together with adhesive 570a secures the flexible hinge body 545a to the respective rigid panel 536. In still further embodiments which include the flange lip 587, the mechanical interlock includes the geometry of the intermediate portion and the geometry of the lip.

As stated above, the flexible hinge body 545a preferably includes polymer material 547a, which more preferably includes an elastomeric polymer material 547b. In some embodiments, a single type of elastomeric polymer material 547b is used in the central portion 546a, side portions 546b, 546c, and intermediate portions 546d, 546e of the flexible hinge body 545a. In other embodiments, the flexible hinge body 545a includes a plurality, i.e. more than one type of polymer material 547a, which differ in elastic properties; for example, a more flexible elastomeric polymer material 547c may be preferably incorporated in the central portion 546a and a stiffer elastomeric polymer material 547d may be preferably incorporated in the side portions 546b, 546c. In this case, the intermediate portion 546d, 546e may include an intermediate polymer material 547e which may be a mixture or combination of the more flexible elastomeric polymer material 547c and the stiffer elastomeric polymer material 547d, and may provide a transition from the more flexible elastomeric polymer material 547c to the stiffer elastomeric polymer material 547d. In some embodiments, the flexible hinge body 545a includes more than one type of polymer material to provide for more optimal properties in the various portions; for example, a more flexible elastomeric polymer material 547c may be utilized advantageously in the central portion 546c to provide for bending of the flexible hinge body 545a when folding or unfolding the folding cover assembly 530, while a stiffer elastomeric polymer material 547d may be utilized advantageously in the side portion 546b, 546c to provide for securement of the flexible hinge body 545a to the respective rigid panel 536. Preferably, in embodiments which incorporate more than one type of polymer material 547a, the flexible hinge body 545a is fabricated by co-extruding the more than one type of polymer material 547a to form the flexible hinge body 545a of materials which vary along the hinge body profile 545c but which are generally the same along the hinge longitudinal axis 545b of the flexible hinge body 545a.

Figure 19A:
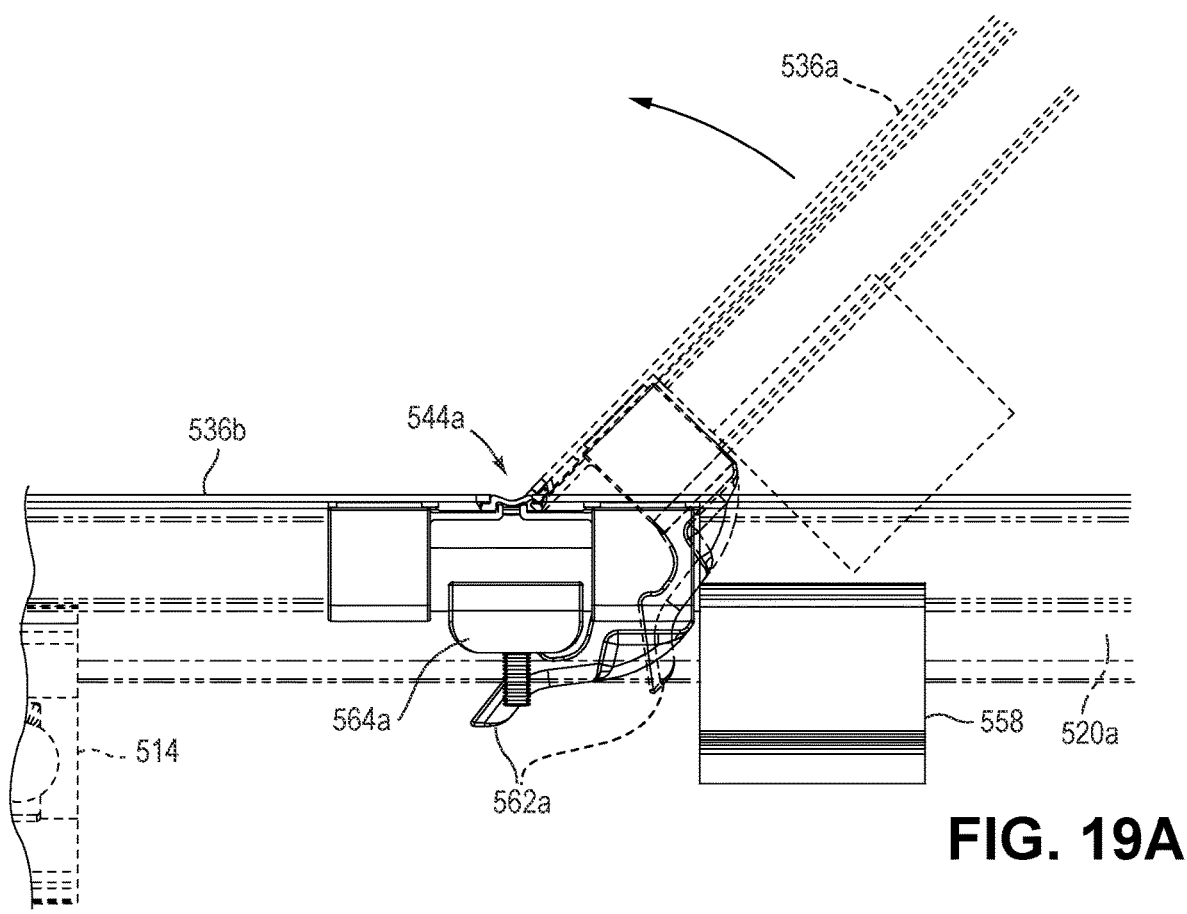
FIG. 19A is a detail side view of a portion of the folding tonneau cover apparatus of FIG. 1 as viewed from line 19A-19A as indicated in FIG. 3A, with the side rail on the driver's side in phantom and the truck removed to show the underlying structure, and showing in phantom an alternate position of the same portion of the folding tonneau cover apparatus in which the rear panel has been lifted up and rotated frontward somewhat so that the hook is disengaged from the catch.
Figure 19B:
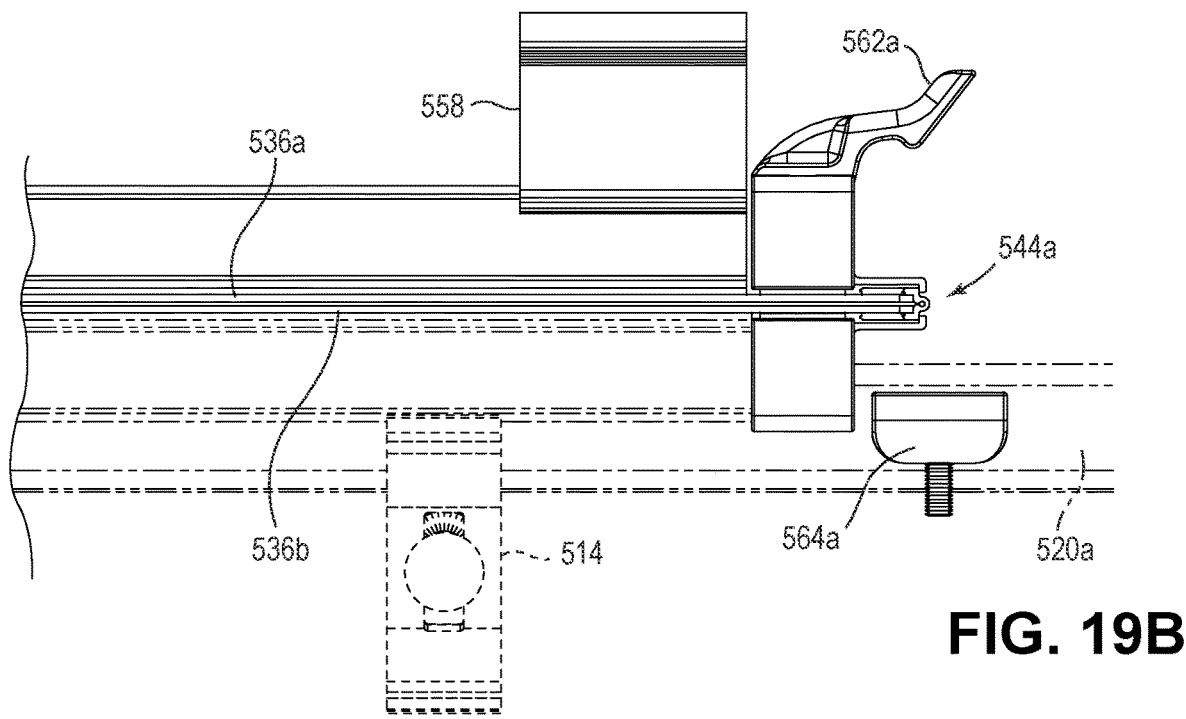
FIG. 19B is a detail side view similar to that of FIG. 19A, but in which the rear panel has been rotated completely forward onto the middle a panel.

A portion of the folding tonneau cover apparatus 510 that includes the rear hinge 544a, as indicated by the encircled area labeled 2D, 19A in FIG. 2C, is further illustrated in an enlarged partial phantom view in FIG. 19A, with the driver's-side side rail 220a shown in phantom and the truck 2 removed to show the underlying structure, and showing in phantom an alternate position of the same portion of the folding tonneau cover apparatus 510 in which the rear panel 536a has been lifted up and rotated frontward somewhat in the direction of the arrow so that the hook 562a is disengaged from the catch 564a. With further rotation of the rear panel 536a as illustrated in FIG. 19B, the rear panel 536a has been rotated completely forward onto the middle panel 536b, and the hook 562a is disengaged from the catch 564a, so the middle panel 536b is free to be lifted up if desired. The other hooks 562 and catches 564 described herein function in a similar manner as hook 562a and catch 564a just described.

When it is desired to replace the folding cover assembly 230 onto the cargo box 5 and cover the cargo box 5, the folding cover assembly 230 can be placed onto the side rails 520 and unfolded as schematically illustrated in FIG. 19C, beginning with (1) placing the bundled folding cover assembly 530 on the side rails 520 with the hooks 562 at the front of the front panel 536c aligned with the respective catches 564 on the respective side rails 520; (2) lowering the folding cover assembly 530 onto the side rails 520 until the latches 552 at the rear of the front panel 536c are engaged with the side rail lip 524 of the respective side rails 520 and the containment brackets 525a and 525b. The bundled folding cover assembly 530 can be left secured in this configuration, or if it is desired to unfold the folding cover assembly 530 to cover the cargo box 5, the strap brackets 543b can be disengaged from the bracket slots 543c, and (3) the middle panel 536b can be rotated rearward onto the side rails 520, with the hooks 562 at the front of the middle panel 536b engaging the respective catches 564, and (4) the rear panel 536a can be rotated rearward onto the side rails 520, with the hooks 562 at the front of the rear panel 536a engaging the respective catches 564 and the latches 552 at the rear of the rear panel 536a engaging with the side rail lip 524 of the respective side rails 520.

FIGS. 20A-20E are schematic illustrations of the folding tonneau cover apparatus 510 for various configurations of cargo box 5 geometries as may be found on various trucks 2. Preferred embodiments of the folding cover assembly 530 include the rear panel 536a, the middle panel 536b, the front panel 536c, and the spacer panel 536d, as previously described. In FIGS. 20A-20E, the overall length 533 of the folding cover assembly 530 is shown for each example, and the length 539 of each of the panels 536a-536d is indicated as 539a-539d, respectively, and the width 540 of the panels 536a-536d is indicated as 540a-540d, respectively, and the side angle 542 of the panels 536a-536d is indicated as 542a-542d, respectively. Panels 536a-536c can have similar length 539a-539c, or the length of some or all of panels 536a-536c can differ. Panel 536d can have a similar length 539d as panels 536a-536c, but preferably the length 539d of panel 536d is substantially smaller than the lengths 539a-539c of panels 536a-536c. Panels 536a-536d can have similar width 540, or the width of some or all of panels 536a-536d can differ. Panels 536a-536d can have the same side angle 542, or the side angle 542a-542d of some or all of panels 536a-536d can differ.

FIG. 20A shows the folding cover assembly 530 as configured for a cargo box having angled sides; since this example folding cover assembly 530 has angled sides, the width 540 is different at the front and rear of a panel. In this example, the width 540 of the rear panel 536a at the rear of the rear panel 536a is labeled 540a', to distinguish it from the width 540a of the rear panel 536a at the front of the rear panel 546a. The width 540 of the panel 536b at the rear of the panel 536b is similar to the width 540a of the panel 536a at the front of the panel 536a, and so forth.

Figure 20C:
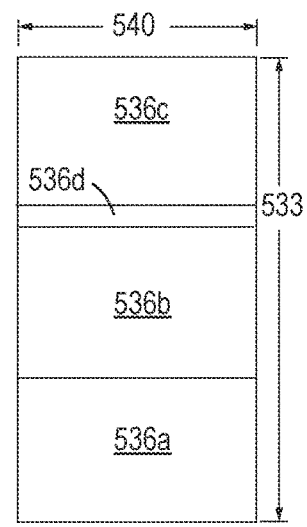
FIG. 20C is a schematic illustration of the folding tonneau cover apparatus of FIG. 1, as configured for an elongated cargo box.
Figure 20D:
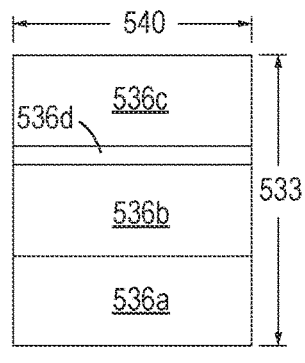
FIG. 20D is a schematic illustration of the folding tonneau cover apparatus of FIG. 1, as configured for a shorter cargo box.
Figure 20E:
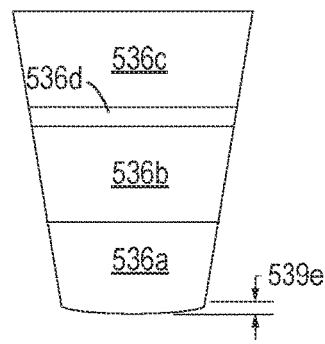
FIG. 20E is a schematic illustration of the folding tonneau cover apparatus of FIG. 1, as configured for a cargo box with arbitrary shape.

FIG. 20B is a schematic illustration of the folding cover assembly 530 as configured for a cargo box having parallel sides; in this example, the width 540 of each of the panels is similar. FIG. 20C is a schematic illustration of the folding cover assembly 530 as configured for an elongated cargo box; in this example, the overall length 533 is longer than in the example of FIG. 20B. FIG. 20D is a schematic illustration of the folding cover assembly 530 as configured for a shorter cargo box; in this example, the overall length 533 is shorter than in the example of FIG. 20B. FIG. 20E is a schematic illustration of the folding cover assembly 530 as configured for a cargo box with arbitrary shape; in this example, the sides of the panels 536 are angled, and the rear of the rear panel 536a is curved, extending a curved extension distance 539e in the central portion with respect to the side portions of the rear panel 536a. The folding cover assembly 530 can be configured for a variety of other configurations of truck box 5, with any of the panels 536a-536d configured with straight or angled or curved shapes such as those illustrated in the examples of FIGS. 20A-20E, in various combinations.

Figure 21A:
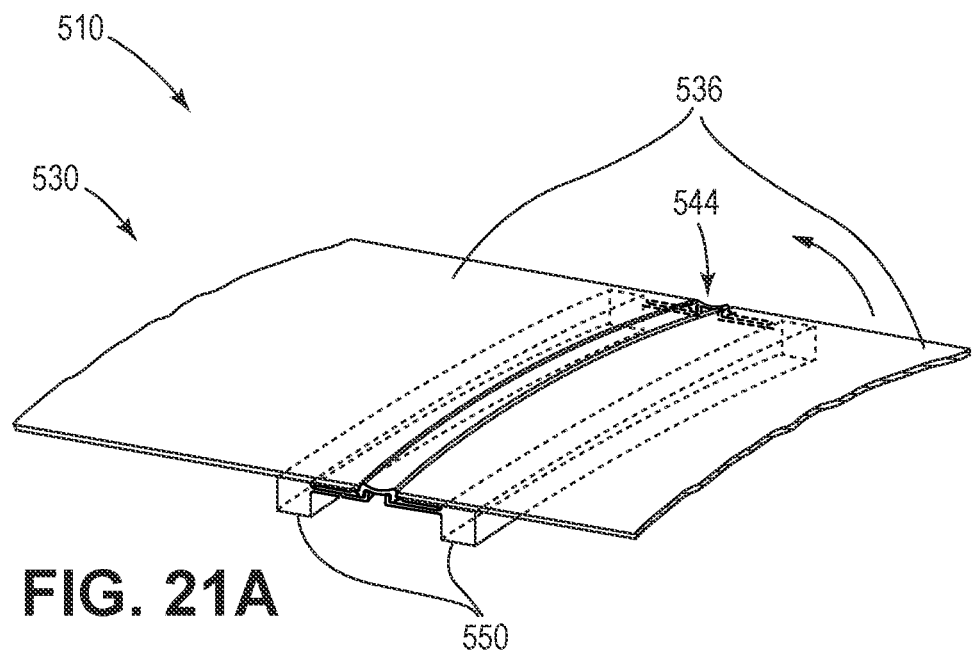
FIG. 21A is a schematic illustration of a portion of the folding tonneau cover apparatus of FIG. 1, illustrating a flexible hinge interconnecting two adjacent panels, showing bent or bowed support bows creating a bending or bowing of the panels attached thereto (see also FIGS. 16B-16E, 16G, 16I, and 16K), with the bending or bowing exaggerated for illustration, with the panels unfolded.
Figure 21B:
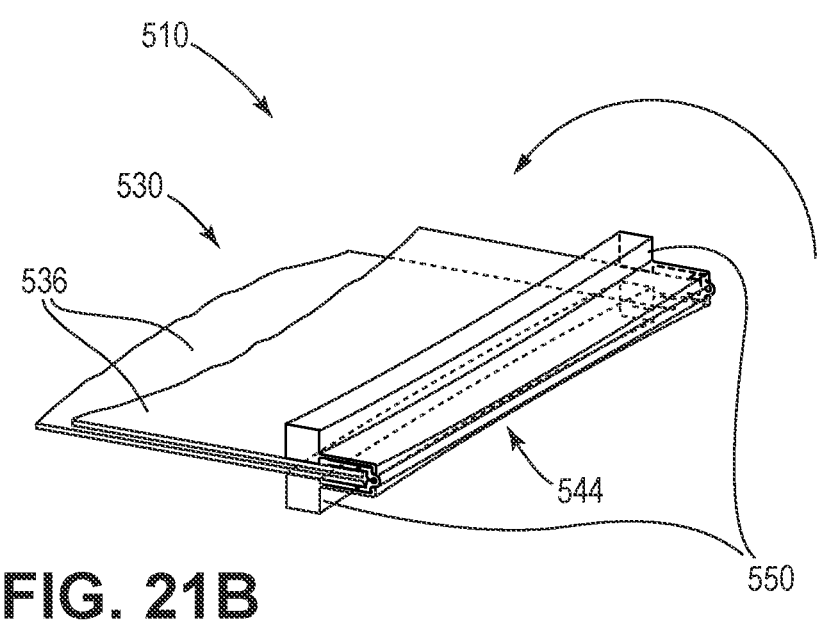
FIG. 21B is a schematic illustration similar to that of FIG. 21A, showing the panels folded up, and together with FIG. 21A illustrating how the flexible hinge can accommodate the folding up and unfolding of such bent or bowed panels.

Further advantages to the structure described herein of the flexible hinge 544 are illustrated in FIGS. 21A and 21B. The hinge 544 as described herein is low profile, reducing the overall thickness, bulk, and weight of the folding cover assembly 530. The flexible hinge 544 can tolerate some deformation, so that if adjacent panels 536 are not aligned perfectly, or are not perfectly flat, the hinge 544 can still function to allow the folding cover assembly 530 to fold without binding. The configuration disclosed herein of hinge 544 can accommodate panels 536, some of which are preferably slightly bowed as described herein and illustrated in FIG. 16E. FIG. 21A is a schematic illustration of a portion of the folding tonneau cover apparatus 510 showing a respective flexible hinge 544 interconnecting two respective adjacent panels 536, showing bent or bowed support bows 550 creating a bending or bowing of the panels 536 attached thereto (see also FIGS. 16B-16E), with the bending or bowing exaggerated for illustration, with the panels 536 unfolded. FIG. 21B is a schematic illustration similar to that of FIG. 21A, showing the two respective adjacent panels 536 folded up in the direction indicated by the arrow. FIGS. 21A-21B illustrate how the flexible hinge 544 can accommodate the folding up and unfolding of such bent or bowed panels 536.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover apparatus for removable attachment about a top of a perimeter of a cargo box of a pickup truck, the top perimeter of the cargo box including a forward end, two opposing sidewalls and a tailgate, the tailgate being positioned rearward of the forward end and having an open position and a closed position, the tonneau cover apparatus comprising:
   a support frame assembly for attachment to the cargo box, the support frame assembly having two opposing side rails;
   a cover assembly including a plurality of rigid panels; wherein the plurality of rigid panels includes first and second panels; the first and second panels being flexibly secured to one another by a first flexible hinge; wherein the first flexible hinge is secured to a first underside of the first panel and to a second underside of the second panel; the cover assembly including a plurality of support members secured to at least one of the first underside of the first panel and the second underside of the second panel to stiffen the respective rigid panel.

2. The tonneau cover apparatus of claim 1; wherein the flexible hinge is secured to both the first underside of the first rigid panel and the second underside of the second rigid panel with an adhesive.

3. The tonneau cover apparatus of claim 2; wherein the adhesive secures respective side portions of the flexible hinge to the respective undersides of the first and second rigid panels.

4. The tonneau cover apparatus of claim 2; wherein the adhesive is selected from the group consisting of a double-sided adhesive tape; a heat-activated adhesive; a pressure-sensitive adhesive; a thermal activated adhesive; a hot-melt adhesive; a chemically activated adhesive; and an UV light activated adhesive.

5. The tonneau cover apparatus of claim 1, wherein each of the respective support members has an upper surface that is curved along at least a portion of a length of the elongated support member such that when the upper surface of each of the respective elongated support members is secured to an underside of one of the respective rigid panels, at least a portion of a top surface of each of the respective rigid panels is curved downwardly so as to be at least partially downwardly concave along a width of each of the respective rigid panels.

6. The tonneau cover apparatus of claim 5; wherein each of the respective elongated support members has first and second ends and each of the respective elongated support members is bent so that each of the respective elongated support members curves through an arc as the respective elongated support member extends from one end to the other end; wherein the respective elongated support members are secured to an underside of each of the respective rigid panels so that each of the rigid panels is sufficiently bent so that water will run off of a top surface of each of the respective rigid panels under the force of gravity when the cover assembly is engaged with the support frame assembly; wherein the upper surface each of the respective elongated support members is curved so that the ends of the upper surface are a deflection distance lower than a center portion of the upper surface.

7. The tonneau cover apparatus of claim 5, wherein the portion of the top surface is curved so that the ends of the upper surface are a deflection distance lower than a center portion of the upper surface, and wherein the deflection distance is from about 1/64 inch to about 1/2 inch.

8. The tonneau cover apparatus of claim 1; each of the rigid panels having a thickness of from about 0.020 inches to about 0.200 inches.

9. The tonneau cover apparatus of claim 1; wherein the flexible hinge is made of a flexible material that can withstand deformation without failure due to cracking or breakage that is selected from the group consisting of a laminated polymeric material, a fiber reinforced polymeric material, an elastomeric material, a woven material, a coated woven fabric material, a polyvinyl chloride coated woven polyester fabric material, and a material that is in part a laminated woven material and in part a laminated material.

10. The tonneau cover apparatus of claim 1; wherein the cargo box has a box length extending from the forward end to the tailgate and the plurality of rigid panels further include a third rigid panel and a fourth rigid panel; wherein the plurality of rigid panels are secured to one another in series by a series of flexible hinges each of which secures the respective adjacent rigid panels to one another; wherein a panel length of each of the plurality of rigid panels is considerably less than the box length; and the third rigid panel is a hinge panel that has a hinge panel length that is no greater than one-third of an average length of the other rigid panels.

11. The tonneau cover apparatus of claim 10; wherein the cover assembly can fold up so that the first, second and fourth rigid panels are oriented such that a top surface of each of the first, second and fourth panels is generally parallel to a top surface of each of the others and a top surface of the hinge panel is oriented generally at a 90 degree angle to the top surfaces of each of the first, second and fourth panels.

12. The tonneau cover apparatus of claim 11, wherein the cover assembly further includes a plurality of standoff members secured to the underside of the first panel that engage the fourth top surface of the fourth panel when the cover assembly is in the fully folded position, wherein the respective standoff members separate the underside of the first panel from the fourth top surface of the fourth panel when the cover assembly is in a fully folded position.

13. The tonneau cover apparatus of claim 10; wherein the cover assembly further includes a cab panel secured to the fourth panel by a fourth flexible hinge and positioned closest to the forward end when the cover assembly is secured to the top of the perimeter of the cargo box.

14. The tonneau cover apparatus of claim 13; wherein the first flexible hinge is secured to the underside of the first panel and the underside of the second panel, the second flexible hinge is secured to an underside of the hinge panel and the underside of the second panel, the third flexible hinge is secured to the underside of the hinge panel and an underside of the fourth panel and the fourth flexible hinge is secured to the underside of the fourth panel and an underside of the cab panel.

15. The tonneau cover apparatus of claim 14; wherein when the cover assembly is in a fully folded horizontal orientation, wherein the first panel is supported by the fourth panel, the fully folded cover can pivot with respect to the cab panel to an upright position in which the first, second and fourth panels are oriented generally upward with respect to the cab panel so that the first, second and fourth panels rest in a generally vertical-orientation upon the cab panel when the cab panel is in a generally horizontal orientation.

16. The tonneau cover apparatus of claim 15; wherein the cover assembly further includes a securing strap that can secure the first and second panels to the pickup truck when the first and second panels are secured to the fourth panel and the cover assembly is attached to the pickup truck in a manner in which the first, second and fourth panels rest in a generally vertical orientation upon the cab panel.

17. The tonneau cover apparatus of claim 15; wherein the cover assembly further includes a storage strap that can secure the first and second panels to the fourth panel when the cover assembly is in the fully folded position.

18. The tonneau cover apparatus of claim 14; wherein the cover assembly further includes a perimeter seal secured to the undersides of each of the respective rigid panels, wherein the perimeter seal is a water resistant gasket that forms a continuous border around an underside of the cover assembly so that when the cover assembly is secured to the respective side rails of the support frame and the respective side rails are secured to the respective sidewalls of the pickup truck, the perimeter seal creates a water resistant barrier between the cover assembly and the cargo box.

19. The tonneau cover apparatus of claim 1, wherein a top surface of each of the respective rigid panels is curved downwardly so as to be at least partially downwardly concave along a width of the respective rigid panels when the respective rigid panel is secured to the respective side rail.

20. The tonneau cover apparatus of claim 1, wherein the support frame assembly includes two opposing side rails and each of the respective side rails is secured to one of the respective opposing sidewalls when the tonneau cover apparatus is attached to the pickup truck; wherein the support frame assembly includes a catch member secured to each of the respective side rails and the cover assembly further includes a plurality of hook members, wherein the respective hook members engage the catch members to secure the cover assembly to the support frame assembly when the tonneau cover apparatus is attached to the pickup truck.

21. The tonneau cover apparatus of claim 1, wherein the flexible hinge has a center portion, two side portions and two intermediate portions; wherein each of the respective intermediate portions separately interconnect one of the respective side portions to the center portion; wherein the cover assembly further includes an elongated support member secured to an underside of one of the rigid panels; wherein the elongated support member has a main portion and a flange; wherein the main portion has an upper portion that is secured to an underside of the respective rigid panel and the flange extends away from the upper portion such that the flange resides at least partially below the respective underside and at least a portion of one of the two side portions when the flexible hinge is secured to the underside of the respective panel; wherein the flange and the underside of the respective rigid panel cooperate to form a partial enclosure within which the side portion is secured when the flexible hinge is secured to the underside of the respective panel.

22. The tonneau cover apparatus of claim 21, wherein the flexible hinge is made at least partially of flexible thermoplastic material.

23. The tonneau cover apparatus of claim 22, wherein the side portions include a first thermoplastic material having a first durometer and the center portion includes second thermoplastic material having a second durometer, wherein the first durometer is greater than the second durometer.

24. The tonneau cover apparatus of claim 21, wherein the upper surface of the respective side portion of the flexible hinge is secured within the partial enclosure created by the cooperation of the respective flange and the underside of the respective rigid panel by a method selected from a group consisting of: (1) positioning the respective side portion within the respective partial enclosure; and (2) positioning the respective side portion within the respective partial enclosure and securing at least a portion of the respective side portion to the respective partial enclosure with an adhesive; (3) positioning the respective side portion within the respective partial enclosure so as to provide a mechanical interlock to secure the flexible hinge to the respective rigid panel; (4) positioning the flexible hinge so that the respective intermediate portion is positioned within the respective partial enclosure such that a portion of the intermediate portion having a thickness that is greater than a restricted gap defined by a flange lip and the respective rigid panel secures the respective intermediate portion within the partial enclosure; and (5) combinations thereof.

25. The tonneau cover apparatus of claim 21, wherein the flexible hinge is made by a process selected from the group consisting of: (1) extruding a thermoplastic material through an opening; (2) extruding two different thermoplastic materials having two different durometers through an opening; (3) molding a thermoplastic material in a mold; and (4) molding two different thermoplastic materials having different durometers in a mold, such that the thermoplastic material used to make the side portions has a first durometer and the thermoplastic material used to make the center portion has a second durometer and the first durometer is greater than the second durometer.

26. The tonneau cover apparatus of claim 21, wherein the flexible hinge is secured to the underside of the respective rigid panel along an edge of the respective rigid panel that extends along a width of the respective rigid panel; wherein the center portion, the two side portions and the two intermediate portions of the flexible hinge each extend along a length of the flexible hinge that is positioned generally parallel to the width of the respective rigid panel when the flexible hinge in secured thereto.

27. The tonneau cover apparatus of claim 21, wherein the center portion is at least partially concave as it extends between the respective rigid panels to which the flexible hinge is secured, when the cover assembly is in an unfolded configuration.

28. The tonneau cover apparatus of claim 27, wherein the flexible hinge has a thickness that varies along the width of the flexible hinge but is generally uniform along the length of the flexible hinge.

29. The tonneau cover apparatus of claim 28, wherein the intermediate portions of the flexible hinge have a thickness that is a greater than a smallest thickness of the center portion.

30. The tonneau cover apparatus of claim 21, wherein the flange has a lip; wherein the lip extends toward an edge of the respective rigid panel to which the respective elongated support member is secured; and wherein the intermediate portion of the flexible hinge has a first thickness that is a greater than a smallest thickness of the center portion.

31. The tonneau cover apparatus of claim 30, wherein a distance between the lip and the edge of the respective rigid panel to which the respective elongated support member is secured is smaller than the first thickness of the intermediate portion of the flexible hinge secured within the partial enclosure.

32. The tonneau cover apparatus of claim 21, wherein the flange has a lip and wherein the lip extends toward an edge of the respective rigid panel so as to form the partial enclosure; wherein at least a portion of the respective intermediate portion and the respective side portion of the flexible hinge is retained within the partial enclosure; and wherein at least a portion of the intermediate portion of the flexible hinge has a first thickness that is greater than a gap between the edge of the rigid panel and the lip of the respective flange.

33. The tonneau cover apparatus of claim 21, wherein each of the respective rigid panels has an underside, a topside and a perimeter surface; wherein a first portion of the perimeter surface of the respective rigid panel converges with a first section of the respective underside proximate the flexible hinge securing the first rigid panel to the second ridged panel to form a first edge that runs generally parallel to a length of the flexible hinge; wherein the cover assembly further includes an elongated support member secured to the respective underside of one of the respective rigid panels proximate the first edge; wherein the elongated support member has a main portion and a flange, and the main portion has an upper portion that is secured to the respective underside of the respective rigid panel, and the flange has an extended portion that extends away from the upper portion and resides below the underside when the support member is secured to the respective underside; and the flange has a lip portion which runs generally parallel to the first edge and extends upward from the extended portion so as to reduce a width of a gap between the lip portion and the first edge such that the proximate portion of the flange resides at least partially below the respective underside proximate the first edge of the respective rigid panel so as to cooperate with the respective underside to form a partial enclosure in which at least a portion of each of the respective intermediate portion and the respective side portion of the respective hinge resides.

34. The tonneau cover apparatus of claim 1, wherein the support members have an upper surface that is secured to the underside of the respective rigid panel by a system selected from the group consisting of (1) an adhesive material secured to the upper surface of the support member and the underside of the respective rigid panel and (2) a two-sided adhesive tape secured to the upper surface of the support member and the underside of the respective rigid panel.

35. The tonneau cover apparatus of claim 1, wherein the rigid panels are made of an aluminum alloy material.

36. The tonneau cover apparatus of claim 1, wherein the support frame assembly includes a side rail extending along and secured to each sidewall when the support frame assembly is attached to the cargo box, and wherein each support member extends along the width of the respective panel; and wherein, when the support frame assembly is attached to the cargo box, each of the side rails support the plurality of support members when the cover assembly is attached about the top perimeter of the cargo box.

37. A tonneau cover apparatus for removable attachment about a top of a perimeter of a cargo box of a pickup truck, the top perimeter of the cargo box including a forward end, two opposing sidewalls and a tailgate, the tailgate being positioned rearward of the forward end and having an open position and a closed position, the tonneau cover apparatus comprising:
a support frame assembly for attachment to the cargo box;
a cover assembly including a plurality of rigid panels; wherein the plurality of rigid panels includes first and second panels; the first and second panels being flexibly secured to one another by a flexible hinge; wherein the flexible hinge is secured to a first underside of the first panel and to a second underside of the second panel; and
wherein a first side portion of the flexible hinge is secured within a first partial enclosure on the first underside of the first panel and a second side portion of the flexible hinge is secured within a second partial enclosure on the second underside of the second panel.

38. The tonneau cover apparatus of claim 37; wherein the first and second partial enclosures on each of the respective undersides of the first and second rigid panels define a narrow gap between an edge of the respective rigid panel and a lip of a support member secured to the underside of the respective rigid panel.

39. A tonneau cover apparatus for removable attachment about a top of a perimeter of a cargo box of a pickup truck, the top perimeter of the cargo box including a forward end, two opposing sidewalls and a tailgate, the tailgate being positioned rearward of the forward end and having an open position and a closed position, the tonneau cover apparatus comprising:
a support frame assembly for attachment to the cargo box;
a cover assembly including a plurality of rigid panels; wherein the plurality of rigid panels includes first and second panels; the first and second panels being flexibly secured to one another by a flexible hinge; wherein the flexible hinge is secured to a first underside of the first panel and to a second underside of the second panel; and
wherein the support frame assembly includes two opposing side rails, wherein each of the respective side rails can be secured to one of the respective opposing sidewalls; wherein the cover assembly further includes a securing apparatus, wherein the securing apparatus includes at least one locking member secured to one of the plurality of rigid panels; wherein the locking member is engageable with one of the respective side rails when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position.

40. The tonneau cover apparatus of claim 39; wherein the cover assembly further includes a release cord attached to the locking member and configured so that, when the release cord is pulled away from the rigid panel to which the locking member is secured, the release cord moves the locking member from the first position to the second position so that the locking member is disengaged from the side rail.

41. The tonneau cover apparatus of claim 39, wherein there are a plurality of locking members and each of the plurality of locking members are biased toward the first position.

42. The tonneau cover apparatus of claim 39, wherein the support frame assembly includes at least one containment bracket secured to one of the respective side rails; and wherein at least one locking member will be at least partially engaged within the containment bracket when the respective side rail is secured to the cargo box and the cover assembly is engaged with the support frame assembly and the respective locking member is in the first position.

43. A tonneau cover apparatus for removable attachment about a top of a perimeter of a cargo box of a pickup truck, the top perimeter of the cargo box including a forward end, two opposing sidewalls and a tailgate, the tailgate being positioned rearward of the forward end and having an open position and a closed position, the tonneau cover apparatus comprising:
a support frame assembly for attachment to the cargo box;
a cover assembly including a plurality of rigid panels; wherein the plurality of rigid panels includes first and second panels; the first and second panels being flexibly secured to one another by a flexible hinge; wherein the flexible hinge is secured to a first underside of the first panel and to a second underside of the second panel;
wherein the support frame assembly includes two opposing side rails, wherein each of the respective side rails can be secured to one of the respective opposing sidewalls; wherein the cover assembly further includes a securing apparatus, wherein the securing apparatus includes at least one locking member secured to one of the plurality of rigid panels; wherein the locking member is engageable with one of the respective side rails when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position; and wherein the cover assembly further includes a plurality of elongated support members; wherein each of the plurality of elongated support members includes a channel and each of the plurality of elongated support members is secured to an underside of one of the plurality of rigid panels; wherein the support frame assembly includes a plurality of containment brackets each of which is secured to one of the respective side rails; wherein the securing apparatus includes a plurality of locking members and each of the respective locking members are at least partially slidably engaged within the channel of one of the elongated support members such that each locking member can slide within the channel from a first position in which the respective locking member is engaged with one of the respective side rails when the tonneau cover apparatus is attached to the pickup truck and a second position in which the respective locking member is disengaged from one of the respective side rails when the tonneau cover apparatus is attached to the pickup truck; wherein the locking members will secure the cover assembly to the support frame assembly when the plurality of locking members are in the first position and when the tonneau cover apparatus is attached to the pickup truck; and wherein each of the plurality of locking members will be at least partially engaged within one of the plurality of containment brackets when the respective locking members are in the first position.

44. A tonneau cover apparatus for removable attachment about a top of a perimeter of a cargo box of a pickup truck, the top perimeter of the cargo box including a forward end, two opposing sidewalls and a tailgate, the tailgate being positioned rearward of the forward end and having an open position and a closed position, the tonneau cover apparatus comprising:
 a support frame assembly for attachment to the cargo box;
 a cover assembly including a plurality of rigid panels; wherein the plurality of rigid panels includes first and second panels; the first and second panels being flexibly secured to one another by a flexible hinge; wherein the flexible hinge is secured to a first underside of the first panel and to a second underside of the second panel; and
 wherein the support frame assembly includes two opposing side rails and each of the respective side rails is secured to one of the respective opposing sidewalls when the tonneau cover apparatus is attached to the pickup truck; wherein the cover assembly further includes a securing apparatus and the securing apparatus includes a plurality of locking members secured to an underside of a front panel and each of the respective locking members moves from a first position in which each of the respective locking members is engaged with one of the respective side rails when the tonneau cover apparatus is attached to the pickup truck and a second position in which the respective locking member is disengaged with the respective side rail when the tonneau cover apparatus is attached to the pickup truck; wherein the front panel is the panel closest to the forward end and the locking members secured to the front panel can secure the front panel to the support frame assembly when the plurality of locking members secured to the front panel are in the first position and the tonneau cover apparatus is attached to the pickup truck; wherein the front panel can be disengaged from the support frame assembly and can be lifted and pivoted rearward when the plurality of locking members secured to the front panel are in the second position and the cover assembly is attached to the pickup truck.

45. The tonneau cover apparatus of claim 44, wherein the plurality of locking members secured to the front panel are biased toward the first position and the cover assembly further includes an actuator that can move the lock members secured to the front panel from the first position to the second position.

46. The tonneau cover apparatus of claim 45, wherein the actuator includes a turn knob interconnected to each of the respective lock members secured to the front panel by a pair of elongated connecting members that move the respective locking members from the first position to the second position so as to disengage the lock members secured to the front panel from the support frame assembly.

47. The tonneau cover apparatus of claim 46, wherein the turn knob is accessible from above the top surface of the front panel when the front panel is secured to the support frame assembly.

48. The tonneau cover apparatus of claim 45, wherein the actuator includes a remote electronic actuating device for moving the respective locking members from the first position to the second position so as to disengage the respective lock members secured to the front panel from the support frame assembly.

49. A method of making a tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the method comprising the steps of:
 providing a cover assembly including a plurality of rigid panels; wherein the plurality of rigid panels includes first and second panels; the first and second panels being flexibly secured to one another by a first flexible hinge; and wherein the first flexible hinge is secured to a first underside of the first panel and to a second underside of the second panel;
 wherein the cover assembly includes a plurality of elongated support members secured to at least one of the first underside of the first panel and the second underside of the second panel to stiffen the respective rigid panel;
 providing a support frame assembly for attachment to the cargo box, the support frame assembly having two opposing side rails;
 securing each of the respective side rails to one of the respective opposing sidewalls; and
 securing the cover assembly to the support frame assembly.

50. The method of claim 49, wherein the step of providing a cover assembly includes the first flexible hinge secured to the first underside of the first panel and to the second underside of the second panel with an adhesive.

51. The method of claim 49, wherein at least one of the plurality of elongated support members has an upper surface that is curved along a length of the elongated support member; and
 securing curved upper surface of the elongated support member to the respective rigid panel so that the rigid panel is sufficiently bent for water to run off of a top surface of the respective rigid panel under the force of gravity when the respective rigid panels are engaged with the support frame assembly.

52. The method of claim 49, wherein at least one of the plurality of elongated support members has an upper surface that is curved along a length of the elongated support member so that the ends of the upper surface are a deflection distance lower than a center portion of the upper surface, and wherein the deflection distance is from about 1/64 inch to about 1/2 inch.

53. The method of claim 49, wherein the first panel and the second panel have a thickness of from about 0.020 inches to about 0.200 inches.

54. The method of claim 49, wherein the cover assembly includes a securing apparatus, wherein the securing apparatus includes at least one locking member secured to one of the plurality of rigid panels; wherein the locking member is engageable with one of the respective side rails when the respective side rail is secured to the cargo box so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position wherein the locking member can disengage from the respective side rail when the respective side rail is secured to the cargo box and the locking member is in the second position when the cover assembly is in the fully folded position so that the cover assembly can be removed from the support frame assembly and the cargo box.

55. The method of claim 49, wherein the cover assembly includes a third rigid panel secured to the second rigid panel by a second flexible hinge, and a fourth rigid panel secured to the third rigid panel by a third flexible hinge and including the step of:
pivoting the folding cover assembly at the first, second, and third flexible hinges so that the first, second and fourth rigid panels are parallel to each other and the third panel is oriented from about 30 to about 150 degrees with respect to the first, second, and fourth rigid panels.

56. The method of claim 49, wherein the cover assembly includes a third rigid panel secured to the second rigid panel by a second flexible hinge, a fourth rigid panel secured to the third rigid panel by a third flexible hinge, and a cab panel secured to the fourth rigid panel by a fourth flexible hinge, and including the step of:
pivoting the folding cover assembly at the first, second, third, and fourth flexible hinges so that the first, second, third, and fourth rigid panels are pivoted generally upward with respect to the cab panel so that the first, second and fourth panels rest in a generally vertical orientation upon the cab panel when the cab panel is in a generally horizontal orientation and secured to the respective side rails.

* * * * *